(12) United States Patent
Tanabiki et al.

(10) Patent No.: US 9,355,305 B2
(45) Date of Patent: May 31, 2016

(54) POSTURE ESTIMATION DEVICE AND POSTURE ESTIMATION METHOD

(75) Inventors: Masamoto Tanabiki, Kanagawa (JP); Kensuke Maruya, Osaka (JP); Mitsuko Fujita, Tokyo (JP); Kyoko Kawaguchi, Tokyo (JP); Yuji Sato, Tokyo (JP); Yoshimitsu Aoki, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 222 days.

(21) Appl. No.: 13/878,093

(22) PCT Filed: Sep. 15, 2011

(86) PCT No.: PCT/JP2011/005200
§ 371 (c)(1),
(2), (4) Date: Apr. 25, 2013

(87) PCT Pub. No.: WO2012/046392
PCT Pub. Date: Apr. 12, 2012

(65) Prior Publication Data
US 2013/0230211 A1 Sep. 5, 2013

(30) Foreign Application Priority Data

Oct. 8, 2010 (JP) .................................. 2010-228730
Mar. 2, 2011 (JP) .................................. 2011-045492

(51) Int. Cl.
*G06K 9/00* (2006.01)
*G06T 7/00* (2006.01)

(52) U.S. Cl.
CPC .......... *G06K 9/00342* (2013.01); *G06T 7/0046* (2013.01); *G06T 2207/20076* (2013.01); *G06T 2207/30196* (2013.01)

(58) Field of Classification Search
None
See application file for complete search history.

(56) References Cited

U.S. PATENT DOCUMENTS 8,023,726 B2 * 9/2011 Sundaresan ........ G06K 9/00342
345/604
8,355,529 B2 * 1/2013 Wu ...................... A61B 5/1113
345/420

(Continued)

FOREIGN PATENT DOCUMENTS

CN 1950844 A 4/2007
CN 101093582 A 12/2007

(Continued)

OTHER PUBLICATIONS

International Search Report for PCT/JP2011/005200 dated Nov. 29, 2011.

(Continued)

*Primary Examiner* — Tsung-Yin Tsai
(74) *Attorney, Agent, or Firm* — Pearne & Gordon LLP

(57) ABSTRACT

The present invention is a posture estimation device for estimating a wide variety of 3-dimensional postures by using a skeletal model. The posture estimation device (200) has: a skeletal backbone estimation unit (230) for estimating the position of a feature location of a person within an acquired image; a location extraction unit (240) which generates a likelihood map indicating the certainty that a location other than the feature location of the person exists in the acquired image based on the position of the feature location of the person; and a skeletal model evaluation unit (250) for evaluating, based on the likelihood map, a candidate group which includes a plurality of 2-dimensional skeletal models as candidates and such that each 2-dimensional skeletal model is configured from a line group representing each location and a point group representing coupling between each location and corresponds to one posture of the person.

11 Claims, 51 Drawing Sheets

(56) References Cited

U.S. PATENT DOCUMENTS

| | | | |
|---|---|---|---|
| 8,433,157 B2* | 4/2013 | Nijim | G06K 9/4671 358/3.26 |
| 2004/0091153 A1* | 5/2004 | Nakano | G06K 9/00362 382/228 |
| 2007/0268295 A1 | 11/2007 | Okada | |
| 2007/0269080 A1 | 11/2007 | Hamanaka | |
| 2008/0112592 A1 | 5/2008 | Wu et al. | |
| 2009/0080780 A1 | 3/2009 | Ikeda | |
| 2009/0103815 A1* | 4/2009 | Inada | G06K 9/00369 382/209 |
| 2010/0111370 A1* | 5/2010 | Black | G06K 9/00369 382/111 |
| 2010/0271200 A1* | 10/2010 | Leuthardt | G06F 3/011 340/539.12 |
| 2012/0057761 A1* | 3/2012 | Li | G06K 9/00369 382/107 |
| 2012/0309532 A1* | 12/2012 | Ambrus | A63F 13/06 463/36 |
| 2013/0195330 A1* | 8/2013 | Kim | G06K 9/00201 382/128 |
| 2013/0230211 A1* | 9/2013 | Tanabiki | G06T 7/0046 382/103 |
| 2013/0271458 A1* | 10/2013 | Andriluka | G06K 9/00342 345/420 |
| 2015/0036879 A1* | 2/2015 | Shiozaki | G06T 7/0046 382/103 |

FOREIGN PATENT DOCUMENTS

| | | | | |
|---|---|---|---|---|
| JP | 2004-206656 A | 7/2004 | | |
| JP | 2005-199078 A | 7/2005 | | |
| JP | WO 2007010893 A1 * | 1/2007 | ......... | G06K 9/00369 |
| JP | 2009-101773 A | 5/2009 | | |
| JP | 2009-288917 A | 12/2009 | | |
| WO | 2007/010893 A1 | 1/2007 | | |
| WO | WO 2007010893 A1 * | 1/2007 | | |
| WO | 2007/102537 A1 | 9/2007 | | |

OTHER PUBLICATIONS

D.G. Lowe, "Distinctive Image Features from Scale-Invariant Keypoints," International Journal of Computer Vision, Springer Netherlands, Nov. 2004, vol. 60, No. 2, p. 91-110.

P. Viola and M. Jones. "Rapid Object Detection Using a Boosted Cascade of Simple Features," in Proc. of CVPR, vol. 1, pp. 511-518, Dec. 2001.

English Translation of Search Report for Chinese Application No. 201180048368.X dated Jan. 5, 2015.

Jiawen Zhang, Research and Development of Human Motion Analysis-Based on Monocular Video Sequences, Mar. 2008.

Greg Mori, et al., Recovering 3D Human Body Configuration Using Shape Contexts, Jul. 2006, vol. 28, No. 7.

* cited by examiner

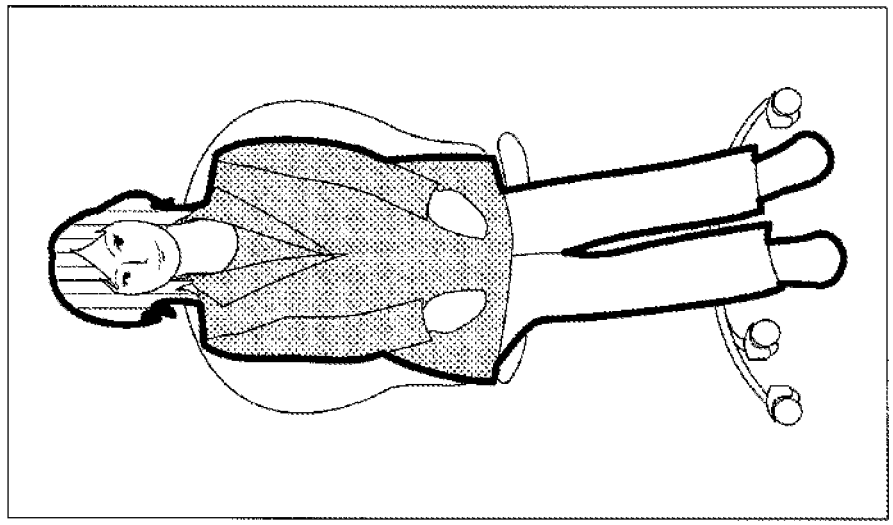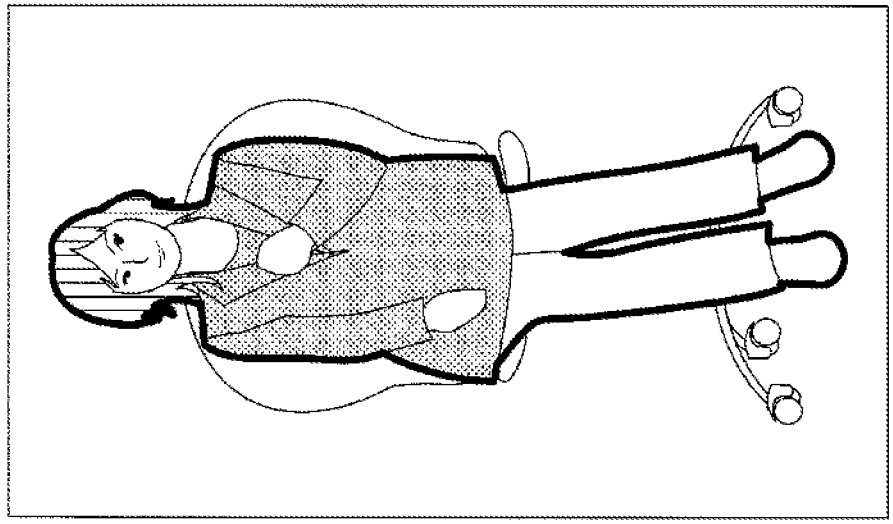
FIG. 1

| RIGHT-SHOULDER JOINT POSITION | LEFT-SHOULDER JOINT POSITION | POSITION OF CENTER OF GRAVITY OF BODY REGION | SCALE OF BODY REGION | ANGLE OF BODY REGION | FRONT DIRECTION OF PERSON |
|---|---|---|---|---|---|
| $(x_1, y_1)$ | $(x_1, y_2)$ | $(x, y)$ | $(V, H)$ | $R$ | $\theta$ |

FIG. 7

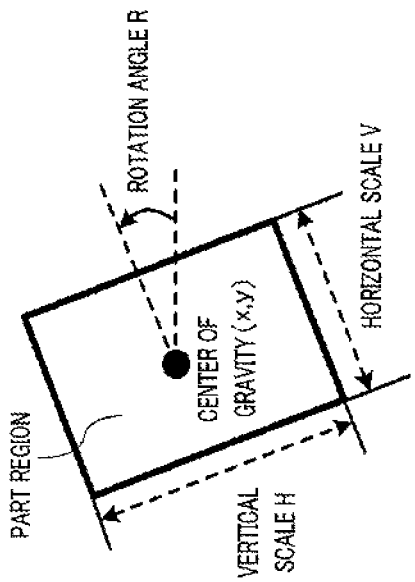

| | POSITION OF CENTER OF GRAVITY | VERTICAL SCALE | HORIZONTAL SCALE | ROTATION ANGLE |
|---|---|---|---|---|
| BODY | $(x_{to}, y_{to})$ | $V_{to}$ | $H_{to}$ | $R_{to}$ |
| RIGHT-UPPER ARM | $(x_{ruh}, y_{ruh})$ | $V_{ruh}$ | $H_{ruh}$ | $R_{ruh}$ |
| RIGHT FOREARM | $(x_{rfh}, y_{rfh})$ | $V_{rfh}$ | $H_{rfh}$ | $R_{rfh}$ |
| LEFT-UPPER ARM | $(x_{luh}, y_{luh})$ | $V_{luh}$ | $H_{luh}$ | $R_{luh}$ |
| LEFT FOREARM | $(x_{lfh}, y_{lfh})$ | $V_{lfh}$ | $H_{lfh}$ | $R_{lfh}$ |
| RIGHT-UPPER LEG | $(x_{rul}, y_{rul})$ | $V_{rul}$ | $H_{rul}$ | $R_{rul}$ |
| RIGHT-LOWER LEG | $(x_{rll}, y_{rll})$ | $V_{rll}$ | $H_{rll}$ | $R_{rll}$ |
| LEFT-UPPER LEG | $(x_{lul}, y_{lul})$ | $V_{lul}$ | $H_{lul}$ | $R_{lul}$ |
| LEFT-LOWER LEG | $(x_{lll}, y_{lll})$ | $V_{lll}$ | $H_{lll}$ | $R_{lll}$ |

FIG. 9

| JOINT NAME | JOINT POSITION |
|---|---|
| NECK | $(x_n, y_n)$ |
| LEFT SHOULDER | $(x_{ls}, y_{ls})$ |
| RIGHT SHOULDER | $(x_{rs}, y_{rs})$ |
| RIGHT ELBOW | $(x_{re}, y_{re})$ |
| LEFT ELBOW | $(x_{le}, y_{le})$ |
| RIGHT WRIST | $(xre, y_{re})$ |
| LEFT WRIST | $(x_{le}, y_{le})$ |
| HIP | $(x_h, y_h)$ |
| RIGHT THIGH | $(x_{rt}, y_{rt})$ |
| LEFT THIGH | $(x_{lt}, y_{lt})$ |
| RIGHT KNEE | $(x_{rn}, y_{rn})$ |
| LEFT KNEE | $(x_{ln}, y_{ln})$ |
| RIGHT HEEL | $(x_{rn}, y_{rn})$ |
| LEFT HEEL | $(x_{ln}, y_{ln})$ |

FIG. 11

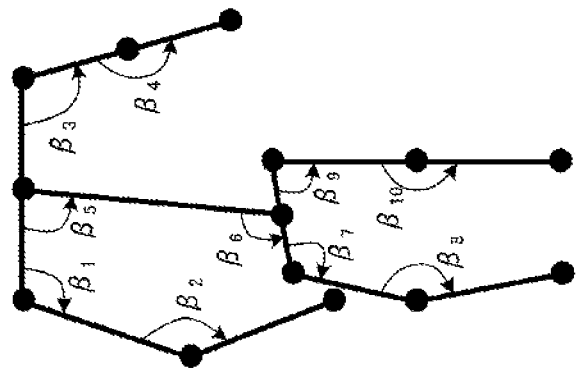

| | RELATIVE JOINT LENGTH | JOINT ANGLE |
|---|---|---|
| LEFT SHOULDER–RIGHT SHOULDER | 1 | 0 |
| RIGHT SHOULDER–RIGHT ELBOW | $\alpha_1$ | $\beta_1$ |
| RIGHT ELBOW–RIGHT WRIST | $\alpha_2$ | $\beta_2$ |
| LEFT SHOULDER–LEFT ELBOW | $\alpha_3$ | $\beta_3$ |
| LEFT ELBOW–LEFT WRIST | $\alpha_4$ | $\beta_4$ |
| NECK–HIP | $\alpha_5$ | $\beta_5$ |
| LEFT THIGH–RIGHT THIGH | $\alpha_6$ | $\beta_6$ |
| RIGHT THIGH–RIGHT KNEE | $\alpha_7$ | $\beta_7$ |
| RIGHT KNEE–HEEL | $\alpha_8$ | $\beta_8$ |
| LEFT THIGH–LEFT KNEE | $\alpha_9$ | $\beta_9$ |
| LEFT KNEE–HEEL | $\alpha_{10}$ | $\beta_{10}$ |

FIG. 14

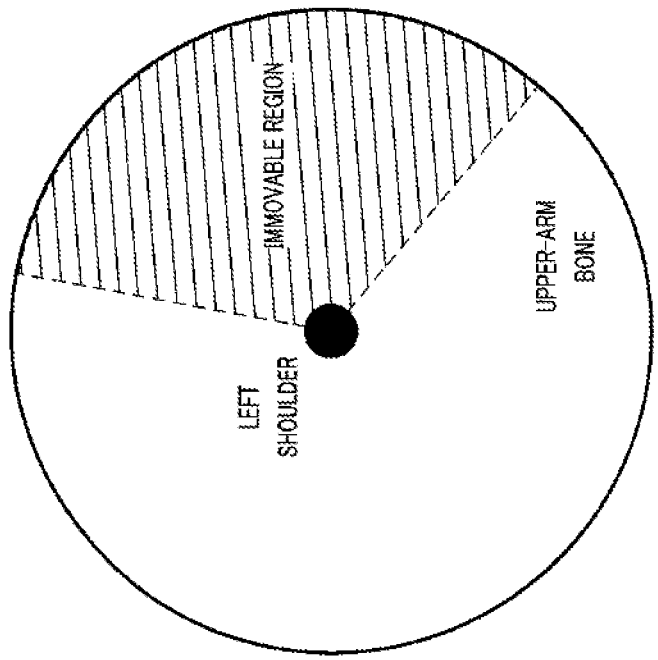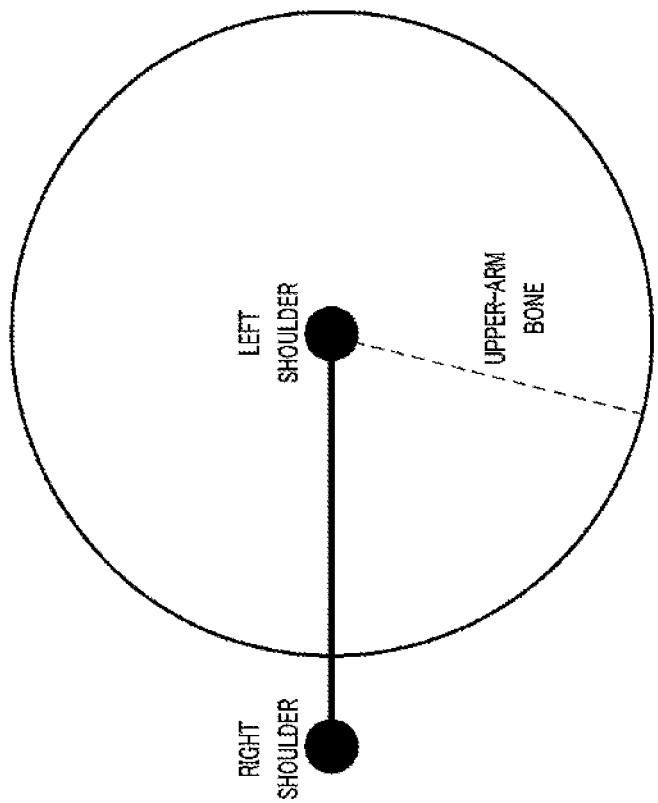
FIG. 20A: FACING THE FRONT
FIG. 20B: FACING THE OBSERVER'S LEFT
FIG. 20

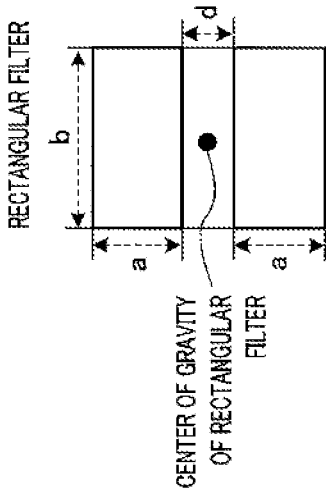

FIG. 31A

| | UPPER ARM | FOREARM | BODY | UPPER LEG | LOWER LEG |
|---|---|---|---|---|---|
| RATIO OF WIDTH TO SHOULDER WIDTH | $\alpha_{ua}$ | $\alpha_{la}$ | $\alpha_{tr}$ | $\alpha_{ul}$ | $\alpha_{ll}$ |
| RATIO OF HEIGHT TO SHOULDER WIDTH | $\beta_{ua}$ | $\beta_{la}$ | $\beta_{tr}$ | $\beta_{ul}$ | $\beta_{ll}$ |

FIG. 31B

RECTANGULAR FILTER SCALES AND INTERFILTER DISTANCES CALCULATED USING SHOULDER WIDTH W ACQUIRED BY BASIC SKELETON ESTIMATING SECTION

| | UPPER ARM | FOREARM | BODY | UPPER LEG | LOWER LEG |
|---|---|---|---|---|---|
| RECTANGULAR FILTER SCALE A | $L_{ua}$ | $L_{la}$ | $L_{tr}$ | $L_{ul}$ | $L_{ll}$ |
| RECTANGULAR FILTER SCALE B | $(\alpha_{ua} * W)/3$ | $(\alpha_{la} * W)/3$ | $(\alpha_{tr} * W)/3$ | $(\alpha_{ul} * W)/3$ | $(\alpha_{ll} * W)/3$ |
| INTERFILTER DISTANCE | $\beta_{ua} * W$ | $\beta_{la} * W$ | $\beta_{tr} * W$ | $\beta_{ul} * W$ | $\beta_{ll} * W$ |

FIG. 31C

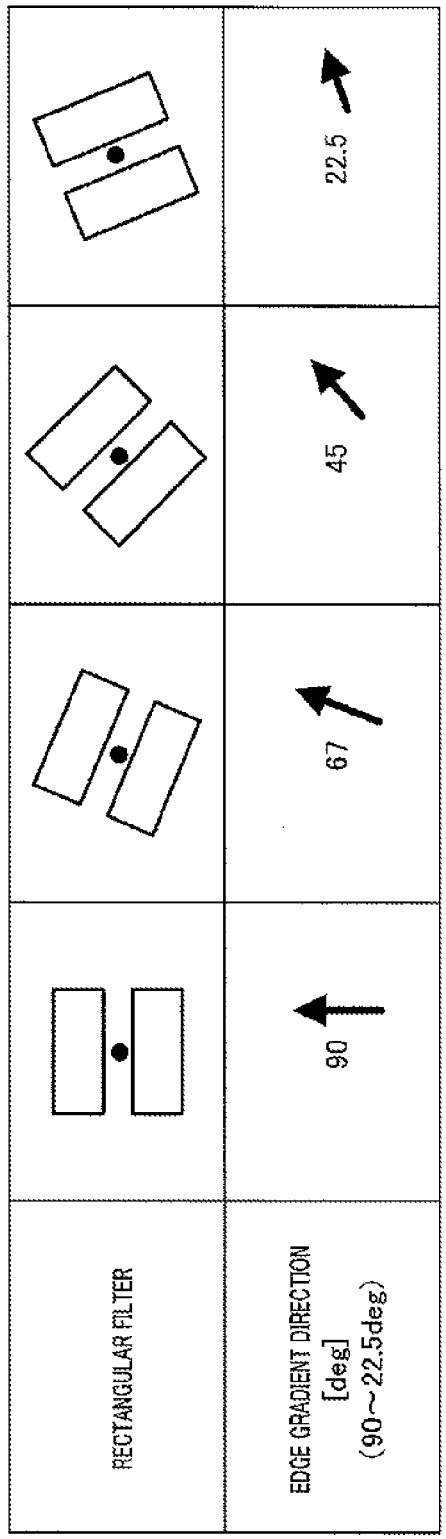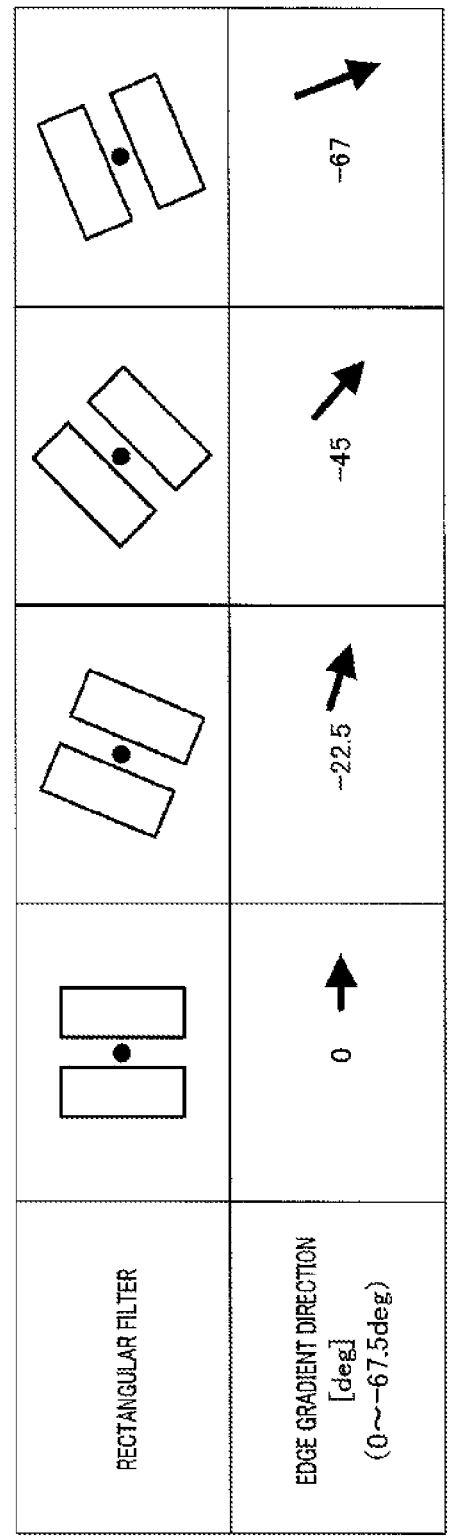
FIG. 32A
FIG. 32B

POSTURE ESTIMATION DEVICE AND POSTURE ESTIMATION METHOD

TECHNICAL FIELD

The present invention relates to a human pose estimating apparatus and pose estimating method using images taken with a camera.

BACKGROUND ART

In recent years, human pose estimation using images taken with a camera has been studied. PTL 1 discloses a conventional pose estimating apparatus employing silhouette matching. The pose estimating apparatus in PTL 1 matches a silhouette image created from 3D human body models expressing various poses to a silhouette image generated from an input image, and outputs the pose of the 3D human body model with the highest matching score as the estimated pose of a person in the input image.

CITATION LIST

Patent Literature

PTL 1
WO2007/010893

Non-Patent Literature

NPL 1
D. G. Lowe, "Distinctive Image Features from Scale-Invariant Keypoints," International Journal of Computer Vision, Springer Netherlands, November, 2004, Vol. 60, No. 2, p. 91-110
NPL 2
P. Viola and M. Jones. "Rapid Object Detection Using a Boosted Cascade of Simple Features," in Proc. of CVPR, vol. 1, ppp. 511-518, December, 2001

SUMMARY OF INVENTION

Technical Problem

A person, however can take a great variety of poses. Depending on the positional relationship between an image-capturing camera and a target person, one part of the person may often overlap with another in an image. For example, as shown in FIG. 1, the silhouette when a person stretches his arm downward is the same as that when the person bends the arm. The pose estimating apparatus in PTL 1 employs the silhouette that lacks information on the portion inside the contour of the person, and thus is susceptible to overlapping of parts, precluding pose estimation.

An objective of the present invention is to provide a pose estimating apparatus and pose estimating method for estimating various human 3D poses using a skeleton model.

Solution to Problem

One embodiment of a pose estimating apparatus according to the present invention includes: a basic skeleton estimating section that estimates a position of a distinctive part of a person in an acquired image; a likelihood map generating section that generates a likelihood map indicating the probability of presence of a part of the person other than the distinctive part in the acquired image, based on the position of the distinctive part of the person; and an evaluating section that evaluates, based on the likelihood map, a candidate group including a plurality of 2D skeleton models as candidates, the 2D skeleton models each comprising a group of lines representing the parts and a group of dots representing connections between the parts and each 2D skeleton model corresponding to a pose of the person.

One embodiment of a pose estimating method according to the present invention includes: estimating a position of a distinctive part of a person in an acquired image; generating a likelihood map indicating the probability of presence of a part of the person other than the distinctive part in the acquired image, based on the position of the distinctive part of the person; and evaluating, based on the likelihood map, a candidate group including a plurality of 2D skeleton models as candidates, the 2D skeleton models each comprising a group of lines representing the parts and a group of dots representing connections between the parts and each 2D skeleton model corresponding to a pose of the person.

Advantageous Effects of invention

According to the present invention, the use of a skeleton model enables estimation of various 3D poses.

BRIEF DESCRIPTION OF DRAWINGS

FIG. 1 is a diagram illustrating the example of the pose estimation results with a conventional pose estimating apparatus;
FIG. 7 is a diagram illustrating example basic skeleton information;
FIG. 9 shows an example part region and example part region information;
FIG. 11 is a diagram illustrating example skeleton information;
FIG. 14 shows example relative joint lengths and example joint angles.

FIG. 20 is a diagram illustrating the movable range for a shoulder joint;

FIG. 31 is a diagram for explaining a method for generating a rectangular filter according to Embodiment 4;

FIG. 32 is a diagram illustrating rectangular filters for different directions according to Embodiment 4;

DESCRIPTION OF EMBODIMENTS

Embodiments of the present invention will now be described in detail with reference to the attached drawings.

The pose estimating apparatus and pose estimating method according to the present invention estimate the pose of a person in an image, using a skeleton model.

Here, a skeleton model is an expression of a human skeleton including simplified joints and bones. In a skeleton model, each joint is represented by a dot, and each bone joining joints by a straight line.

Figure 2:
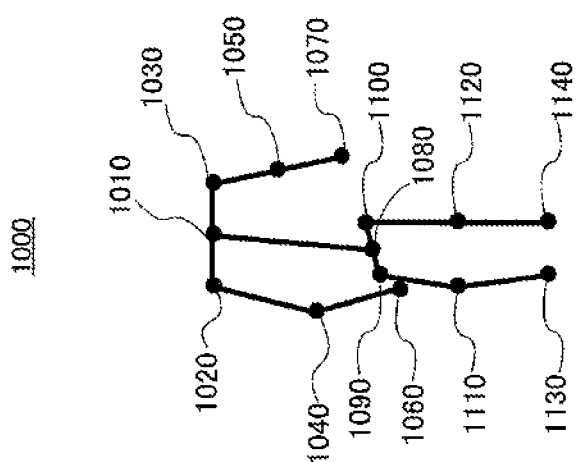
FIG. 2 is a diagram for explaining a skeleton model.

FIG. 2 shows an example skeleton model. As shown in FIG. 2, skeleton model 1000 is expressed by neck joint 1010, right-shoulder joint 1020, left-shoulder joint 1030, right-elbow joint 1040, left-elbow joint 1050, right-wrist joint 1060, left-wrist joint 1070, hip joint 1080, right-thigh joint 1090, left-thigh joint 1100, right-knee joint 1110, left-knee joint 1120, right-heel joint 1130, left-heel joint 1140, and bones joining the joints.

The skeleton model can express various poses of a person. In other words, different poses have respective skeleton models. Note that a skeleton model based on a 2D coordinate system is referred to as "2D skeleton model", and a skeleton model based on a 3D coordinate system "3D skeleton model".

Figure 3:
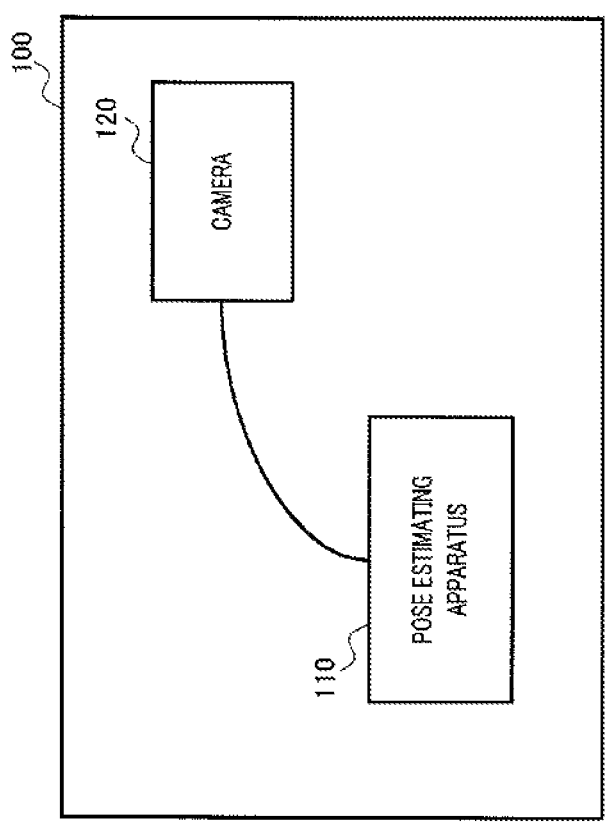
FIG. 3 is a configuration diagram of a behavior analysis system including a pose estimating apparatus according to each embodiment of the present invention.

FIG. 3 is a configuration diagram of a behavior analysis system including a pose estimating apparatus according to each embodiment of the present invention;

Behavior analysis system 100 in FIG. 3 includes pose estimating apparatus 110 and camera 120. Pose estimating apparatus 110 and camera 120 exchange data, for example, by Internet Protocol (IP) network communication.

Behavior analysis system 100 records, for example, moving images and analyzes the human behavior from the recorded moving images. Thus, behavior analysis system 100 is applicable, for example, to detection of an abnormal behavior in a street, buying behavior analysis in a shop, support for improving factory work efficiency, and sport form coaching.

Pose estimating apparatus 110 is, for example, a computer system (a personal computer, workstation or the like) with a communication function. This computer system, not shown, primarily includes an input device, a computer main frame, an output device, and a communication device.

The input device is, for example, a keyboard or mouse. The output device is, for example, a display or printer. The communication device is, for example, a communication interface connectable to an IP network. The computer main frame is mainly composed, for example, of a central processing unit (CPU) and a memory device. The CPU has a control function and a calculation function. The memory device includes, for example, a read only memory (ROM) storing programs or data and a random access memory (RAM) temporarily storing data. The ROM may be a flash memory which is electrically rewritable.

Camera 120 acquires moving images of a working person or other scenes and outputs frames constituting the moving images to pose estimating apparatus 110 every predetermined period.

Individual embodiments will be described below. Embodiment 1 and Embodiment 2, in particular, relate to a pose estimating apparatus and pose estimating method for estimating the pose of a person in an image every frame. Embodiment 3 relates to a pose estimating apparatus and pose estimating method using a plurality of frames in order to improve the accuracy of estimation of the pose of the person while reducing the calculation load required for the pose estimation.

Embodiment 1

Figure 4:
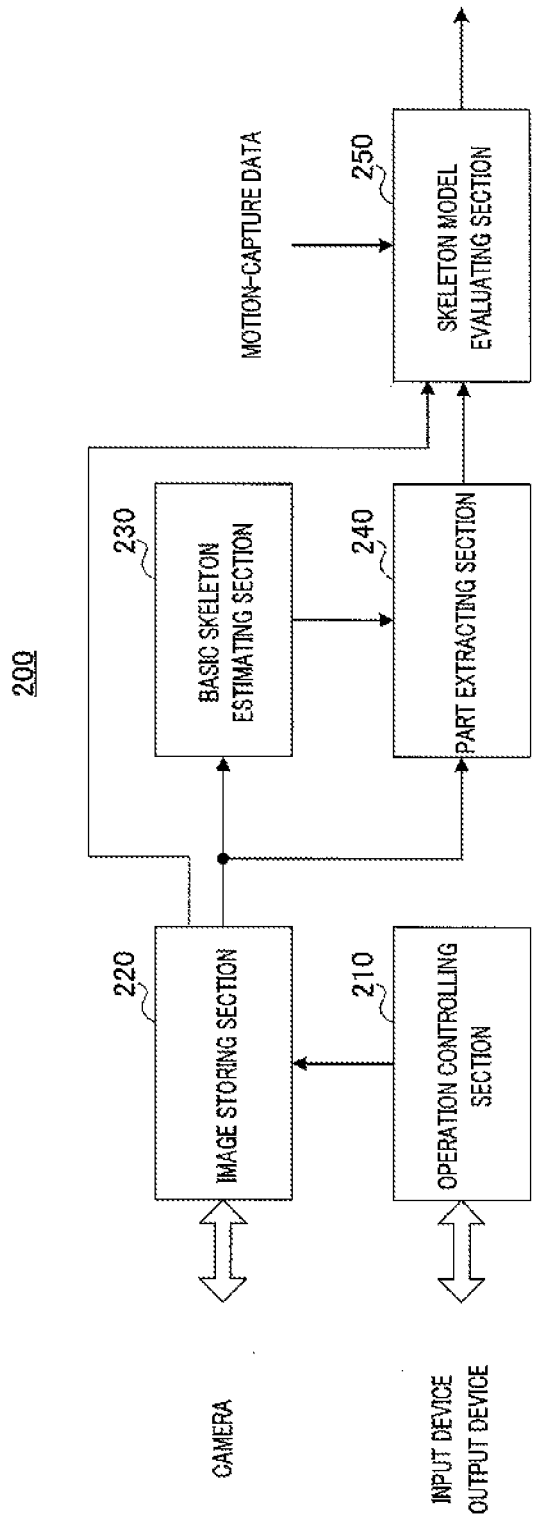
FIG. 4 is a block diagram of main components of a pose estimating apparatus according to Embodiment 1 of the present invention.

FIG. 4 shows main components of a pose estimating apparatus according to this embodiment. Pose estimating apparatus 200 in FIG. 4 is applied to pose estimating apparatus 110 in FIG. 3.

Pose estimating apparatus 200 includes operation controlling section 210, image storing section 220, basic skeleton estimating section 230, part extracting section (likelihood map generating section) 240, and skeleton model evaluating section 250.

Figure 5:
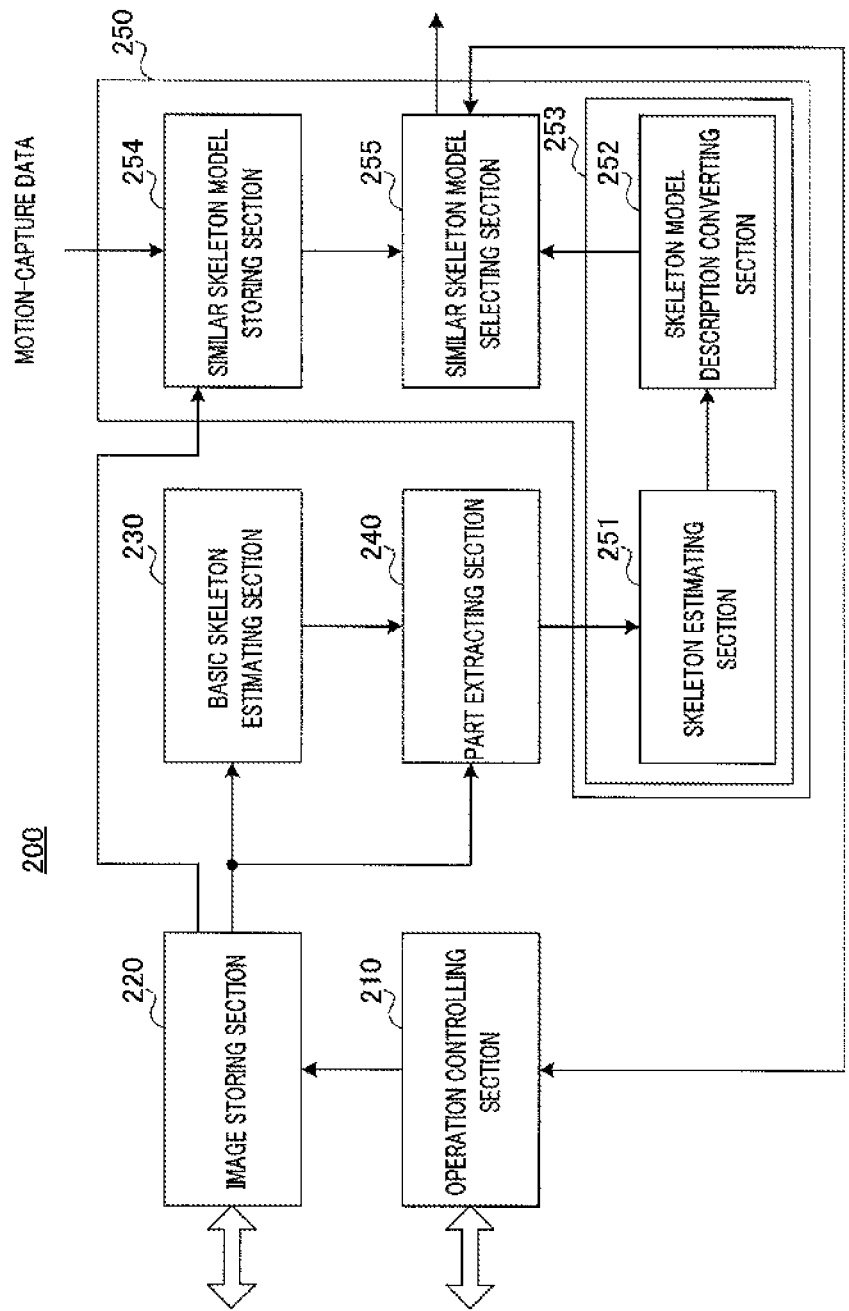
FIG. 5 is a block diagram of main components of a skeleton model evaluating section according to Embodiment 1.

FIG. 5 is a diagram illustrating main components of skeleton model evaluating section 250 within pose estimating apparatus 200 in FIG. 4 according to this embodiment. Skeleton model evaluating section 250 includes target skeleton model forming section 253 composed of skeleton estimating section 251 and skeleton model description converting section 252, similar-skeleton model storing section 254, and similar-skeleton model selecting section 255.

Operation controlling section 210 controls the start and end of a series of procedures shown in this embodiment and provides operation screens for user operation.

Figure 6:
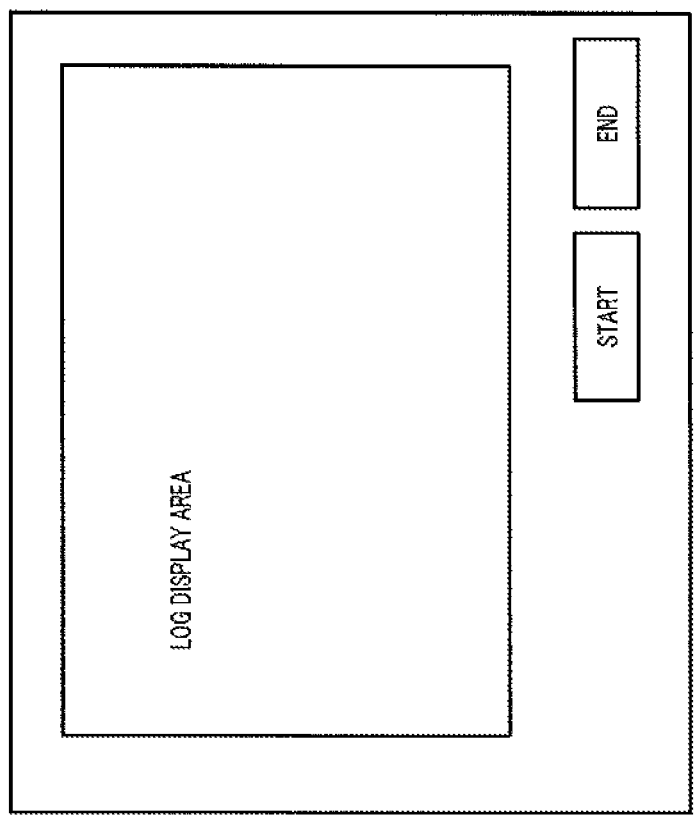
FIG. 6 is a diagram illustrating an example operation screen according to Embodiment 1.

FIG. 6 shows an example operation screen in this embodiment. The operation screen includes a "start" button, an "end" button, and a log display area.

The user instructs the system to start or end the process with the input device, by clicking the "start" button or "end" button. A string or image is displayed on the log display area. In this embodiment, the process includes a plurality of steps. The system therefore displays, for example, a string indicating the progress of the process or an image indicating the results of the process each time a step completes, on the log display area. The details will be described later.

When the user instructs the system to start a process, image storing section 220 acquires frames constituting moving images from camera 120 every predetermined period and stores them in its memory. The frame rate ranges, for example, from 10 to 30 fps. The stored moving images can be read from operation controlling section 210, as well as basic skeleton estimating section 230, part extracting section 240, and other sections.

In this embodiment, one of the frames constituting the moving images stored in image storing section 220 is shared by operation controlling section 210 and basic skeleton estimating section 230. The shared frame serving as a target of human pose estimation processing is referred to as "target image", and the person in the target image serving as a target of pose estimation, "target person." The description will be carried out on one target person. The images in this embodiment are binary images.

Image storing section 220 also stores camera parameters at the time of taking moving images with the camera. The details of the camera parameters will be described later.

Basic skeleton estimating section 230 includes three detectors: a head and shoulder detector, a shoulder joint detector, and a body detector. Basic skeleton estimating section 230 detects the basic skeleton of the target person using the detectors. The basic skeleton is a skeleton in which both arms and both legs join each other. The determinants of the basic skeleton: the positions of the person's head and shoulder, the principal axis of inertia of the person's body, and the front direction of the person are collectively referred to as "basic skeleton information."

FIG. 7 shows example basic skeleton information. The basic skeleton information includes different pieces of information on the positions of the right-shoulder joint and left-shoulder joint of the target person, the position of the center of gravity of the body region of the target person, the scale of the body region of the target person, the angle of the body region of the target person, and the front direction of the target person.

Figure 8:
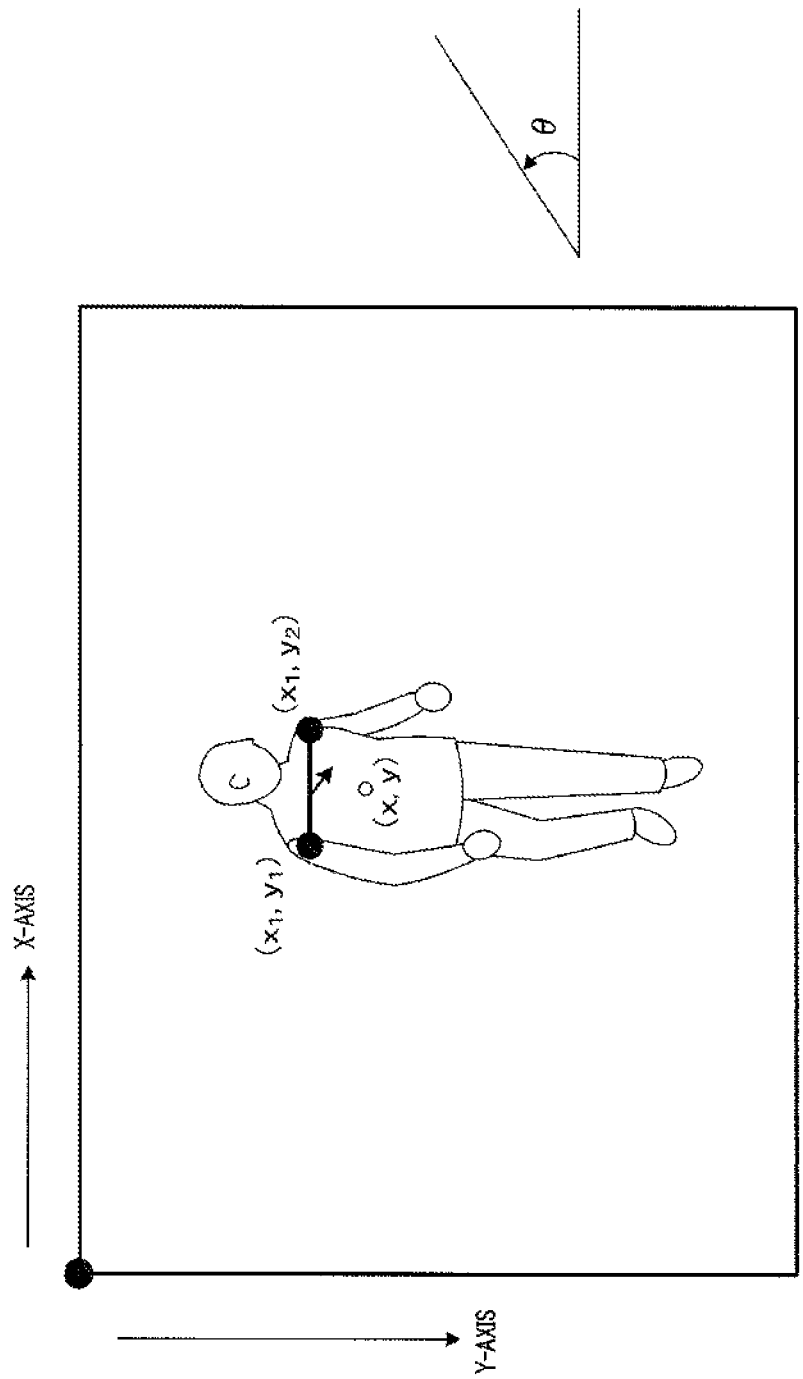
FIG. 8 is a diagram illustrating an image coordinate system serving as a reference for each information element, contained in basic skeleton information.

FIG. 8 shows an image coordinate system serving as a reference for each piece of information in the basic skeleton information. FIG. 8 is a target image schematically illustrating the target person. In the image coordinate system, the positions of the right-shoulder joint and left-shoulder joint, the position of the center of gravity of the body region, and the scale of the body region are expressed with the x-axis and y-axis extending in the horizontal and vertical directions, respectively with respect to the origin point located at the top left point of the target image. The angle of the body region and the front direction of the person are expressed by angle θ ($-\pi \leq \theta \leq \pi$) with respect to the x-axis.

A method for extracting a basic skeleton with basic skeleton estimating section 230 will be described in detail later. Basic skeleton estimating section 230 extracts a basic skeleton, so that part extracting section 240 can narrow the search range for arms and legs joining the basic skeleton.

Basic skeleton estimating section 230 extracts the basic skeleton of the target person from the target image, and outputs information on the extracted basic skeleton to part extracting section 240 as basic skeleton information.

Part extracting section 240 includes classifiers for identifying the upper arm, forearm, body, upper leg, and lower leg of the target person. Part extracting section 240 generates likelihood maps indicating the probability of the existence of parts of the target person in the target image, using the classifiers based on the basic skeleton information from basic skeleton estimating section 230. Part extracting section 240 extracts information on the regions of the parts of the target person in the target image, based on the likelihood map. Such regions are hereinafter referred to as part regions, and such information, part is hereinafter referred to as region information.

FIG. 9 shows an example part region and example part region information. FIG. 9 shows the case where the extracted part region has a rectangular shape. The part region may have any shape other than a rectangular shape, such as an elliptical shape.

In that case, the part region information includes the positions of the centers of gravity, vertical scales, horizontal scales, and rotation angles for the respective parts. Here, the position of the center of gravity is the center of gravity of the part region expressed as a rectangle. The vertical scale is the length of a side of the rectangle parallel to the direction of the boric in the part. The horizontal scale is the length of another side of the rectangle perpendicular to the direction of the bone in the part. The rotation angle is an angle between the x-axis and the side of the rectangle perpendicular to the direction of the bone in the part (the side corresponding to the horizontal scale), the angle being measured counterclockwise.

Figure 10:
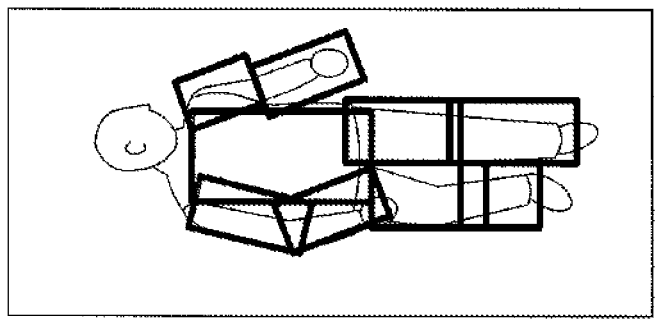
FIG. 10 is a conceptual diagram in which part regions are superimposed on a target image.

FIG. 10 is a conceptual diagram in which rectangles are superimposed on a target image, the rectangles indicating the part region information for the parts (a body, a right-upper arm, a right forearm, a left-upper arm, a left forearm, a right-upper leg, a right-lower leg, a left-upper leg, and a left-lower leg) extracted by part extracting section 240. The conceptual diagram of FIG. 10 is an optional output of pose estimating apparatus 200 shown to provide a supplementary explanation.

As described above, part extracting section 240 generates likelihood maps indicating the probability of the existence of parts of the target person in the target image, based on the positions of the shoulders being the most detectable parts in a human body (hereinafter referred to as distinctive, parts). A method for generating a likelihood map and extracting a part region with part extracting section 240 will be described in detail later. Part extracting section 240 outputs the generated part region information and the generated likelihood maps to skeleton estimating section 251.

Skeleton model evaluating section 250 evaluates a candidate group including a plurality of 2D skeleton models as candidates, based on the likelihood maps. As described above, a joint is represented by a dot, and a bone joining joints by a straight line, in a skeleton model. In particular, a skeleton model is composed of a group of lines representing the parts and a group of dots representing connections between the parts, and corresponds to a pose of the person. A skeleton model in a 2D coordinate system is referred to as 2D skeleton model.

Specifically, skeleton estimating section 251 estimates the joint position of the target person, based on the part region information and likelihood maps from part extracting section 240. A method for estimating a joint position will be described in detail later. Skeleton estimating section 251 outputs skeleton information, i.e., information on the estimated positions of the joints to skeleton model description converting section 252. If the joint position can be determined, the position of the bone joining the joints can also be determined. Estimation of the joint position is the same as the estimation of the skeleton model.

FIG. 11 shows example skeleton information from skeleton estimating section 251. As shown in FIG. 11, skeleton information contains different pieces of information on the joint positions of the neck, right shoulder, left shoulder, right elbow, left elbow, right wrist, left wrist, hip, right hip, left hip, right knee, left knee, right heel, and left heel of the target person in the coordinate system of target coordinates.

Figure 12:
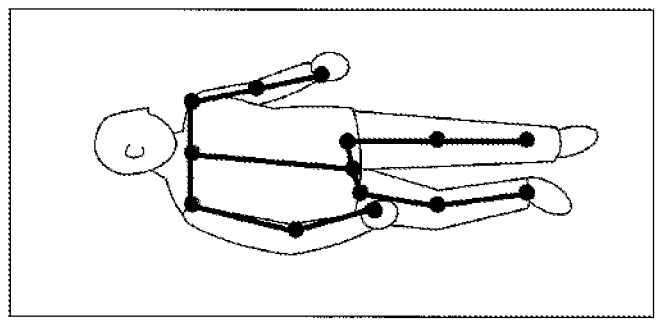
FIG. 12 is a conceptual diagram illustrating utilization of skeleton information which is superimposed on a target image.

FIG. 12 is a conceptual diagram in which dots and straight lines are superimposed on a target image, each dot representing a joint position indicated by skeleton information from skeleton estimating section 251, each straight line representing a bone joining the joint positions. Note that the conceptual diagram of FIG. 12 is optional output of pose estimating apparatus 200 shown to provide a supplementary explanation.

Figure 13:
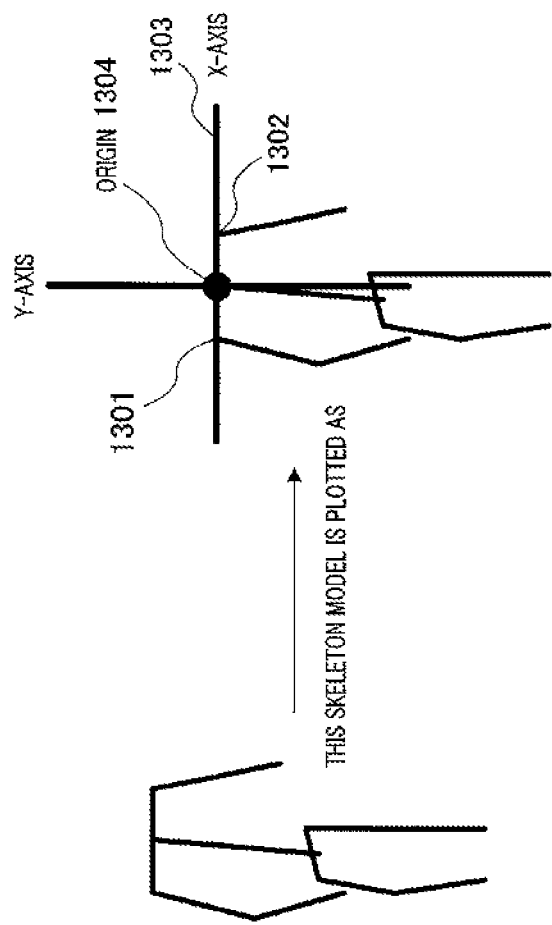
FIG. 13 is a diagram illustrating a skeleton, model coordinate system.

Skeleton model description converting section 252 converts skeleton information described in the coordinate system of the target image into skeleton model description information described in a skeleton model coordinate system. In the skeleton model coordinate system, the origin point corresponds to one of the joints in the skeleton model or one point on a straight line joining joints, the X-AXIS corresponds to a straight line passing through two joints, and the Y-AXIS corresponds to a straight line orthogonal to the X-AXIS. For example, as shown in FIG. 13, the origin point corresponds to the center (neck) 1304 of straight line 1303 joining right shoulder 1301 and left shoulder 1302, the X-AXIS corresponds to straight line (hereinafter referred to as shoulder line) 1303 joining the right shoulder and the left shoulder, and the Y-AXIS corresponds to a straight line orthogonal to the X-AXIS.

In the skeleton model coordinate system, the length of a shoulder line is 1, and the other joint lengths are each expressed by a relative joint length, i.e., the ratio of the joint length to the shoulder line length. The joint length is the length of a straight line connecting two joints (i.e., the length of a part). For example, relative joint length $\alpha_1$ for a straight line joining the right elbow and the right shoulder is calculated by Equation 1.

(Equation 1)

$$\alpha_1 = \frac{\text{the length of a line joining the right shoulder and the right elbow}}{\text{the length of a line joining the right shoulder and the left shoulder}} = \frac{\sqrt{(x_{re} - x_{rs})^2 + (y_{re} - y_{rs})^2}}{\sqrt{(x_{ls} - x_{rs})^2 - (y_{ls} - y_{rs})^2}}$$ [1]

Skeleton model description converting section 252 then determines joint angle $\beta_1$. For example, the angle of a line segment connecting the right shoulder and the right elbow is represented by angle θ (−180°<θ<180°) between a shoulder line joining the right shoulder and the left shoulder, and a line segment connecting the right shoulder and the right elbow.

Suppose that there are the coordinates of three points: the right shoulder=$(x_{rs}, y_{rs})$, the left-shoulder=$(x_{ls}, y_{ls})$, and the right elbow=$(x_{re}, y_{re})$. In this case, skeleton model description converting section 252 calculates outer product S of vector A $(A_x, A_y)=(x_{ls}-x_{rs}, y_{ls}-y_{rs})$ and vector B $(B_x, B_y)=(x_{re}-x_{rs}, y_{re}-y_{rs})$, according to Equation 2. Joint angle $\beta_1$ equals angle θ (0°<θ<180°) if S>0, or angle θ (−180°<θ<0°) if S<0. At S=0, the right shoulder, the left shoulder, and the right elbow are on one straight line.

[2]

$$S = Ax*By - Ay*Bx$$ (Equation 2)

Angle $\beta_1$ between vector A and vector B satisfies Equation 3.

(Equation 3)

$$\cos\beta_1 = \frac{\vec{A} \cdot \vec{B}}{|\vec{A}||\vec{B}|} = \frac{A_x*B_x + A_y*B_y}{\sqrt{A_x^2 + A_y^2}\sqrt{B_x^2 + B_y^2}}$$ [3]

$\beta_1$ (0°≤$\beta_1$≤180°) is determined from an inverse trigonometric function shown in Equation 4.

(Equation 4)

$$\beta_1 = \cos^{-1}\left(\frac{A_x * B_x + A_y * B_y}{\sqrt{A_x^2 + A_y^2}\sqrt{B_x^2 + B_y^2}}\right) \quad [4]$$

Skeleton model description converting section 252 calculates the respective relative joint lengths and joint angles for the right elbow and the right wrist, the left shoulder and the left elbow, the left elbow and the left wrist, the neck and the hip, the right thigh and the left thigh, the right thigh and the right knee, the right knee and the corresponding heel, the left thigh and the left knee, and the left knee and the corresponding heel, by the same calculation method as the right-shoulder and the right elbow. FIG. 14 shows example relative joint lengths and joint angles.

Thus, skeleton model description converting section 252 converts the description of skeleton information (i.e., a target person skeleton model) from skeleton estimating section 251, from the image coordinate system to the skeleton model coordinate system. This generates skeleton model description information independent of variations in the scale of the target person in an image due to the positional relationship between the camera and the target person. Skeleton model description converting section 252 then outputs skeleton model description information on the target person to similar skeleton model selecting section 255. The skeleton model of the target person described with skeleton model description information is hereinafter referred to as "target skeleton model".

Before pose estimation processing for the target person, similar skeleton model storing section 254 stores many pieces of skeleton model description information to be subjected to evaluation of matching them to skeleton model description information of the target person.

The upright position varies depending on the body shape. A difference in a given pose depending on the body shape is referred to as a body shape difference. In addition to an upright, position, there are various possible poses such as a squat position, an upright position with both arms down, and an upright position with both arms forward. A difference between the poses one person can take is hereinafter referred to as a pose difference.

Similar skeleton model storing section 254 therefore needs to store skeleton model description information expressing various poses in consideration of the body shape difference or pose difference.

Skeleton, model description information stored in similar skeleton model storing section 254 can be created, for example, from data obtained by motion-capture technology (hereinafter referred to as motion-capture data). Motion-capture data is defined, for example, by the 3D (x-axis, y-axis, and z-axis) position coordinates of joints and the rotation angles of the joints, and is known and commercially available. Joining the joints based on motion-capture data with a straight line readily makes the data visible in the form of a 3D skeleton model.

Similar skeleton model storing section 254 generates a 2D skeleton model from a 3D skeleton model, using the camera parameters stored in image storing section 220. The camera parameters include camera exterior parameters and camera interior parameters. The camera exterior parameters are the position coordinates of the camera in a world coordinate system (the position of the origin point of the camera coordinate system), and the pose (xyz rotation angle) of the camera based on the world coordinate system. The camera interior parameters include the focal length of the camera, the vertical angle of view of the camera, the width of a 2D image projected on a screen, and the height of the 2D image projected on the screen.

In other words, the camera parameters are necessary for converting a 3D skeleton model in the world coordinate system into a 2D image viewed with the camera.

Figure 15:
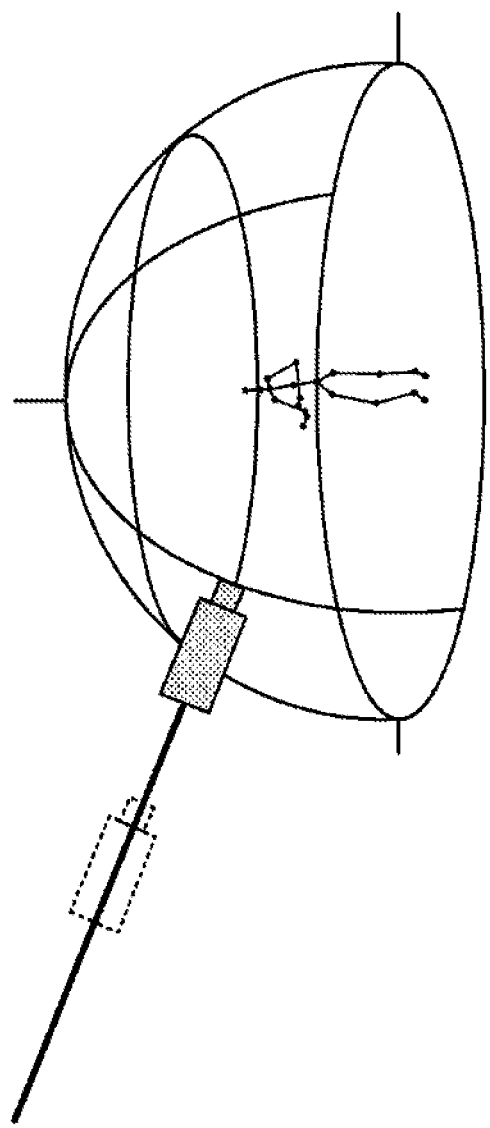
FIG. 15 is a diagram for explaining an operation for projective conversion of a 3D skeleton model into a 2D image.

Similar skeleton model storing section 254 changes the camera exterior parameters for a 3D skeleton model in the world coordinate system as shown in FIG. 15, and thus acquires a plurality of 2D skeleton models from the 3D skeleton model, the 2D skeleton models being projected from different directions. The joints projected onto the screen are expressed using skeleton model description information.

Figure 16:
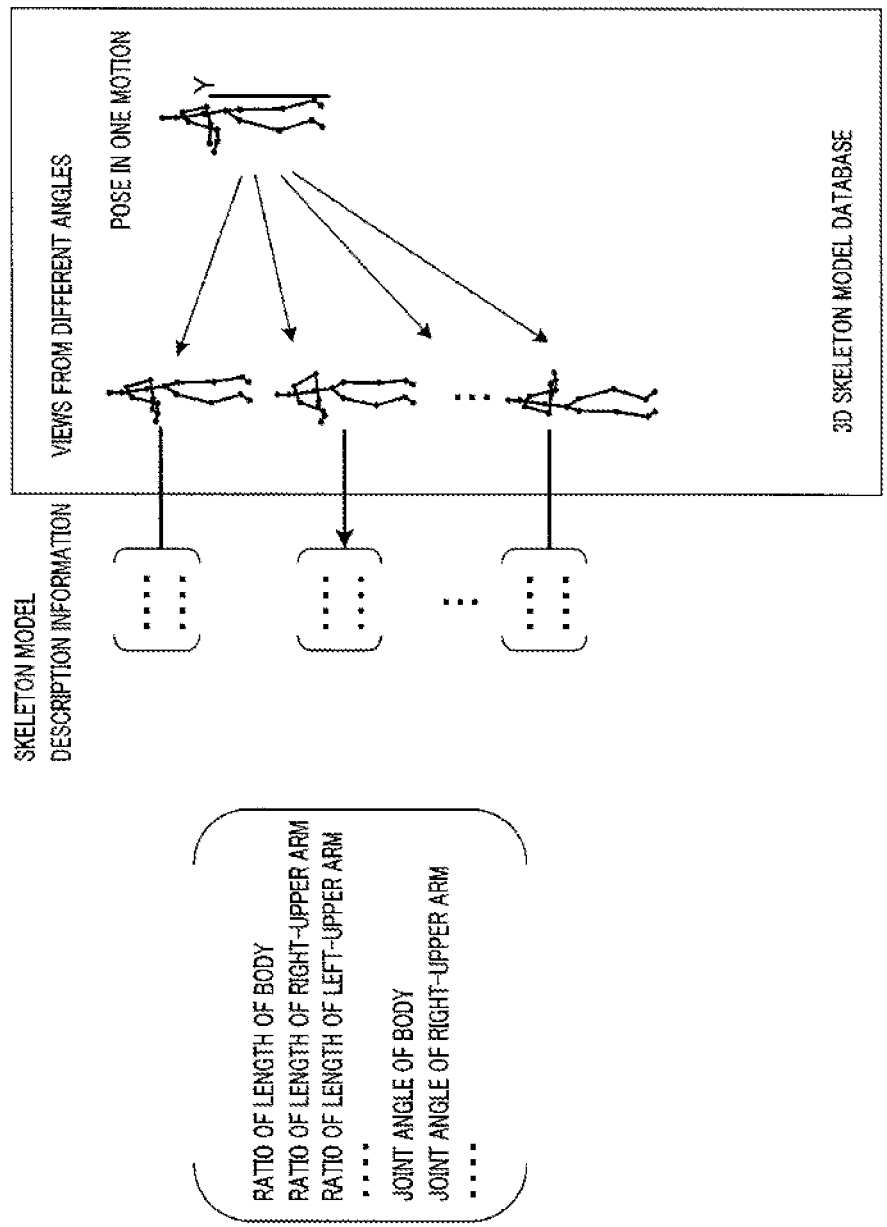
FIG. 16 is a diagram illustrating an example 2D image obtained by projection from various directions of a skeleton model representing a pose in one motion.

FIG. 16 shows example 2D images obtained by projection from various directions of a skeleton model indicating a pose in one motion. Different pieces of skeleton model description information obtained from one pose are each referred to as "similar skeleton information".

Thus, similar skeleton model storing section 254 stores a 2D skeleton model obtained by projective conversion of a 3D skeleton model corresponding to a pose of the person, as skeleton model description information. Similar skeleton model storing section 254 stores similar skeleton information consisting of the same number of pieces as data (i.e., poses) obtained by motion-capture technology.

Similar skeleton model selecting section 255 calculates an evaluation function for estimating the pose of the target person, using skeleton model description information on the target person from skeleton model description converting section 252 and similar skeleton information stored in similar skeleton model storing section 254. Here, the skeleton model description information and the similar skeleton information are both described in the image coordinate system.

Evaluation function x* is represented by the square of the difference between the parameter vectors $P_e$ and $P_d$, according to Equation 5:

[5]

$$x^* = \arg\min(|P_e - P_d|^2) \quad \text{(Equation 5)}$$

where $P_e$ is skeleton model description information from skeleton model description converting section 252, and $P_d$ is similar skeleton information stored in similar skeleton model storing section 254.

Similar skeleton model selecting section 255 outputs the results of the final estimation selected from different pieces of similar skeleton information by an optimization method such that the evaluation, function x* has a minimum value.

As described above, different pieces of similar skeleton information are each associated with a 3D skeleton model in which the joints based on motion-capture data are joined. Similar skeleton model selecting section 255 extracts the most similar skeleton information, and thus determines and outputs the most similar 3D skeleton model.

In the above description, similar skeleton model selecting section 255 employs a nonlinear least-squares method as the optimization method, but it can employ any other method instead.

Thus, similar skeleton model selecting section 255 selects one of the 2D skeleton models as that corresponding to the pose of the target person, based on the similarity between each 2D skeleton model and the target skeleton model. A 2D model is, as described above, obtained by projective conversion of a 3D skeleton model corresponding to a pose of the person stored in similar skeleton model storing section 254.

Similar skeleton model selecting section 255 then outputs information on a 3D skeleton model corresponding to the selected 2D skeleton model as information on the pose of the target person.

Figure 17:
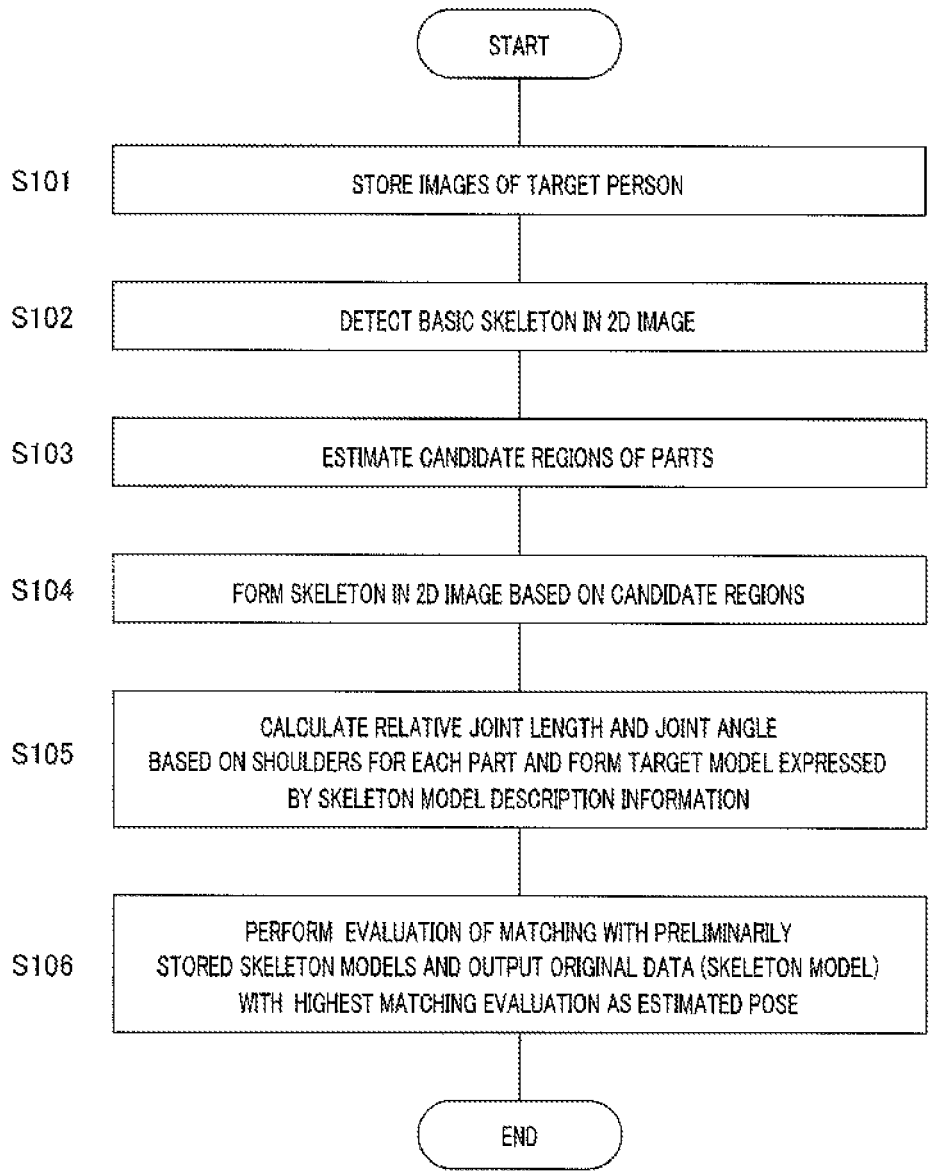
FIG. 17 is an example process flow for an estimation processing apparatus according to Embodiment 1.

The following shows the details of the operation of pose estimating apparatus 200 configured as described above. FIG. 17 is an example process flow for pose estimating apparatus 200 according to this embodiment.

In S101, camera 120 starts to take images of the person after the user clicks the "start" button on the operation screen. Image storing section 220 acquires the frames constituting moving images from camera 120 every predetermined period (e.g., frame rate=10 to 30 fps) and stores them in its memory. Image storing section 220 stores the frames constituting the moving images from camera 120 as, for example, a still image file in joint photographic experts group (JPEG) format.

Image storing section 220 stores each image file name with a number indicating the order of the acquired time. For example, image storing section 220 gives 0 to the name of the image file obtained at the earliest time, and N to the name of the image file obtained at the latest time. The number given to the file name increases by one every time an additional frame is acquired with the camera.

In the following description, every time image storing section 220 acquires the frames constituting moving images, image storing section 220 outputs a "basic skeleton extraction request" to basic skeleton estimating section 230. The "basic skeleton extraction request" contains the name of the file being a processing object. Image storing section 220 stores the camera parameters at the time of taking images of the person with the camera.

In S102, basic skeleton estimating section 230 detects the basic skeleton of the target person. Specifically, basic skeleton estimating section 230 first receives a "basic skeleton extraction request" from image storing section 220, and reads the image (target image) matching with the file name contained in the "basic skeleton extraction request" out of the images stored in image storing section 220.

Basic skeleton estimating section 230 includes three detectors: a head and shoulder detector, a shoulder joint detector, and a body detector. These detectors perform detection processing using different algorithms (or features).

Each detector detects all the regions that can be of the basic skeleton of the target person from the target images, and outputs the detected regions with the likelihood of the results of the detection. Likelihood is the score representing the probability that the detected regions are of the basic skeleton of the target person. A higher likelihood indicates higher probability on the basic skeleton of the target person.

In basic skeleton estimating section 230, the three detectors are not operated in parallel but in the order of the head and shoulder detector, the shoulder joint detector, and the body detector. The order of the processes of the three detectors is determined based on the features of the detectors.

In a human body, which may be partly hidden by crowdedness or a change in the direction of the face, the most detectable parts (distinctive parts) are the head and shoulders. In particular, the body is often not readily detected from an image of a person overlapping another person. The head and shoulders with a clear contour, however, can be detected even from such an image including a body not readily detected. The algorithm for detection of a head and shoulders is relatively simple and has an advantage of short processing time, in this embodiment, head and shoulders detection process is first performed by the head and shoulder detector.

Upon the determination "not head", "not shoulder", or "not body" by one of the detectors, basic skeleton estimating section 230 ends the detection process and omits the processes by the other detectors. This minimizes the number of operations by the detectors, shortening the time required for the detection process. The process by the shoulder joint detector will be described later.

The body detector has a function of detecting whether a region is a body by reference to the contour or color of the region. Similarly to the algorithm for detection of the head and shoulders, the algorithm for detection of a body is relatively simple and has an advantage of short processing time. The body detector detects the center of gravity, scale, and angle of a body region and writes the results of detection to the basic skeleton information.

Any type (algorithm), number, and order of the detectors may be employed instead of the above ones. For example, a face detector for detecting whether a region is a human face by reference to the features of facial parts may also be used in combination with the detectors.

The detailed algorithm of the detectors and a method for making the detectors may employ known techniques. For example, the detectors are made by learning the tendency of the features by a boosting method such as Real AdaBoost using many sample images (an image showing a head and a shoulder and an image not showing a head or shoulder for the head and shoulder detector). The features may be of any type such as features of histogram of gradient (HoG), Sparse, or Haar. The learning method may be of any type, such as support vector machine (SVM) or neural network, other than a boosting method.

Figure 18:
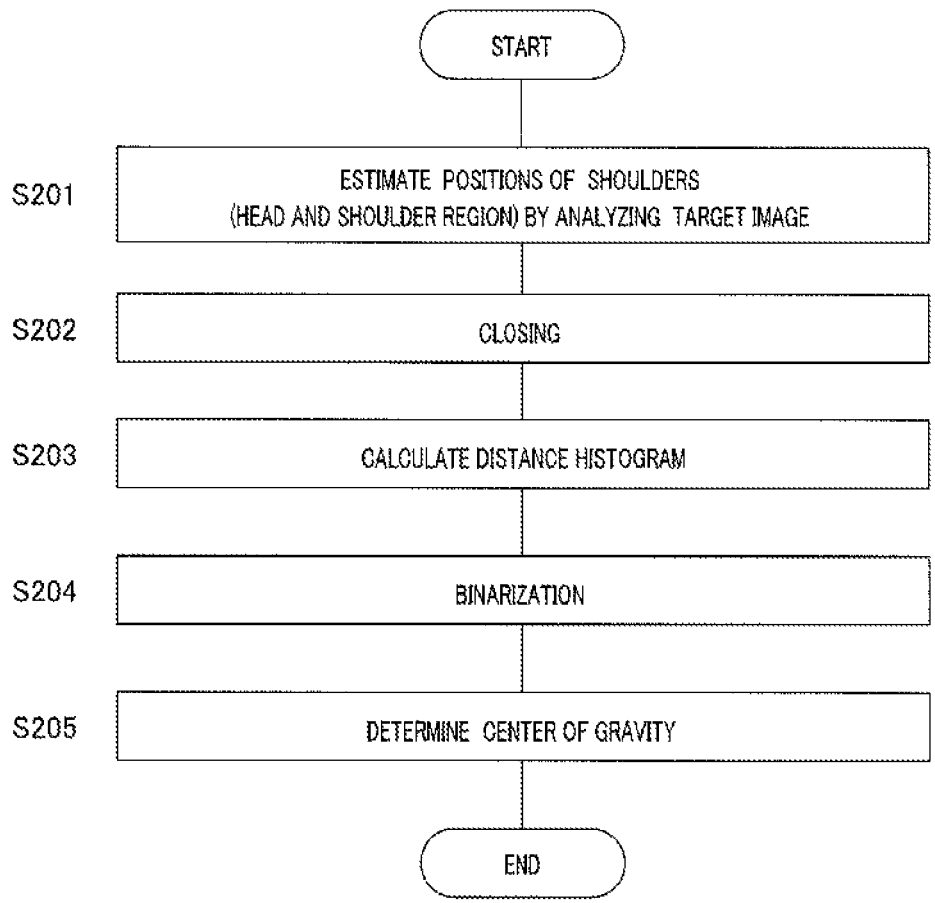
FIG. 18 is an example process flow for a shoulder joint detector.
Figure 19:
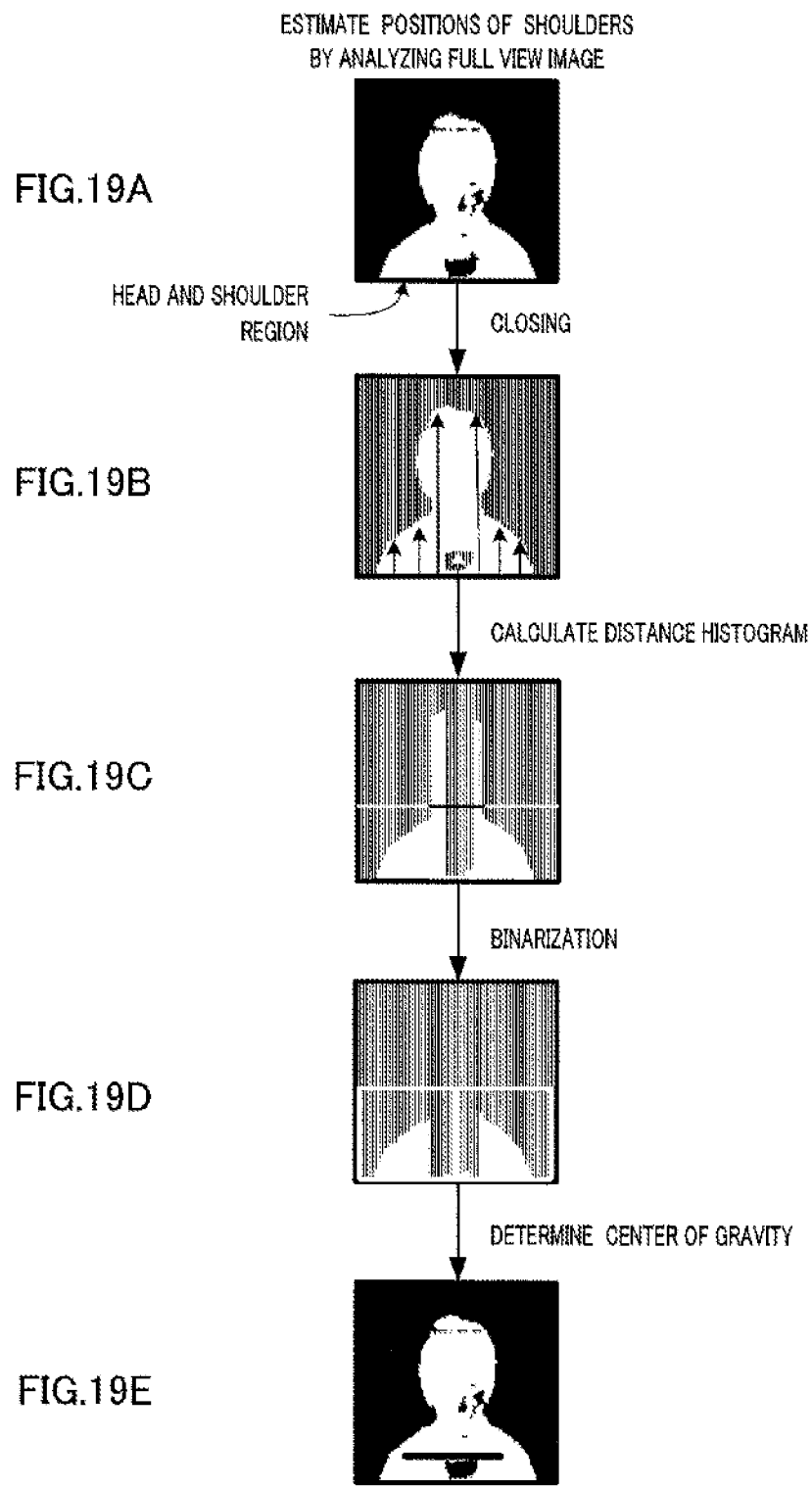
FIG. 19 is a diagram for explaining a method for estimating the positions of shoulder joints with the shoulder joint detector.

With reference to FIGS. 18 and 19, a method will be described for estimating the positions of shoulder joints with the shoulder joint detector. FIG. 18 shows an example process flow of the method for estimating the positions of shoulder joints. FIG. 19 illustrates a target image processed by the method for estimating the positions of shoulder joints.

As described above, the head and shoulder region of the target person has been already calculated with the head and shoulder detector (see S201 and FIG. 19A). In S202, the shoulder joint detector performs closing for scaling the head and shoulder region of the target person by an appropriate number of pixels to remove black noise in a group of white pixels (see FIG. 19B).

In S203, the shoulder joint detector extracts the distances from the bottom of the head and shoulder region of the target person to black pixels in the y-axis direction to create a distance histogram (see FIG. 19C). In S204, the shoulder joint detector binarizes the distance histogram (see FIG. 19D). The binarization may perform based on a predetermined threshold or use so-called Otsu binarization (also referred to as Otsu method).

The Otsu method determines an appropriate threshold for classifying a group of values into two classes. This method determines the threshold to minimize a gap between the values in each class and to maximize a gap between the values in different classes. In order to classify the head region and shoulder region of the target person into two classes, the distance from the bottom of the target image to the shoulder region and the distance from the bottom of the target image to the head region are classified by a given threshold.

In S205, the shoulder joint detector estimates the center of gravity of the white pixels in the left half of the binarized shoulder region as a right-shoulder joint (see FIG. 19E), and the center of gravity of the white pixels in the right half of the binarized shoulder region as a left-shoulder joint.

Basic skeleton estimating section 230 writes the x-coordinates and y-coordinates of the estimated right-shoulder joint and left-shoulder joint to the basic skeleton information.

With the above processes, basic skeleton estimating section 230 estimates the positions of the shoulders and the front direction of the target person as a distinctive part of the target person to create basic skeleton information. After creating the basic skeleton information, basic skeleton estimating section 230 outputs the created basic skeleton information and a "part extraction request" to part extracting section 240, and ends the process flow of the method for estimating the positions of the shoulder joints. Then, the process goes to S103 (see the process flow in FIG. 17).

In S103, receiving the "part extraction request" from basic skeleton estimating section 230, part extracting section 240 estimates a candidate region of a part of the target person. Specifically, part extracting section 240 generates a likelihood map for each part of the target person, the map indicating the probability of the presence of the part.

More specifically, receiving the "part extraction request" from basic skeleton estimating section 230, part extracting section 240 extracts the features for each target mage, and inputs the extracted features to the classifiers. Scale-invariant feature transform (SIFT) features described in NPL 1 or the like is used as a feature. A method using SIFT features can extract a feature point insusceptible to (invariable against) a variation in the scale of an object, the rotation of an object, and parallel shift of an object. The feature point consists of 128-dimensional vectors. The method using SIFT features is particularly effective in detecting a part rotatable in various directions, such as an arm.

There is a conventional technique in which the sum total of the outputs of a plurality of weak classifiers based on rectangle information determined by AdaBoost to make strong classifiers in a cascade, thereby recognizing a face as an object of interest in an image (see NPL 2).

Classifiers Hk (k=1 to 5) are prepared by machine learning for an upper arm (k=1), a forearm (k=2), a body (k=3), an upper leg (k=4), and a lower leg (k=5), respectively. Each classifier Hk is repeatedly generated by an AdaBoost algorithm until it can determine whether or not a target part is an upper arm, a forearm, a body, an upper leg, or a lower leg with a desired accuracy by reference to a plurality of teacher images prepared for each of the parts.

Receiving given features, each classifier Hk sums values obtained by multiplying the outputs of the weak classifiers constituting the classifier Hk by confidences $\alpha$ of the weak classifiers, and calculates likelihood ck by subtracting predetermined threshold Th from the sum. Likelihood ck indicates the probability that a given pixel is a part of a person. Likelihood c1 indicates the likelihood for an upper arm, c2 the likelihood for a forearm, c3 the likelihood for a body, c4 the likelihood for an upper leg, and c5 the likelihood for a lower leg.

The features of the pixels for the target image are input to all classifiers Hk, so that likelihood vector Cij=[c1, c2, c3, c4, c5] for each pixel is output; where i and j of likelihood vector Cij indicate the x-coordinate and y-coordinate of a pixel, respectively. Thus, part extracting section 240 generates a likelihood map for each part.

A method will be described for reducing objects to be input to classifiers Hk. Reducing objects to be input to classifiers Hk reduces calculation load. The following description will focus a method for reducing objects to be input to classifiers Hk on the angle of a joint of a human body.

A joint of a human body does not bend in all directions. A joint of a human body does not readily bend at angles larger than a predetermined angle. This limits the area in which a part connected to the joint is movable (movable range).

For example, FIG. 20 illustrates the movable range of the left-upper arm connected to the left-shoulder joint. FIG. 20A illustrates the movable range of the left-upper arm of the target person facing the front. FIG. 20B illustrates the movable range of the left-upper arm of the target person facing the observer's left. Since the shoulder joint cannot readily bend on the back side, there is a region where the left-upper arm is immovable (in the drawing, the region named "immovable region") as shown in FIG. 20B. The elbow joint, the thigh joint, and the knee joint also have limited movable ranges, and thus immovable regions.

In S102, basic skeleton estimating section 230 has already estimated the positions of the shoulder joints of the target person in the target image and the front direction of the person. A candidate region of an upper arm of the target person is within the movable range of the upper arm with a center at the position of the corresponding shoulder joint.

As shown in FIG. 20, the movable range of a part in the target image varies with the front direction of the target person. The movable range of a part in the target image varying with the front direction of the target person is referred to as "on-screen movable range." As shown in FIG. 20A, the on-screen movable range of the left-upper arm, for example, is the widest when the target person faces the front. In contrast, as shown in FIG. 20B, when the target person faces the observer's left, the arm has an immovable region (the shaded area), and thus the narrowest on-screen movable range. In FIG. 20, the on-screen movable range is represented, as an example, by a circle with a center at the joint connected to the part and a radius equal to the joint length, and a bendable angle of the joint.

Part extracting section 240 calculates an average joint length $B_{AVE}$ for the upper arms, according to Equation 6 using the scale of the body region Sh contained in the basic skeleton information from basic skeleton estimating section 230.

[6]

$$B_{AvE} = aS_h + b \qquad \text{(Equation 6)}$$

Equation 6 shows that the joint length for the arms has a high correlation with the length of the body, and thus can be linearly approximated by the length of the body. Coefficients a and b of Equation 6 are pre-calculated statistically from data of the human body size and held in part extracting section 240.

Part extracting section 240 then uniquely determines the on-screen movable range in the target image from average joint length for the upper arms and the front direction of the target person contained in the basic skeleton information. Part extracting section 240 overlays the positions of the shoulders of the target person contained in the basic skeleton information on the center of the on-screen movable range.

This narrows the search range for the candidate region of the upper arms in the target image. In other words, part extracting section 240 shortens the calculation time by inputting not all the pixels for the target image, but only the pixels within the on-screen movable range to an upper arm classifier to calculate likelihood Ck.

Alternatively, a candidate region where the target person can exist in the target image may be pre-extracted by a known technique such as a background differencing technique. In that case, part extracting section 240 can further shorten the calculation time if the search range for a part is the pixels present in an overlap between the candidate region where the target person can exist and the on-screen movable range.

Thus, part extracting section 240 generates likelihood maps indicating the probability of the existence of the parts, and part region information based on the likelihood map. After creating part region information, part extracting section 240 outputs the part region information and the likelihood maps as well as a "skeleton estimation request" to skeleton estimating section 251. Then, the process goes to S104.

In S104, skeleton estimating section 251 estimates the skeleton of the target person by reference to the part region information from part extracting section 240.

This embodiment describes one of the estimation methods for skeleton estimating section 251, including estimation of two joint positions and then a joint position therebetween.

For example, skeleton estimating section 251 estimates the positions of a shoulder and a corresponding wrist, and then the position of the elbow therebetween from their positions. Alternatively, skeleton estimating section 251 estimates the positions of a thigh and the corresponding heel, and then the position of the corresponding knee from their positions.

Figure 21:
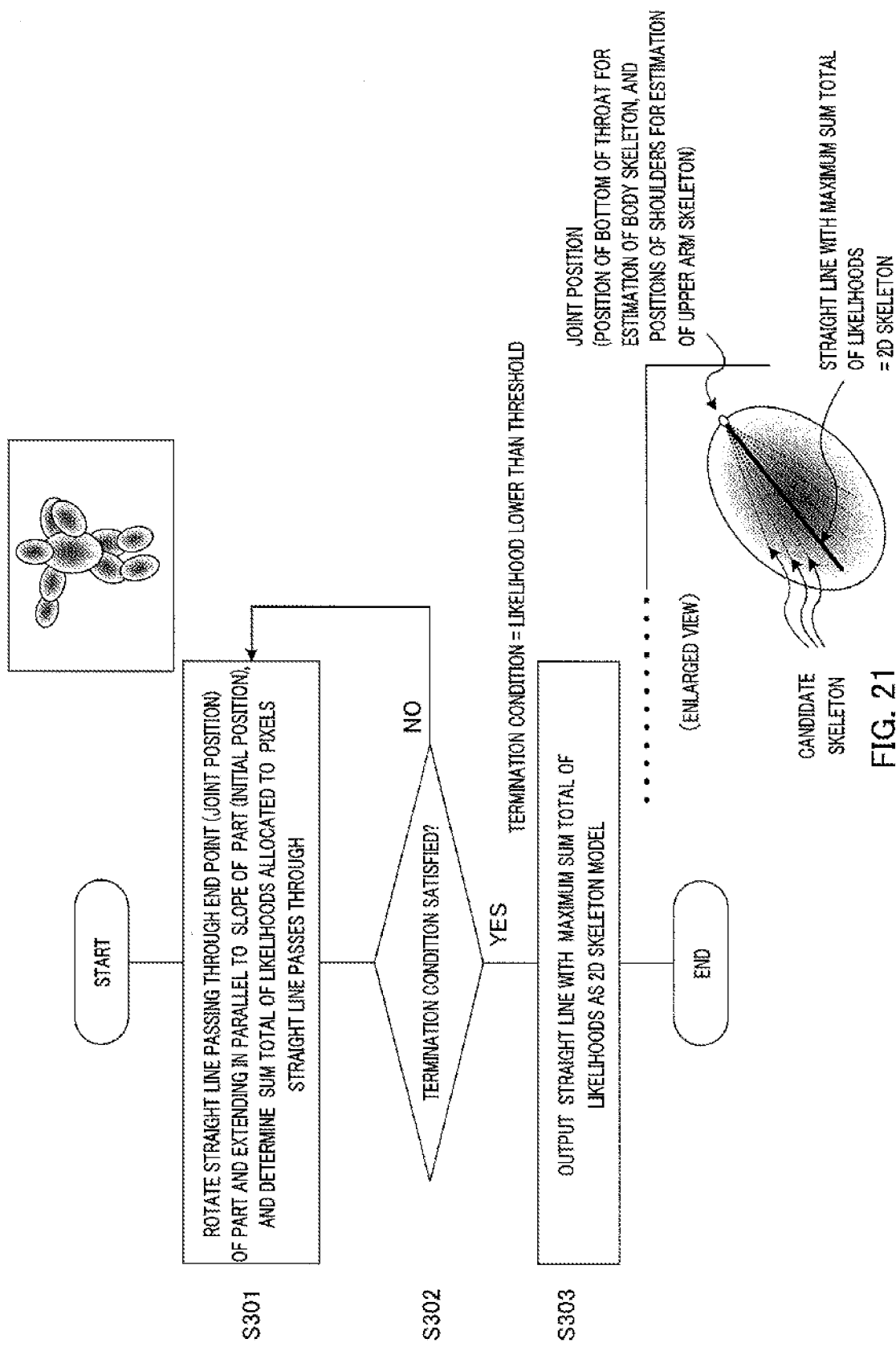
FIG. 21 is a diagram for explaining a method for creating skeleton information with a skeleton estimating section.

FIG. 21 is a diagram illustrating an example process flow of skeleton estimation by skeleton estimating section 251.

Position of Shoulders

The positions of the shoulders have been estimated in S102.

Positions of Wrists

For a wrist, skeleton estimating section 251 extracts an intersection point of a side of the right forearm in the horizontal scale and a straight line passing through the center of gravity of the right forearm contained in part region information from part extracting section 240 and extending in parallel to a side of the right forearm in the vertical scale. There are two intersection points. Skeleton estimating section 251 detects a hand region and determines the intersection point closer to the hand region as the position of the right wrist of the target person. For detection of the hand region, skeleton estimating section 251 may use a skin color extraction using the HSV color system in common use. Skeleton estimating section 251 determines the position of the left wrist in a similar manner.

Positions of Elbows

After the determination of the positions of the shoulders and the wrists, skeleton estimating section 251 rotates a straight line passing through an end point (joint position) of a part and extending in parallel to the slope of the part (the initial position) by an angle θ to a shoulder. Skeleton estimating section 251 then determines the sum total of likelihoods for the parts allocated to the pixels the straight line passes through.

Similarly, skeleton estimating section 251 rotates a straight line passing through an end point (joint position) of a part and extending in parallel to the slope of the part (the initial position) by an angle θ to a wrist. Skeleton estimating section 251 then determines the sum total of likelihoods for the parts allocated to the pixels the straight line passes through.

An intersection point of a straight line extending from a shoulder and a straight line extending from a wrist is a candidate position of the elbow. Skeleton estimating section 251 determines the sum total of likelihoods for the pixels on the straight line corresponding to the shortest path between the shoulder, the candidate position of the elbow, and the wrist. The position of the elbow is determined from the combination of the positions of the shoulder, elbow, and wrist that gives the maximum sum total of the likelihoods.

Positions of Heels

Skeleton estimating section 251 extracts an intersection point of a side of the right-lower leg in the horizontal scale and a straight line passing through the center of gravity of the right-lower leg contained in part region information and extending in parallel to a side of the right-lower leg in the vertical scale. There are two intersection points. Since the heel is estimated to be close to the ground, skeleton estimating section 251 determines the intersection point with a larger y-coordinate as the position of the right heel of the target person. Skeleton estimating section 251 determines the position of the left heel in a similar manner.

Positions of Thighs

Skeleton estimating section 251 extracts an intersection point of a side of the right-upper leg in the horizontal scale and a straight line passing through the center of gravity of the right-upper leg contained in part region information and extending in parallel to a side of the right-upper leg in the vertical scale. There are two intersection points. Since the thigh is estimated to be far from the ground, skeleton estimating section 251 determines the intersection point with a smaller y-coordinate as the position of the right thigh of the target person. Skeleton estimating section 251 determines the position of the left thigh in a similar manner.

Positions of Knees

Skeleton estimating section 251 estimates the position of a knee from the results of estimation of the positions of a heel and a thigh as the section estimates the position of an elbow from the results of estimation of the positions of a shoulder and a wrist.

Positions of Neck and Hip

Skeleton estimating section 251 estimates a point at the middle of a straight line connecting the positions of the shoulders estimated in S102 as the position of the neck. Skeleton estimating section 251 also estimates a point at the middle of a straight line connecting the positions of the thighs estimated in the aforementioned method as the position of the hip.

As described above, in S104, the positions of the neck, elbows, wrists, hip, thighs, knees, and heels are estimated in addition to the positions of the shoulders determined in S102 to create skeleton information.

After creating the skeleton information, skeleton estimating section 251 outputs skeleton information and a "skeleton model description conversion request" to skeleton model description converting section 252. Then, the process goes to S105.

In S105, skeleton model description converting section 252 calculates a relative joint length and a joint angle based on the shoulders for each part. The following shows the flow of a process performed by skeleton model description converting section 252.

Receiving the skeleton information and the "skeleton model description conversion request" from skeleton estimating section 251, skeleton model description converting section 252 creates skeleton model description information, using the Equations 1 to 4 with the joint position coordinates contained in the skeleton information. This procedure creates skeleton model description information expressing a target skeleton model.

After creating the skeleton model description information, skeleton model description converting section 252 outputs the skeleton model description information expressing the target skeleton model and a "skeleton model matching request" to similar skeleton model selecting section 255. Then, the process goes to S106.

In S106, similar skeleton model selecting section 255 estimates the pose of the target person. Specifically, similar skeleton model selecting section 255 receives the "skeleton model matching request" from skeleton model description converting section 252. Similar skeleton model selecting section 255 then repeats the evaluation of matching the skeleton model description information from skeleton model description converting section 252 with the similar skeleton information stored in similar skeleton model storing section 254. Matching evaluation may employ, for example, Equation 5. In that case, a lower value of Equation 5 indicates a higher matching evaluation. Similar skeleton model selecting section 255 estimates a all skeleton, model associated with the similar skeleton information with the highest matching evaluation as the pose of the target person.

Upon completion of the marching evaluation, similar skeleton model selecting section 255 outputs an "estimation results display request" and the 3D skeleton model associated with the similar skeleton information with the highest matching evaluation to operation controlling section 210.

Figure 22:
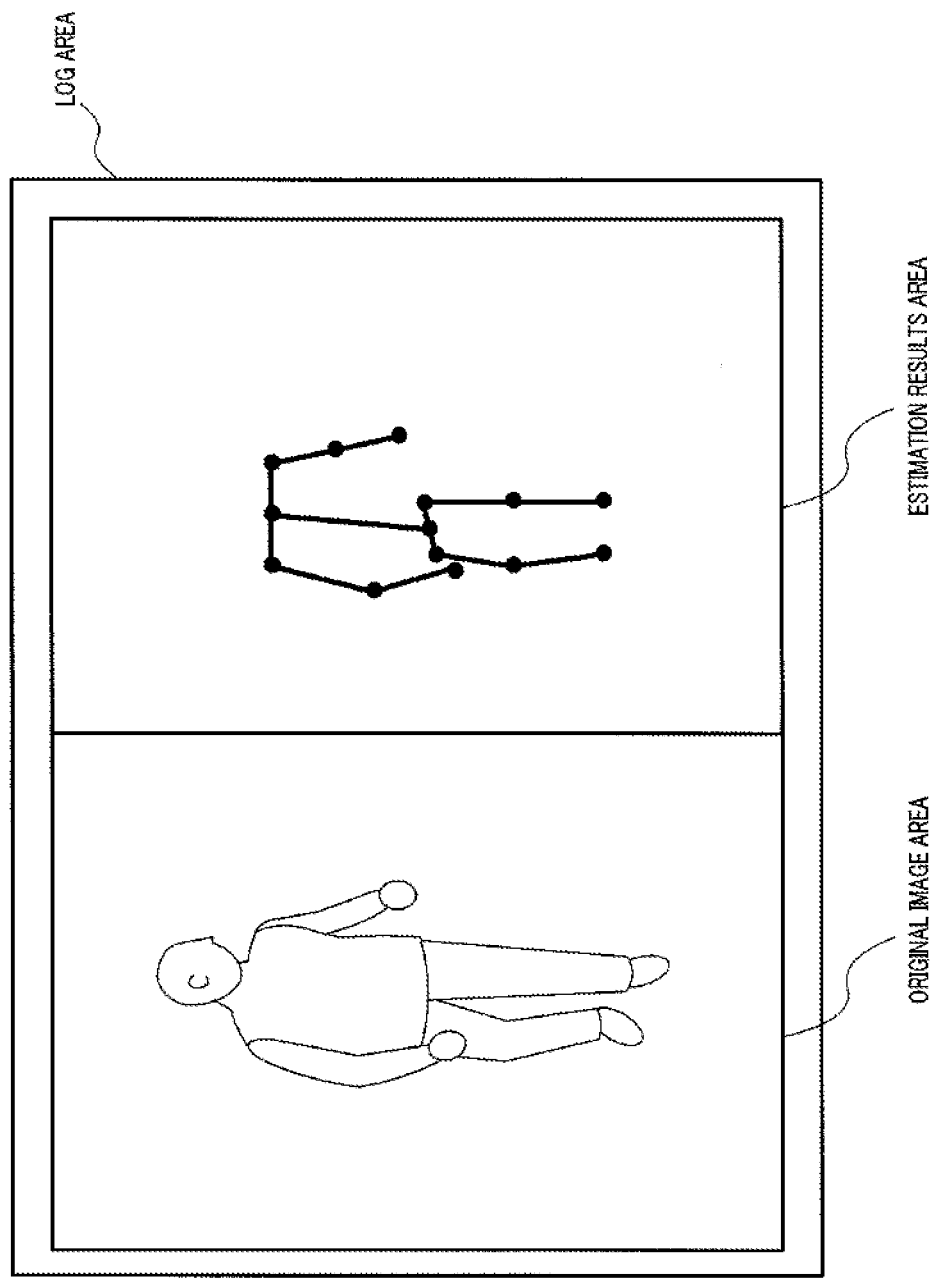
FIG. 22 is a diagram illustrating an example display of the results of estimation.

Operation controlling section 210 receives the 3D skeleton model, i.e., the results of the estimated pose of the target person and the "estimation results display request" from similar skeleton model selecting section 255. Operation controlling section 210 then displays the target image in the original image area within a log area, and the 3D skeleton model from similar skeleton model selecting section 255 in a estimation result area within the log area as shown in FIG. 22.

The estimated 3D skeleton model has joints each defined by a 3D position (an x-coordinate, y-coordinate, and z-coordinate) and a rotation angle. The user can therefore visually recognize various presentations of the 3D skeleton model provided by various camera views, by rotating the 3D skeleton model by mouse operation within the estimation result area (not shown).

When the user clicks the "end" button through the input device, operation controlling section 210 closes the operation screen and pose estimating apparatus 200 stops the operation.

As described above, pose estimating apparatus 200 in this embodiment can express the pose of the target person in a 2D skeleton model. Pose estimating apparatus 200 evaluates similarity between the pose of the target person and each of the prepared 2D skeleton models associated with various poses, and estimates the pose of the most similar 2D skeleton model as the pose of the target person.

In particular, in pose estimating apparatus 200 according to this embodiment, similar skeleton model storing section 254 stores the similar skeleton information with an associated 3D skeleton model. Each piece of similar skeleton information is generated by projective conversion of a 3D skeleton model into a 2D skeleton model. Target skeleton model forming section 253 composed of skeleton estimating section 251 and skeleton model description converting section 252 creates skeleton model description information expressing the target skeleton model, using the likelihood map.

Similar skeleton model selecting section 255 selects the most similar skeleton information as a 2D skeleton model corresponding to the pose of the target person, based on the similarity between each piece of similar skeleton information and the skeleton model description information expressing the target skeleton model. The similar skeleton information is associated with 3D skeleton models in various poses, allowing pose estimating apparatus 200 to estimate the pose of the target person.

Thus, this embodiment expresses the pose of the target person in a simplified 2D skeleton model with parameters composed of a relative joint length and a joint angle. This enables the use of similarity evaluation by comparison between simple parameters instead of expensive computational similarity evaluation by comparison between images, as typified by silhouette matching. In addition, scale-free matching is achieved regardless of information on the depth of the target person with respect to the position of the camera, which is not readily estimated from monocular camera images.

Basic skeleton estimating section 230 is designed to estimate the positions of the shoulders and front direction of the target person in initial steps of the pose estimation process. Basic skeleton estimating section 230 is also designed to limit the search ranges for freely movable arms or legs, by applying kinematic limitations or knowledge obtained from statistics on human body dimension, to the process performed by part extracting section 240 in the subsequent stage. This leads to high-speed operation.

Similar skeleton model selecting section 255 may perform matching evaluation with only one object being similar skeleton information corresponding to a 3D skeleton model with positions of the shoulders, i.e., the distinctive parts and front direction matching with those of the person, to select a skeleton model corresponding to the pose of the target person. This narrows the list of candidates for matching evaluation, leading to high-speed processing.

Embodiment 2

Pose estimating apparatus according to Embodiment 1 estimates the pose of the target person based on the similarity between similar skeleton information and skeleton model description information. As described above, similar skeleton information is generated by projective conversion of a predetermined 3D skeleton model into a 2D skeleton model. Skeleton model description information corresponds to a target skeleton model formed based on likelihood maps.

A pose estimating apparatus according to Embodiment 2 of the present invention superimposes a 2D skeleton model resulting from projective conversion of a predetermined 3D skeleton model on likelihood maps indicating the probability of the presence of the parts of the target person. The pose estimating apparatus according to this embodiment then estimates the pose of the target person based on the sum total of the likelihoods held in the pixels present in an overlap between the 2D skeleton model and the likelihood map.

Figure 23:
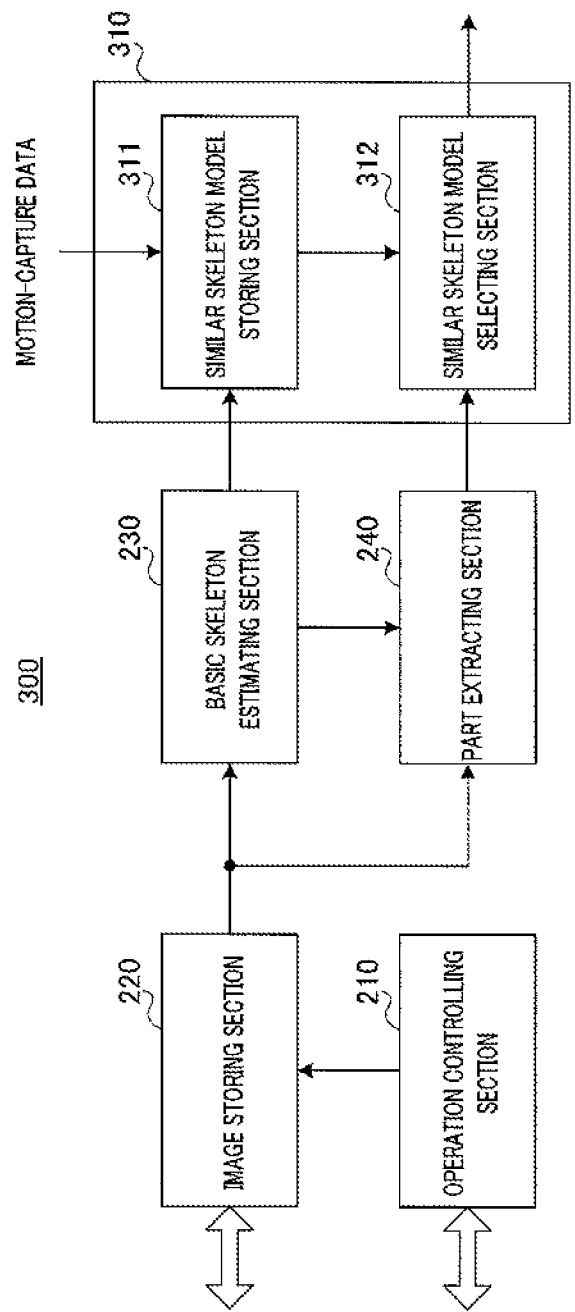
FIG. 23 is a block diagram of main components of a pose estimating apparatus according to Embodiment 2.

FIG. 23 is a block diagram of main components of a pose estimating apparatus according to this embodiment. Pose estimating apparatus 300 in FIG. 23 is applied to the pose estimating apparatus 110 in FIG. 3. The components common to FIG. 23 and FIG. 4 are denoted by the same reference numerals without duplicated description.

Pose estimating apparatus 300 in FIG. 23 differs from pose estimating apparatus 200 in FIG. 4 in that it includes skeleton model evaluating section 310 in place of skeleton model evaluating section 250.

In this embodiment, part extracting section 240 outputs only a likelihood map to skeleton model evaluating section 310. In other words, part extracting section 240 does not output the part region information to skeleton model evaluating section 310. This indicates that, in this embodiment, part extracting section 240 may generate only the likelihood map without extraction of the part region information.

Skeleton model evaluating section 310 includes similar skeleton model storing section 311 and similar skeleton model selecting section 312.

As described above, similar skeleton model storing section 254 in Embodiment 1 generates a 2D skeleton model from a 3D skeleton model using the camera parameters at the time of taking moving images stored in image storing section 220.

In contrast, similar skeleton model storing section 311 in this embodiment varies the camera parameters for projection so as to make the shoulder line of the target person parallel to the shoulder line of a 2D skeleton model. The shoulder line of the target person is estimated by basic skeleton estimating section 230. The shoulder line of a 2D skeleton model results from the 2D projection of a 3D skeleton model. This forms a 2D skeleton model with a shoulder line parallel to the shoulder line of the target person estimated by basic skeleton estimating section 230, and generates the skeleton model description information expressing the formed 2D skeleton model.

Similar skeleton model storing section 311 preliminarily 3D skeleton models expressing various poses in consideration of body shape difference or pose difference, for example, by motion-capture technology. Similar skeleton model storing section 311 then subjects the preliminarily acquired 3D skeleton model to 2D projection to form the corresponding 2D skeleton model and generate and store the skeleton model description information expressing the formed 2D skeleton model.

Similar skeleton model storing section 311 also calculates ratio S of the length of the shoulder line of the target person estimated by basic skeleton estimating section 230 to the length of the shoulder line of the 2D skeleton model expressed by the stored skeleton model description information. Similar skeleton model storing section 311 multiplies the 2D skeleton model by the calculated ratio S to all the joint lengths to scale the 2D skeleton model. Ratio S is a parameter to match the length of the shoulder line of the target person with the length of the shoulder line of the 2D skeleton model. Similar skeleton model storing section 311 stores the skeleton model description information expressing the obtained 2D skeleton model.

Similar skeleton model selecting section 312 estimates the pose of the target person based on the likelihood maps obtained by part extracting section 240 and the skeleton model description information stored in similar skeleton model storing section 311.

Specifically, similar skeleton model selecting section 312 superimposes all the 2D skeleton models expressed by the skeleton model description information stored in similar skeleton model storing section 311 on the likelihood maps respectively. Similar skeleton model selecting section 312 calculates the sum total of the likelihoods held in the pixels in an overlap, and selects the 2D skeleton model with the highest score as a 2D skeleton model corresponding to the pose of the target person. An estimating method for similar skeleton model selecting section 312 will be described later.

Figure 24:
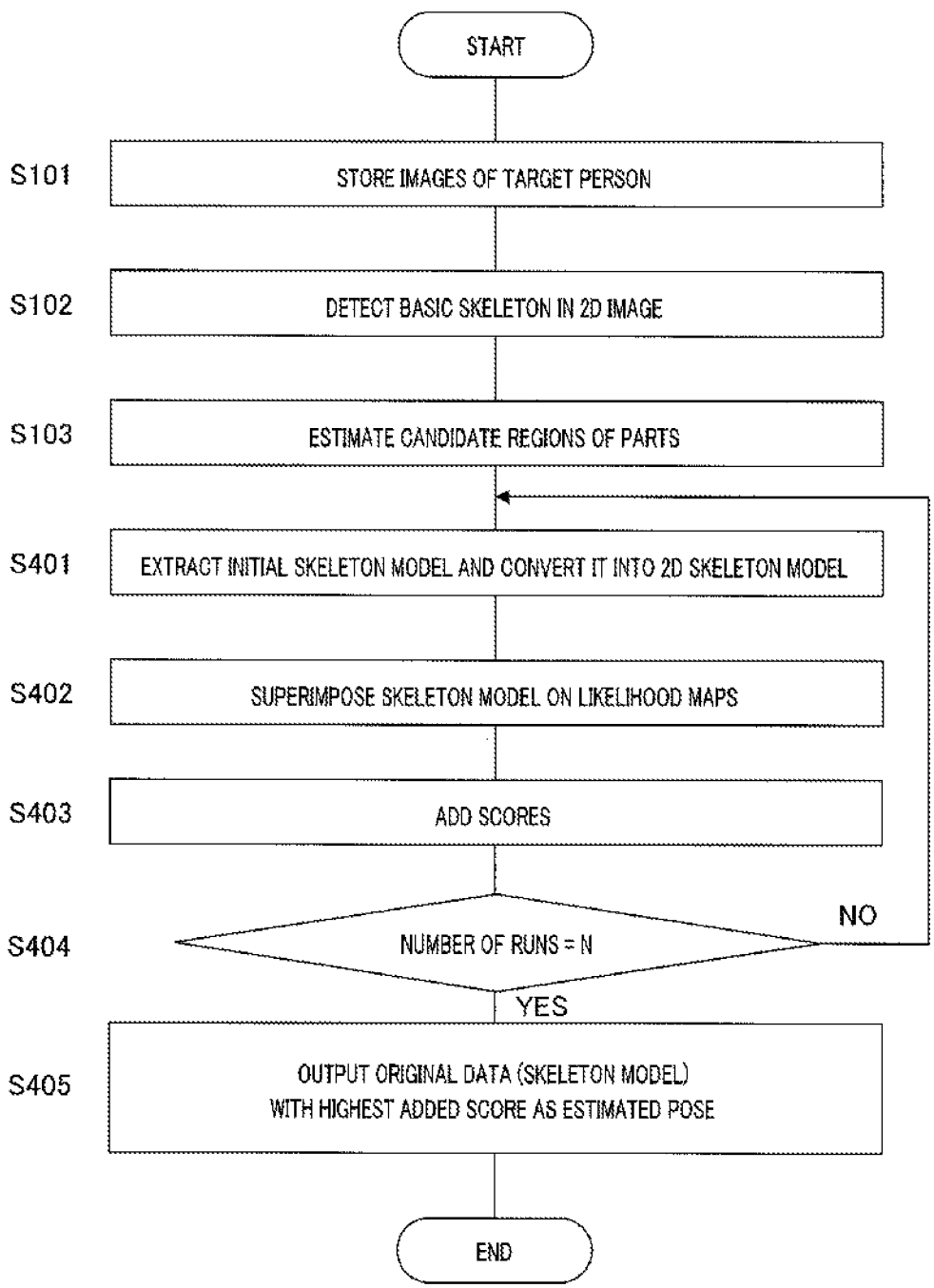
FIG. 24 is an example process flow for an estimation processing apparatus according to Embodiment 2.

The operation of pose estimating apparatus 300 with such a configuration is now described with reference to the process flow in FIG. 24. The steps common to FIG. 24 and FIG. 17 are denoted by the same reference numerals without duplicated description.

In S101, images of the target person are stored in image storing section 220. In S102, basic skeleton estimating section 230 estimates the shoulder line and front direction of the target person. In S103, part extracting section 240 estimates the regions for the parts of the target person.

In S401, similar skeleton model storing section 311 extracts one of the preliminarily acquired 3D skeleton models and subjects it to 2D projection so as to make its shoulder line parallel to the shoulder line of the target person estimated by basic skeleton estimating section 230, forming the corresponding 2D skeleton model. Similar skeleton model storing section 311 then scales all the 2D skeleton models such that their shoulder lines have the same length as the shoulder line of the target person, and stores the skeleton model description information expressing the scaled 2D skeleton models. Then, the process goes to S402.

In S402, skeleton model evaluating section 310 superimposes the 2D skeleton model expressed by the skeleton model description information stored in similar skeleton model storing section 311 on the likelihood maps obtained by part extracting section 240. In the likelihood maps, the pixels hold the respective likelihoods output from the classifiers Hk as scores.

After S401, the 2D skeleton model expressed by the skeleton model description information stored in similar skeleton model storing section 311 is formed so as to have a shoulder line parallel to and having the same length as that of the target person. Similar skeleton model selecting in 312 matches the position of the shoulder joint of the 2D skeleton model expressed by the skeleton model description information stored in similar skeleton model storing section 311 with the position of the shoulder joint of the target person. Thus, similar skeleton model selecting section 312 can superimpose the 2D skeleton model expressed by the skeleton model description information stored in similar skeleton model storing section 311 on the likelihood maps. After similar skeleton model selecting section 312 completes superimposition on the likelihood maps, the process goes to S403.

In S403, similar skeleton model selecting section 312 calculates the score equal to the sum total of the likelihoods held in the pixels overlapping the superimposed 2D skeleton model. Similar skeleton model selecting section 312 then records the score associated with the 3D skeleton model selected in S401 as likelihood added information.

In the above description, similar skeleton model selecting section 312 records a score equal to the sum total of the likelihoods of all the parts of the target person as the likelihood added information, but the score is just an example. For pose estimation focusing on the arms, for example, similar skeleton model selecting section 312 may record the sum total of the likelihoods of parts corresponding to the upper body as a score or calculate the score by weighting only the likelihoods for the arms.

After similar skeleton model selecting section 312 completes recording of the likelihood added information, the process goes to S404.

In S404, similar skeleton model selecting section 312 determines whether all the 3D skeleton models acquired by similar skeleton model storing section 311 have undergone the steps S401 to S403. If not all the 3D skeleton models have undergone these steps, the process returns to S401 where skeleton model evaluating section 310 starts evaluation for the next 3D skeleton model.

The 2D skeleton models expressing another 3D pose are predetermined skeleton models consisting of N patterns with arms, legs, or other parts positioned differently from the initial skeleton model. Similar skeleton model selecting section 312 therefore repeats evaluation N times to retrieve a skeleton model with the most similar pose to the target person from the 2D skeleton models stored in similar skeleton model storing section 311.

After evaluation of all the 3D skeleton models, similar skeleton model selecting section 312 estimates the 3D skeleton model with the highest score as the pose of the target person by reference to the likelihood added information in S405.

As described above, in this embodiment, skeleton model evaluating section 310 superimposes a sealed 2D skeleton model resulting from 2D projection of a 3D skeleton model on likelihood maps, and calculates the score equal to the sum total of the likelihoods of each of the human body parts. Skeleton model evaluating section 310 then outputs a 2D skeleton model with the highest score or a 3D skeleton model corresponding to the 2D skeleton model as the pose of the target person.

Specifically, similar skeleton model storing section 311 subjects a preliminarily acquired 3D skeleton model to 2D projection so as to make its shoulder line parallel to the shoulder line of the target person, forming a 2D skeleton model corresponding to the 3D skeleton model. The shoulder line of the target person is estimated by basic skeleton estimating section 230. Similar skeleton model storing section 311 then scales the 2D skeleton model so as to match the length of the shoulder line of the 2D skeleton model and the length of the shoulder line of the target person, and stores the skeleton model description information expressing the sealed 2D skeleton model.

Similar skeleton model selecting section 312 superimposes the 2D skeleton model expressed by the skeleton model description information stored in similar skeleton model storing section 311 on the likelihood maps. Similar skeleton model selecting section 312 then selects a 2D skeleton mode, based on the score equal to the sum total of the likelihoods held in the pixels present in an overlap between the 21) skeleton model and the likelihood maps, and estimates the pose of the 3D skeleton model corresponding to the 2D skeleton model as of the target person.

Similarly to Embodiment 1, this embodiment expresses the pose of the target person in a simplified 2D skeleton model with parameters composed of a relative joint length and a joint angle. This enables similarity evaluation by comparison between simple parameters instead of expensive computational similarity evaluation by comparison between images, as typified by silhouette matching. In addition, scale-free matching is achieved regardless of information on the depth of the target person with respect to the position of the camera, which is not readily estimated from monocular camera images.

In this embodiment, the process of S401 by similar skeleton model storing section 311 is performed as appropriate before the process of S402, but all of the preliminarily acquired 3D skeleton models can be projected and sealed during the first run of S401. In this case, the process returns to the step prior to S402 if S404 outputs "No".

Embodiment 3

Embodiments 1 and 2 describe methods for estimating the pose of the target person every frame. The pose estimating apparatus according to Embodiment 1 estimates the pose of the target person in the acquired image, based on the similarity between the similar skeleton information and the skeleton model description information (hereinafter also referred to as bottom-up method). As described above, the similar skeleton information is generated by projective conversion of the predetermined 3D skeleton model into a 2D skeleton model. The skeleton model description information corresponds to the target skeleton model formed from the likelihood maps. The pose estimating apparatus according to Embodiment 2 superimposes the 2D skeleton model formed by 2D projection and scaling of the preliminarily acquired 3D skeleton model on the likelihood maps. The pose estimating apparatus according to Embodiment 2 then estimates the pose of the target person, based on the score equal to the sum total of the likelihoods held in the pixels overlapping the 2D skeleton model (hereinafter also referred to as top-down method).

This embodiment describes a method including storage of the results of 3D pose estimations for the target person for every frame and utilization of the relative joint lengths calculated from the stored results of estimation. A first version will be described which employs the bottom-up method described in Embodiment 1 for estimation of the 3D pose of the target person for every frame and the following evaluation of the skeleton model.

Figure 25:
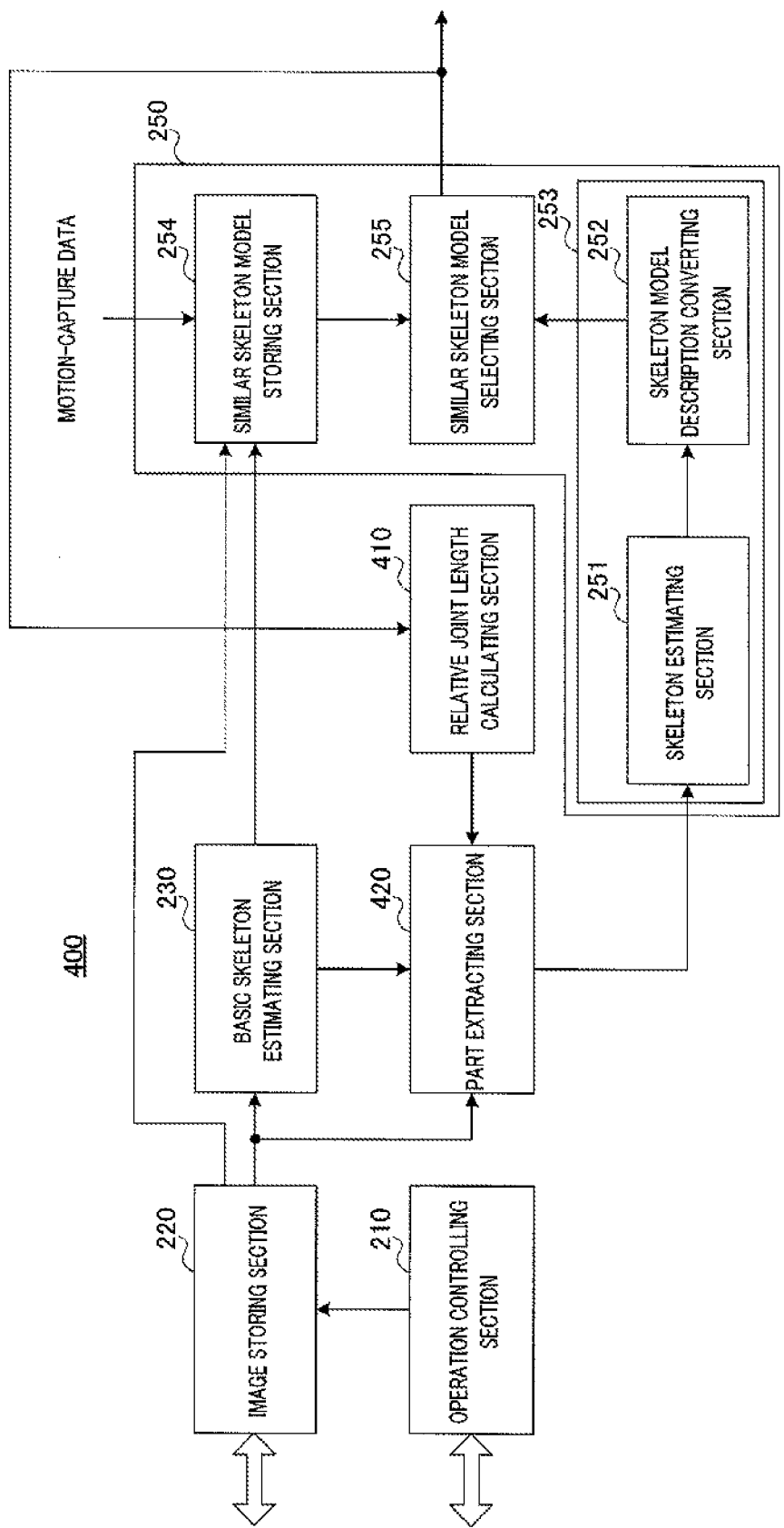
FIG. 25 is a block diagram of main components of a pose estimating apparatus according to Embodiment 3 of the present invention.

FIG. 25 is a block diagram of main components of a pose estimating apparatus according to an embodiment of the present invention. A pose estimating apparatus 400 in FIG. 25 is applied to the pose estimating apparatus 110 in FIG. 3. The components common to the pose estimating apparatus according to this embodiment in FIG. 25 and the pose estimating apparatus in FIG. 5 are denoted by the same reference numerals without duplicated description.

The pose estimating apparatus 400 in FIG. 25 differs the pose estimating apparatus 200 in FIG. 5 in that it includes part extracting section (likelihood map generating section) 420 in place of part extracting section 240 and further includes relative joint length calculating section 410.

Relative joint length calculating section 410 holds the results for every frame of estimation for one target person, a plurality of 3D poses, and "smoothes" the relative joint lengths for the target person in interval T.

Relative joint length calculating section 410 acquires the results of estimation for every frame, i.e., the 3D pose from the output of similar skeleton model selecting section 255. In this case, relative joint length calculating section 410 calculates the relative joint lengths for the target person from a 3D skeleton model associated with the similar skeleton information that similar skeleton model selecting section 255 (skeleton model evaluating section 250) selects as a 2D skeleton model corresponding to the pose of the target person. A method for smoothing the relative joint lengths will be described later.

After smoothing the relative joint lengths, relative joint length calculating section 410 outputs the smoothed relative joint lengths (hereinafter referred to as "representative relative joint lengths") and notification of the completion of smoothing to part extracting section 420.

Similarly to part extracting section 240, part extracting section 420 generates likelihood maps indicating the probability of the presence of the parts of the target person other than the distinctive parts, based on the positions of the shoulders, i.e., the distinctive parts of the target person.

Part extracting section 420 has a smoothing completion flag indicating the completion of the smoothing. Receiving the notification of the completion of smoothing from relative joint length calculating section 410, part extracting section 420 switches the smoothing completion flag from OFF to ON.

If the smoothing completion flag is OFF, similarly to part extracting section 240, part extracting section 420 generates a likelihood map for each part using the average joint length calculated by Equation 6. In contrast, if the smoothing completion flag is ON, part extracting section 420 limits the search range in the target image input to each of the classifiers included in part extracting section 420, based on the positions of the distinctive parts, the front direction, and the representative relative joint lengths of the target person, and generates likelihood maps in the limited search range.

Figure 26:
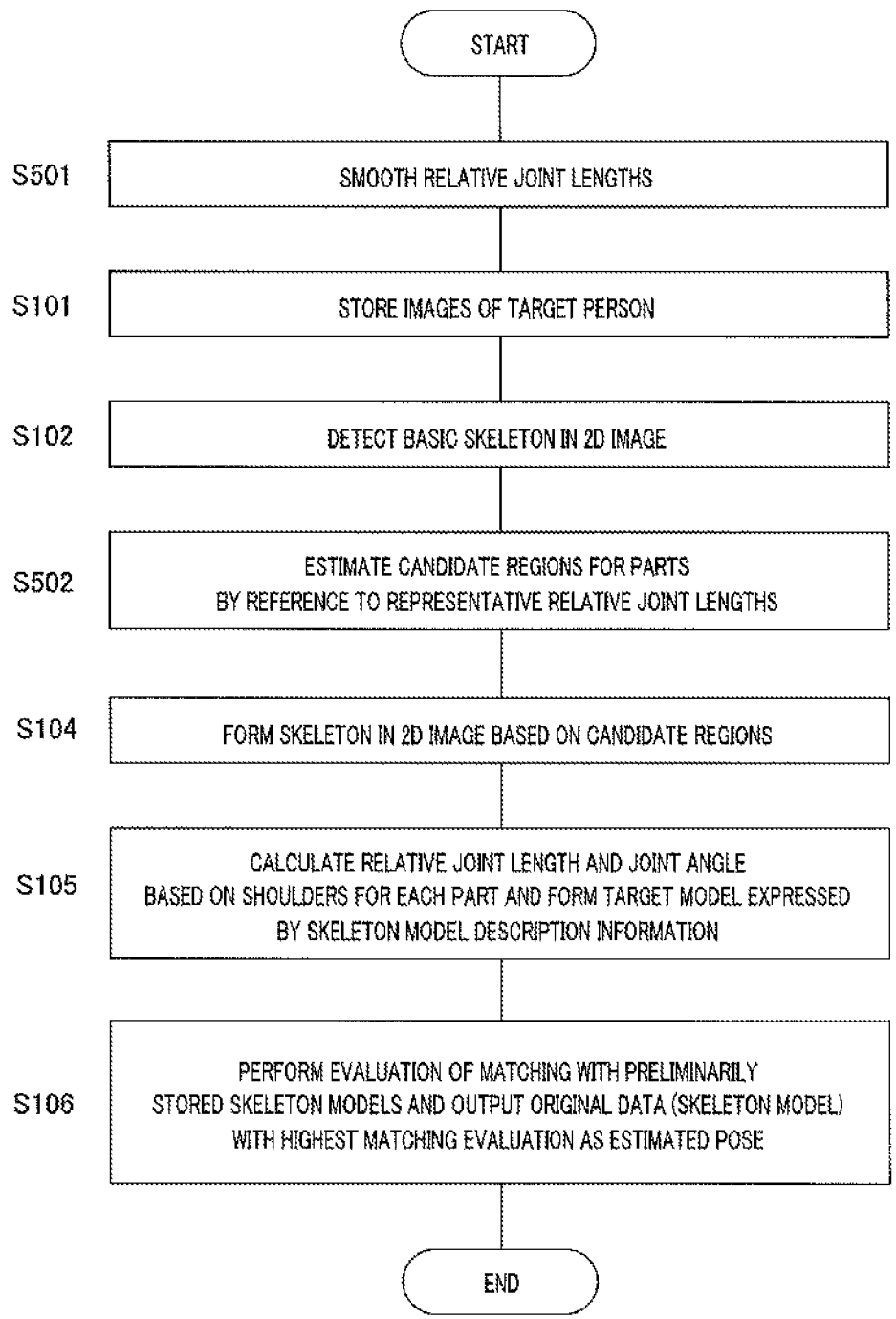
FIG. 26 is an example process flow for an estimation processing apparatus according to Embodiment 3.

The operation of pose estimating apparatus 400 with such a configuration is now described with reference to the process flow in FIG. 26. The steps common to FIG. 26 and FIG. 17 are denoted by the same reference numerals without duplicated description.

In S501, relative joint length calculating section 410 holds a plurality of 3D poses, i.e., the results of estimation for every frame for one target person, and "smoothes" the relative joint lengths of the target person in interval T using the 3D poses. Smoothing is to calculate optimum representative relative joint length $V_{Ave}$ for the target person from a plurality of relative joint length vector V within interval T; where relative joint length vector $V_i$ represents the relative joint lengths for the 3D pose of the target person in a frame corresponding to image file number $N_i$ at time i. The relative joint length vector is based on the ratio of the length of a straight line connecting two joints to the shoulder line length, e.g., on those in the table in FIG. 14, such as the relative joint length of the straight line connecting the left shoulder and the right shoulder and the relative joint length of the straight line connecting the right shoulder and the right elbow.

In the following description, relative joint length calculating section 410 extracts representative relative joint length $V_{Ave}$ from relative joint length vectors for image file numbers $N_0$ to $N_5$.

Smoothing may be carried out by either a statistical process or classification based on previous knowledge. When relative joint length calculating section 410 employs a statistical process for smoothing, the average calculated by Equation 7 is determined as the representative relative joint length.

[7]

$$V_{AVE} = \Sigma_{i=0}^{5} V_i \quad \text{(Equation 7)}$$

Relative joint length calculating section 410 may extract representative relative joint, length $V_{Ave}$ using the human body dimension data as previous knowledge. For example, relative joint length calculating section 410 calculates the relative joint lengths for the target person from the height of the human body or the dimensional data containing the lengths of the parts of the human body, and puts these relative joint lengths into a data set. Relative joint length calculating section 410 can classify the data set into K classes by a known technique called K-Means. Relative joint length calculating section 410 acquires main data in each of the K classes, the main data being a representative example for each class. A representative example refers to a representative relative joint length vector for each class.

Relative joint length calculating section 410 may determine which class includes relative joint length vector $V_i$ estimated from the target image, or which one of the classes containing $V_0$ to $V_5$ includes the largest number of $V_i$, based on majority role. Relative joint length calculating section 410 may then determine a representative example associated with the determined class as $V_{Ave}$.

After smoothing the relative joint lengths, relative joint length calculating section 410 outputs the notification of the completion of smoothing to part extracting section 420 to permit it to extract the parts using representative relative joint length $V_{Ave}$.

Receiving the notification of the completion of smoothing from relative joint, length calculating section 410, part extracting section 420 switches its smoothing completion flag ON which indicates the completion of smoothing.

After the smoothing completion flag is switched ON, in the subsequent S101 and S102, the basic skeleton of the target person is detected.

In S502, if the smoothing completion flag is ON, part extracting section 420 limits the search range in the target image to be input to each of the classifiers included in part extracting section 420, based on representative relative joint length $V_{Ave}$ of the target person estimated by relative joint length calculating section 410. Part extracting section 420 then generates likelihood maps in the limited search range.

If the smoothing completion flag is OFF, similarly to Embodiment 1, part extracting section 420 extracts the parts by using the average joint length calculated by Equation 6, through the same process as that for part extracting section 240.

After part extracting section 420 extracts the parts, skeleton model evaluating section 250 evaluates the skeleton model to estimate the pose, through the steps S104 to S106.

As described above, relative joint length calculating section 410 calculates, for each target image (frame), the relative joint lengths each indicating the ratio of the length between a pair of parts (joint length) to the length between the shoulders being distinctive parts, from the 3D skeleton model associated with the similar skeleton information. Relative joint length calculating section 410 calculates the representative relative joint lengths by smoothing the relative joint length for each joint length in a plurality of target images. The similar skeleton information is, as described above, selected by skeleton model evaluating section 250 as a 2D skeleton model corresponding to the pose of the target person.

Part extracting section 420 then limits the search range in the target image input to each of the classifiers included in part extracting section 420, based on the positions of the distinctive parts, the front direction, and the representative relative joint lengths of the target person, and generates likelihood maps in the limited search range. This allows stable 3D pose estimation regardless of variations, such as illumination variation and occlusion, which may cause variations in the results of estimation of the 3D pose between frames.

In the above description, relative joint length calculating section 410 calculates the relative joint lengths from the 3D pose estimated by the bottom-up method described in Embodiment 1, and also estimates the following 3D pose by the bottom-up method, but this is just an example.

For example, relative joint length calculating section 410 may calculate the relative joint lengths from the 3D pose estimated by the top-down method described in Embodiment 2, and also estimate the following 3D pose by the top-down method. This case will be described below.

Figure 27:
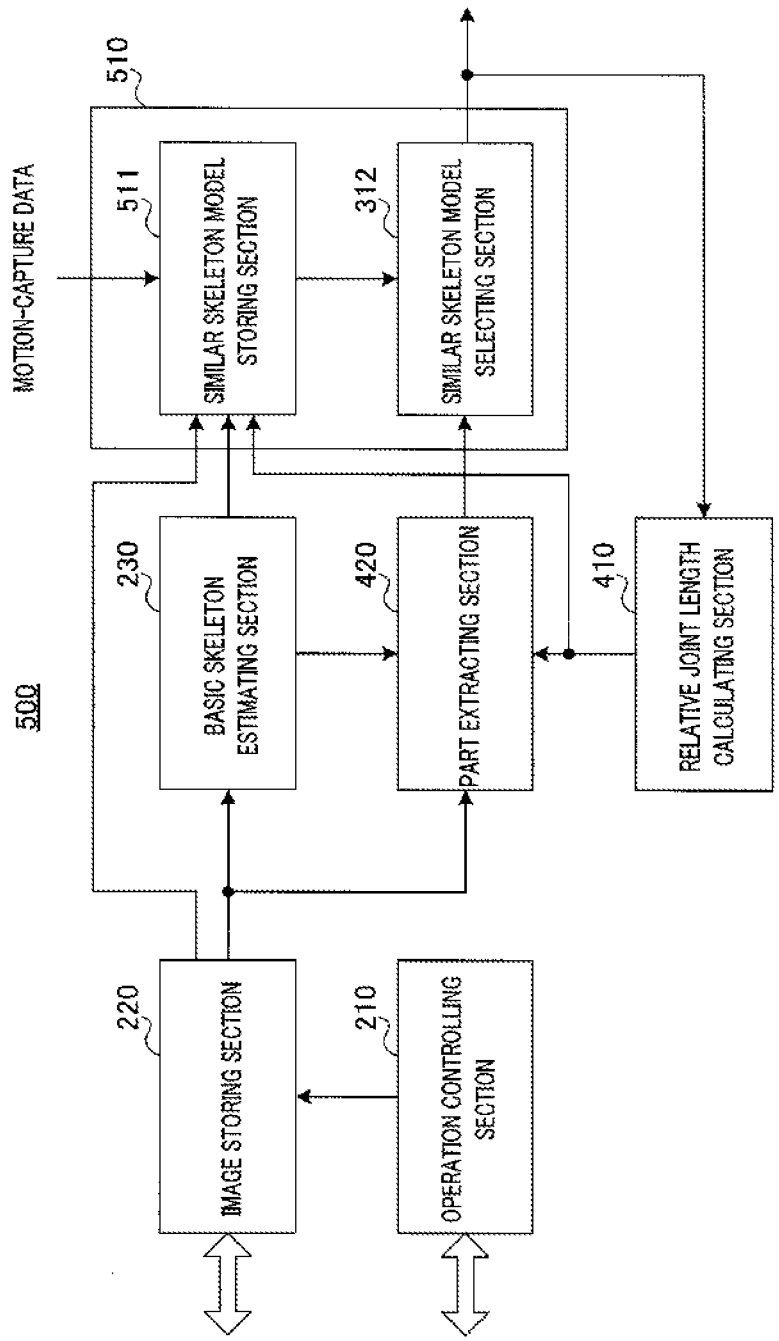
FIG. 27 is a block diagram of other main components of the pose estimating apparatus according to Embodiment 3.

FIG. 27 is a block diagram of main components of another pose estimating apparatus according to the embodiment of the present invention. The components common to FIG. 27 and FIGS. 23 and 25 are denoted by the same reference numerals without duplicated description.

Pose estimating apparatus 500 in FIG. 27 differs from pose estimating apparatus 300 in FIG. 23 in that it includes part extracting section 420 and skeleton model evaluating section 510 in place of part extracting section 240 and skeleton model evaluating section 310. Skeleton model evaluating section 510 includes similar skeleton model storing section 511 and similar skeleton model selecting section 312.

In pose estimating apparatus 500, relative joint length calculating section 410 outputs the acquired representative relative joint lengths to part extracting section 420 and similar skeleton model storing section 511.

Similarly to similar skeleton model storing section 311, similar skeleton model storing section 511 subjects a preliminarily acquired 3D skeleton model to 2D projection so as to make the shoulder line of the target person parallel to the shoulder line of a 2D skeleton model, forming the corresponding 2D skeleton model. Similar skeleton model storing section 511 narrows the list of 3D skeleton models to subject to projective conversion with the representative relative joint lengths of the target person. Specifically, similar skeleton model storing section 511 subjects only 3D skeleton models having relative joint lengths matching with representative relative joint lengths to 2D projective conversion, forming the corresponding 2D skeleton model.

Similar skeleton model storing section 511 scales the formed 2D skeleton model so as to match the length of the shoulder line of the target person and the length of the shoulder line of the 2D skeleton model. This narrows the list of candidates for a 2D skeleton model for the pose of the target person in the acquired image, lowering the matching calculation load in similar skeleton model selecting section 312 in the subsequent stage.

Figure 28:
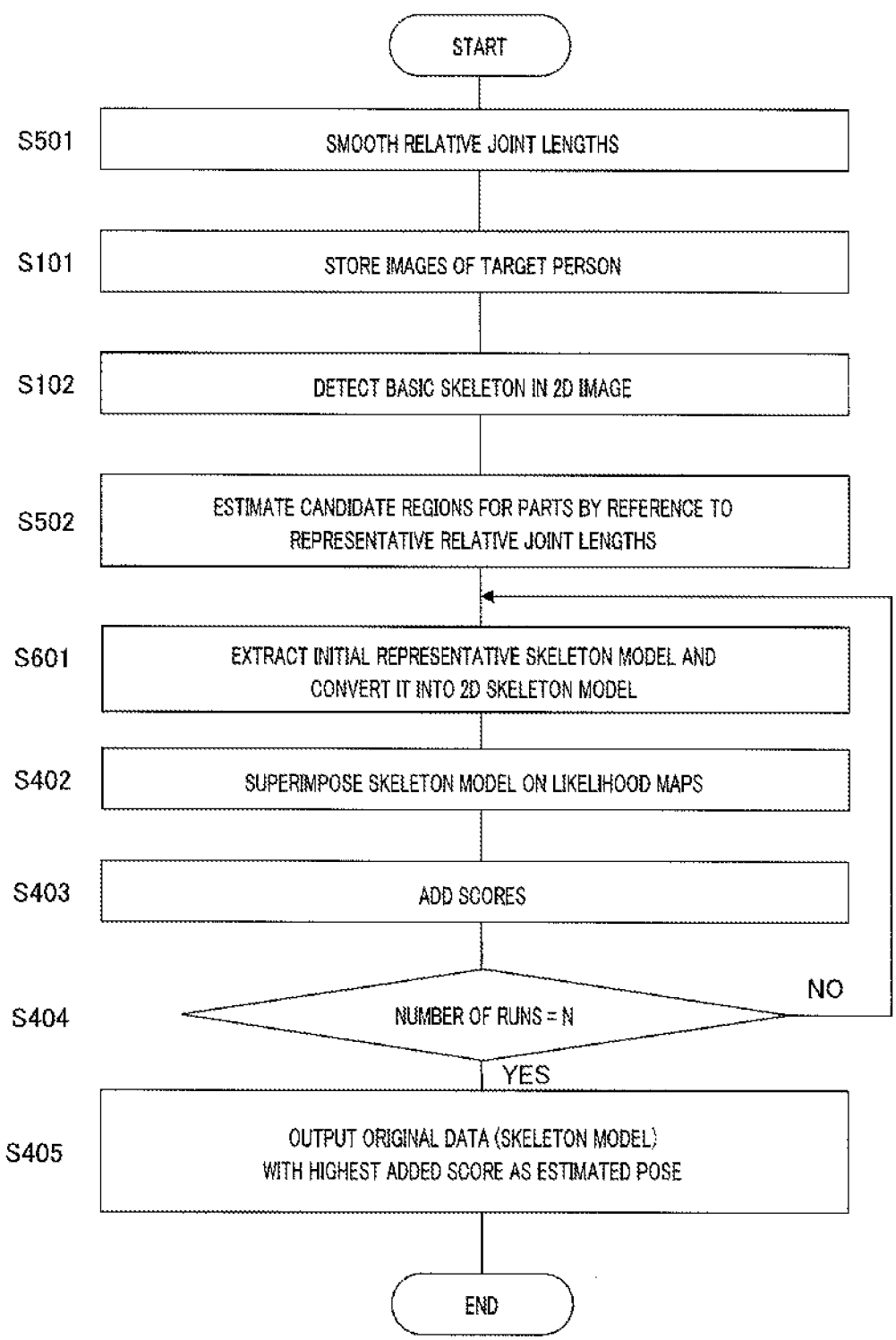
FIG. 28 is another example process flow for the estimation processing apparatus according to Embodiment 3.

The operation of pose estimating apparatus 500 with such a configuration is now described with reference to the process flow in FIG. 28. The steps common to FIG. 28 and FIG. 17, 24 or 26 are denoted by the same reference numerals without duplicated description, and an additional step S601 will be described.

In S601, similar skeleton model storing section 511 selects one of the preliminarily acquired 3D skeleton models that has relative joint lengths matching with representative relative joint lengths (hereinafter referred to as "representative skeleton model"). Similar skeleton model storing section 511 then varies the camera parameters for projection for the selected representative skeleton model so as to make the shoulder line of the target person estimated by basic skeleton estimating section 230 parallel to the shoulder line of the representative skeleton model.

Similar skeleton model storing section 511 calculates ratio S of the length of the shoulder line of the target person to the length of the shoulder line of the representative skeleton model, and multiplies the representative skeleton model by ratio S to all the joint lengths to scale the representative skeleton model.

Similar skeleton model storing section 511 then subjects the scaled representative skeleton model to 2D projection with the varied camera parameters to form a 2D skeleton model. Then, the process goes to S402.

The following process is similar to the corresponding process in Embodiment 2. Similar skeleton model selecting section 312 superimposes the 2D skeleton model formed by projective conversion of the initial skeleton model on the likelihood maps (S402). Similar skeleton model selecting section 312 then calculates the score equal to the sum total of the likelihoods held in the pixels present in an overlap between the 2D skeleton model and the likelihood maps (S403). Similar skeleton model selecting section 312 then records the score associated with the representative skeleton model selected in S401 as likelihood added information.

In the above description, similar skeleton model selecting section 312 records a score equal to the sum total of the likelihoods of all the parts of the target person as the likelihood added information, but the score is just an example. For pose estimation focusing on the arms, for example, similar skeleton model selecting section 312 may record the sum total of the likelihoods of parts corresponding to the upper body as a score or calculate the score by weighting only the likelihoods for the arms.

After similar skeleton model selecting section 312 completes recording of the likelihood added information, the process goes to S404. In S404, if not all the representative skeleton models have undergone these steps, the process returns to S401 where skeleton model evaluating section 510 starts evaluation for the next representative skeleton model.

After evaluation of all the representative skeleton models, similar skeleton model selecting section 312 estimates the representative skeleton model with the highest score as the pose of the target person by reference to the likelihood added information in S405.

As described above, similar skeleton model storing section 511 determines a 2D skeleton model corresponding to one of the stored 3D skeleton models that has relative joint lengths matching with representative relative joint lengths (a representative skeleton model), as an estimated candidate for the pose of the target person. This narrows the list of candidates, lowering the calculation load in similar skeleton model selecting section 312.

Similarly to similar skeleton model storing section 511, similar skeleton model storing section 254 in pose estimating apparatus 400 may narrow the list of 3D skeleton models to subject to projective conversion with the representative relative joint lengths. This narrows the list of candidates, lowering the calculation load in similar skeleton model selecting section 255.

Embodiments 1 and 2 may be used in combination. For example, the method described in Embodiment 1 is applied to some frames immediately after the detection of the target person for pose estimation, while the method described in Embodiment 2 is applied to frames after a time interval T from the detection. In other words, relative joint length calculating section 410 may use the 3D pose of the target person estimated by skeleton model evaluating section 250 according to Embodiment 1 for the calculation of the relative joint lengths, and the following 3D poses may be estimated by skeleton model evaluating section 510.

Alternatively, relative joint length calculating section 410 may use the 3D pose estimated by skeleton model evaluating section 310 according to Embodiment 2 for the calculation of the relative joint lengths, and the following 3D poses of the target person may be estimated by skeleton model evaluating section 250.

Embodiment 4

In Embodiments 1 to 3, the pose estimating apparatus includes classifiers for identifying the upper arm, forearm, body, upper leg, and lower leg of the target person, and estimates the pose of the target person based on the part region information or likelihood maps generated with the classifiers. In this embodiment, the pose estimating apparatus approximates the upper arm, forearm, body, upper leg, and lower leg of the target person by a pair of parallel straight lines, and estimates the pose of the target person based on the part region information or likelihood maps created with rectangular filters for detecting predetermined parallel straight lines.

Figure 29:
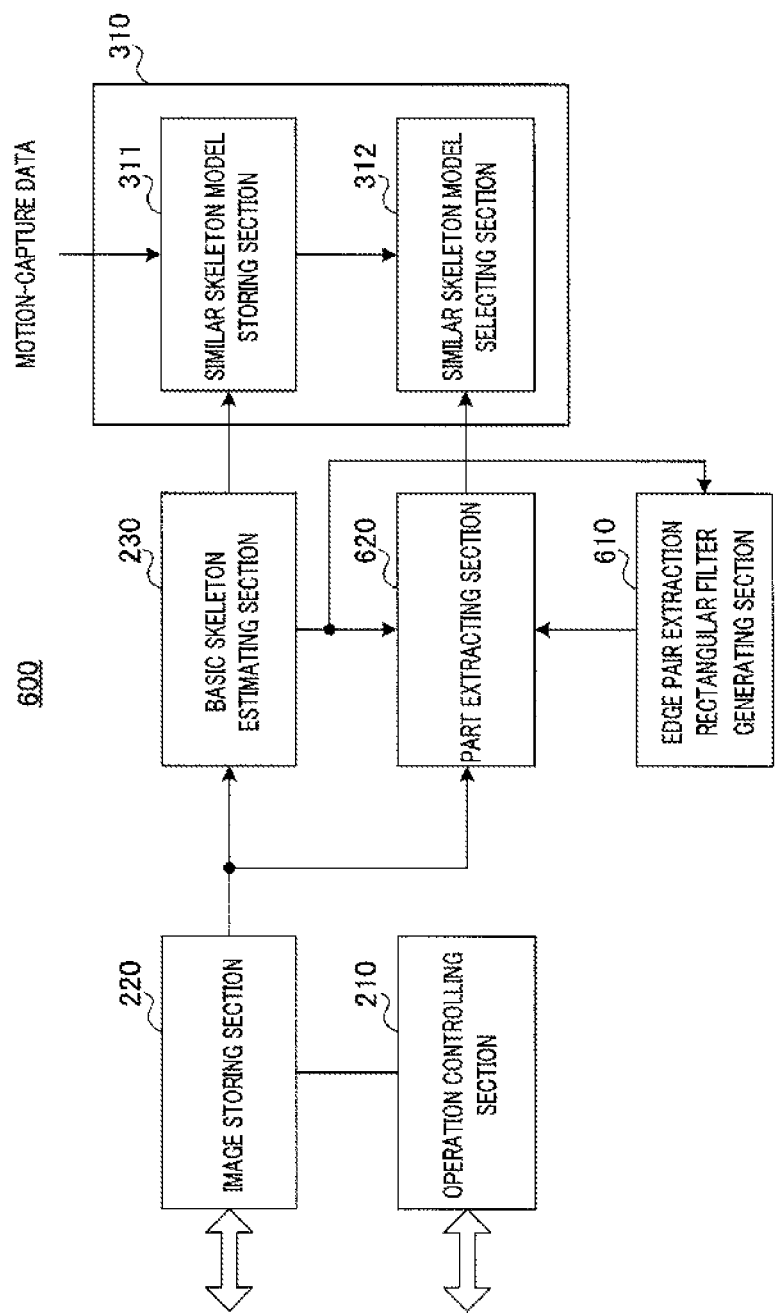
FIG. 29 is a block diagram of main, components of a pose estimating apparatus according to Embodiment 4.

FIG. 29 is a block diagram of main components of a pose estimating apparatus according to this embodiment. Pose estimating apparatus 600 in FIG. 29 is applied to pose estimating apparatus 110 in FIG. 3. The components common to pose estimating apparatus 600 according to this embodiment in FIG. 29 and the pose estimating apparatus in FIG. 23 are denoted by the same reference numerals without duplicated description.

The pose estimating apparatus 600 in FIG. 29 differs from the pose estimating apparatus 300 in FIG. 23 in that it includes part extracting section (likelihood map generating section) 620 in place of part extracting section 240 and includes edge pair extraction rectangular filter generating section 610.

Edge pair extraction rectangular filter generating section 610 generates rectangular filters for edge pair extraction, based on the basic skeleton information for the target person acquired by basic skeleton estimating section 230. The rectangular filters for edge pair extraction are used to detect parallel lines holding the interfilter distance and the rectangular filter scale which vary between parts other than the distinctive parts depending on the direction given by quantizing the direction of the edge gradient with a predetermined constant. The details will be described later.

Part extracting section 620 generates likelihood maps indicating the probability of the presence of the parts other than the distinctive parts, using rectangular filters for edge pair extraction. (hereinafter simply referred to as "rectangular filters") generated by edge pair extraction rectangular filter generating section 610, based on the basic skeleton information for the target person acquired by basic skeleton estimating section 230. The details will be described later.

Figure 30:
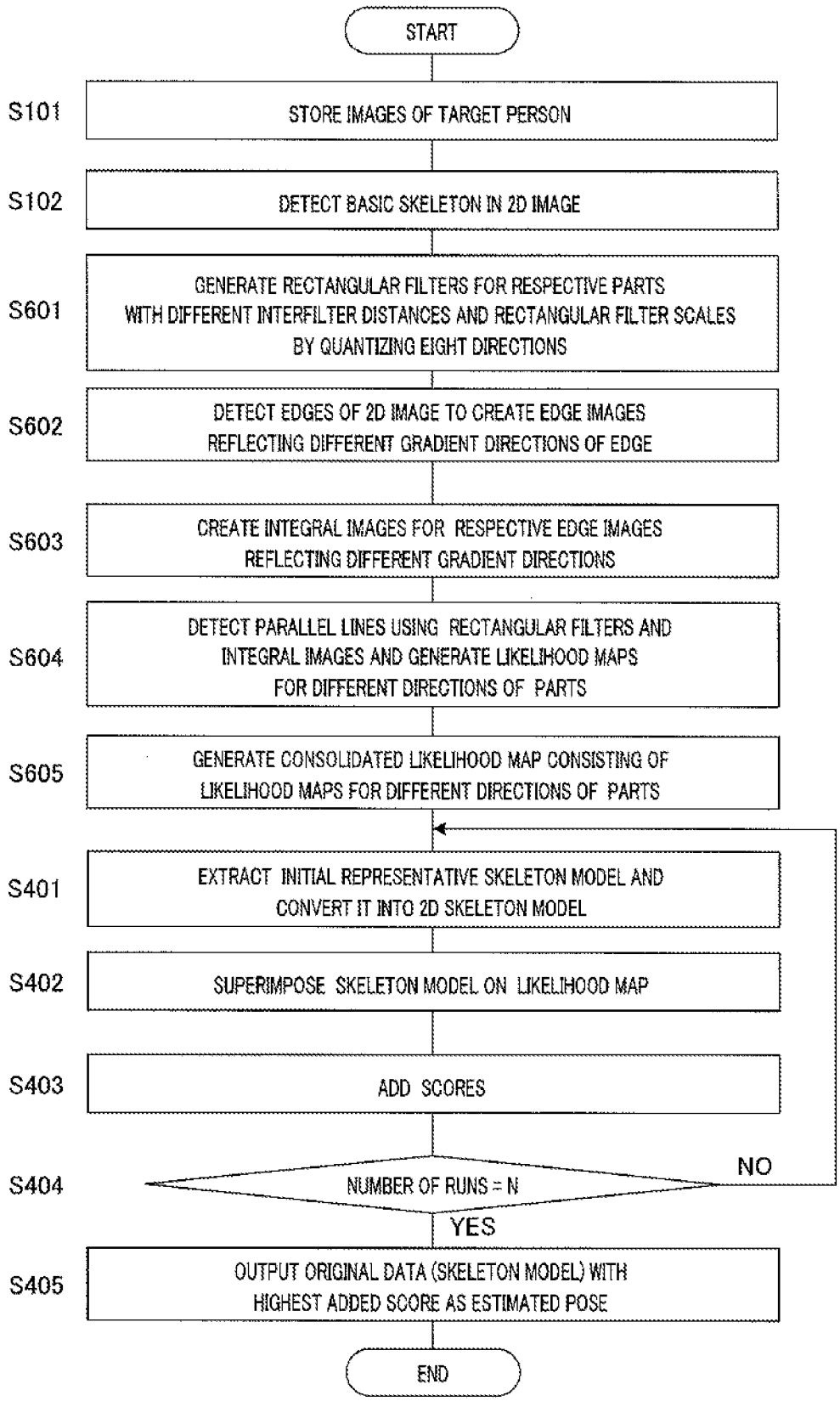
FIG. 30 is an example process flow for an estimation processing apparatus according to Embodiment 4.

The operation of pose estimating apparatus 600 with such a configuration is now described with reference to the process flow in FIG. 30. The steps common to FIG. 30 and FIG. 24 are denoted by the same reference numerals without duplicated description.

In S101, target images of the target person are stored in image storing section 220. In S102, basic skeleton estimating section 230 estimates the shoulder line and front direction of the target person.

In S601, edge pair extraction rectangular filter generating section 610 sets different parameters for the respective parts, the parameters being rectangular filter scales a and b and the interfilter distance d of a rectangular filter in FIG. 31A (see FIG. 31C). The section 610 also creates rectangular filters in different directions obtained by quantizing the direction of the edge gradient with a predetermined constant, shown in FIGS. 32A and 32B.

The interfilter distance refers to the length between a pair of rectangular regions in a rectangular filter. The rectangular filter scales refer to the lengths of vertical and horizontal sides of each rectangular region. Edge pair extraction rectangular filter generating section 610 can determine the rectangular filter scales a and b and the interfilter distance d using the ratio of the height of each part to the shoulder width and the ratio of the width of each part to the shoulder width (see FIG. 31C) preliminarily acquired, for example, using a public database on human body dimension, and the shoulder width of the target person acquired by basic skeleton estimating section 230.

Edge pair extraction rectangular filter generating section 610 quantizes eight directions of the edge gradient to create rectangular filters. The rectangular filter scales and the interfilter distance may be set, for example, to common values, rather than different values, to all the parts.

After generating the rectangular filters in such a manner, edge pair extraction rectangular filter generating section 610 outputs the rectangular filters to part extracting section 620. The process then goes to S602.

In S602, part extracting section 620 detects edges of target image I and calculates the edge strengths m and gradient directions θ to create edge images for the respective gradient directions. The edge detection may be achieved by any known algorithm such as Sobel filter. Gradient direction θ is calculated and quantized by Equations 8-1 to 8-3 with respect to eight directions. Edge strength in is calculated by Equations 8-1, 8-2, 8-3 and 8-4.

An edge image for each gradient direction consists of a group of pixels having the same gradient direction selected from pixels as edges detected by the edge detection algorithm. In the case where the direction of the edge gradient is quantized with respect to eight directions, eight edge images are created.

[8]

$$I_x = I(u+1, v) - I(u, v) \quad \text{(Equation 8-1)}$$

$$I_y = I(u, v+1) - I(u, v) \quad \text{(Equation 8-2)}$$

$$\theta = \tan^{-1}\frac{I_y}{I_x} \quad \text{(Equation 8-3)}$$

$$m = \sqrt{I_x^2 + I_y^2} \quad \text{(Equation 8-4)}$$

In S603, part extracting section 620 creates integral images for the respective eight edge images. A method will be described with reference to FIGS. 33 to 36 for creating integral images of the edge images for the gradient directions.

As shown in FIGS. 33 to 36, an integral image has the same size as an edge image and consists of pixels each having a value equal to the sum of the pixel values of the pixels included in particular region R of the edge image. In the drawings, $P_A$ denotes the intersection of a side of the image area and a straight line parallel to the direction of the edge gradient passing through target position $P_C$ in the edge image, and $P_B$ denotes the intersection of a side of the image area and a straight line perpendicular to the direction of the edge gradient passing through target position $P_C$. In this case, region R refers to an overlap among a negative region for a straight line passing through $P_A$ and $P_C$, a negative region for a straight line passing through $P_B$ and $P_C$, and the image area.

Figure 33:
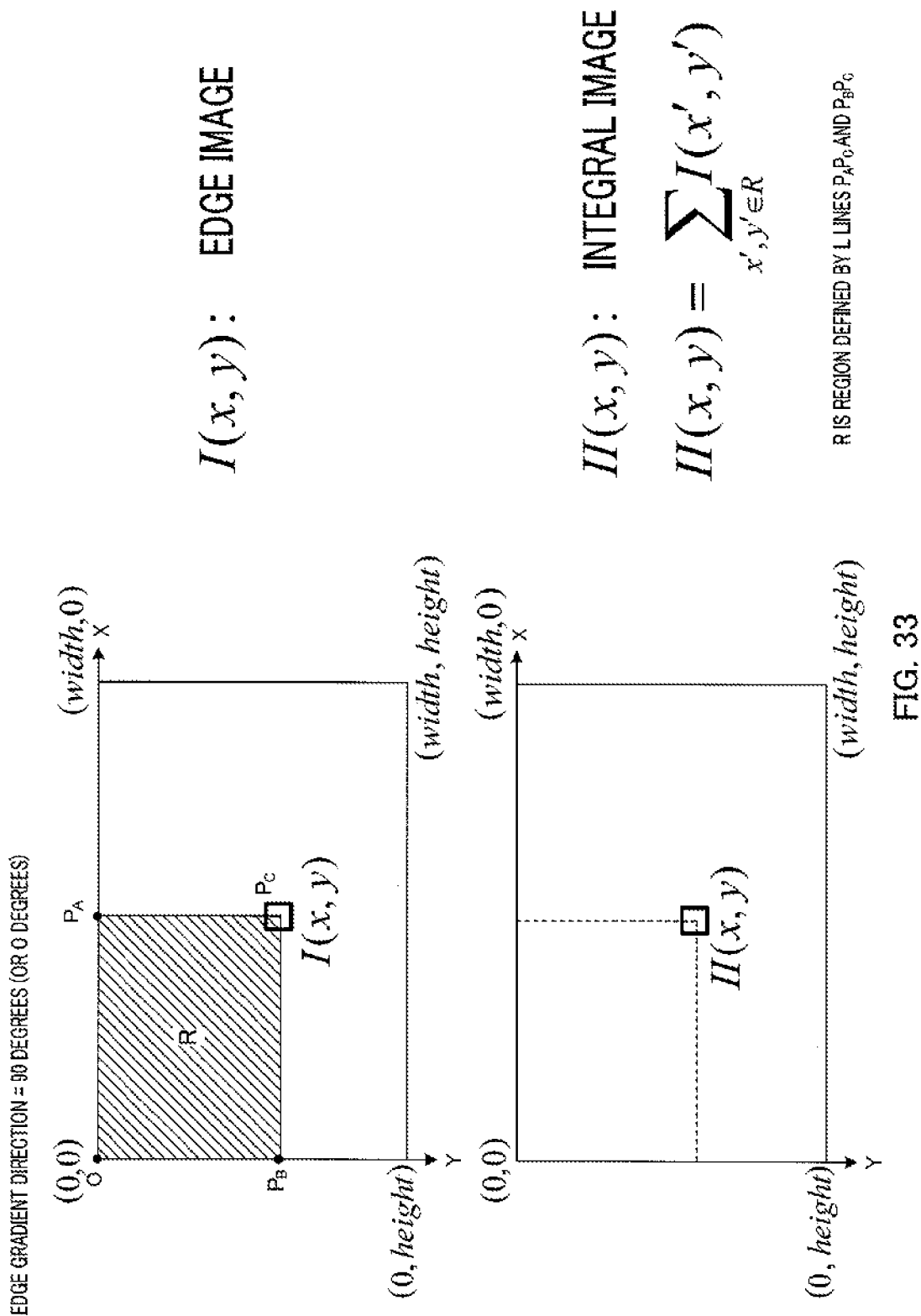
FIG. 33 is a diagram for explaining a method for creating an integral image for an edge image in a gradient direction according to Embodiment 4.

Specifically, when the direction of the edge gradient is 90 degrees, region R with target position $P_C$ at (x,y) shown in FIG. 33 corresponds to the overlap among the negative region for straight line $P_A P_C$, the negative region for straight line $P_B P_C$, and the image area. $P_A$ is the intersection of straight line parallel to the direction of the edge gradient and a side of the image area. $P_B$ is the intersection of straight line Y=y perpendicular to the direction of the edge gradient and a side of the image area. In the case where the direction of the edge gradient is 0 degrees, region R corresponds to the overlap among the negative region for straight line $P_A P_C$, the negative region for straight line $P_B P_C$, and the image area with $P_A$ at the same position as $P_B$ in the case of 90 degrees and with $P_B$ at the same position as $P_A$ in the case of 90 degrees.

Figure 34:
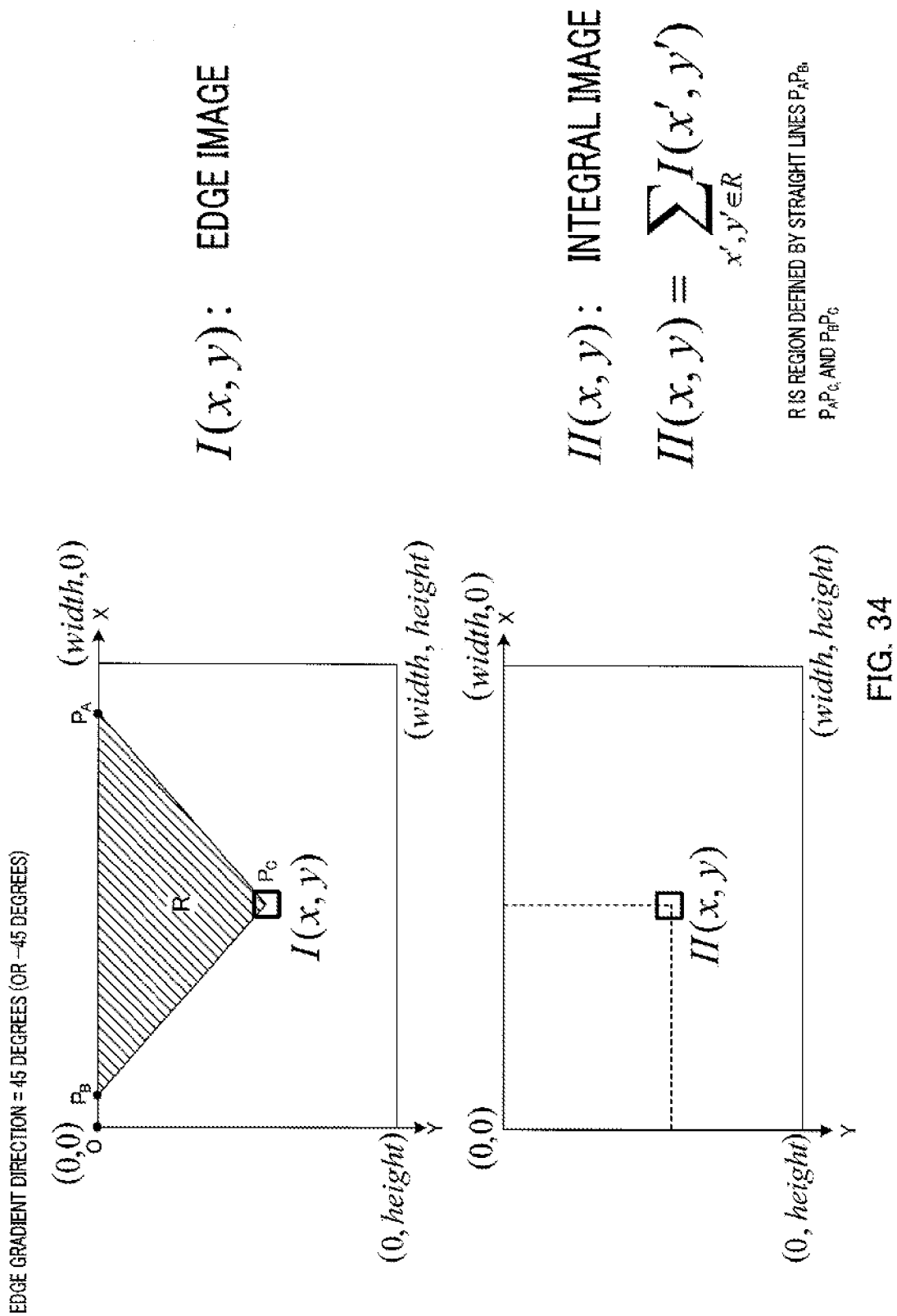
FIG. 34 is a diagram for explaining a method for creating an integral image for an edge image in a gradient direction according to Embodiment 4.

In the case where the direction of the edge gradient is 45 degrees, region R with target position $P_C$ in FIG. 34 corresponds to the overlap among the negative region for straight line $P_A P_C$, the negative region for straight line $P_B P_C$, and the image area. $P_A$ is the intersection of a straight line with the slope of +1 passing through $P_C$ and a side of the image area. $P_B$ is the intersection of a straight line with the slope of −1 passing through. $P_C$ and a side of the image area. In the case where the direction of the edge gradient is −45 degrees, region R corresponds to the overlap among the negative region for straight line $P_A P_C$, the negative region for straight line $P_B P_C$, and the image area with $P_A$ at the same position as $P_H$ in the case of 45 degrees and with $P_B$ at the same position as $P_A$ in the case of 45 degrees.

Figure 35:
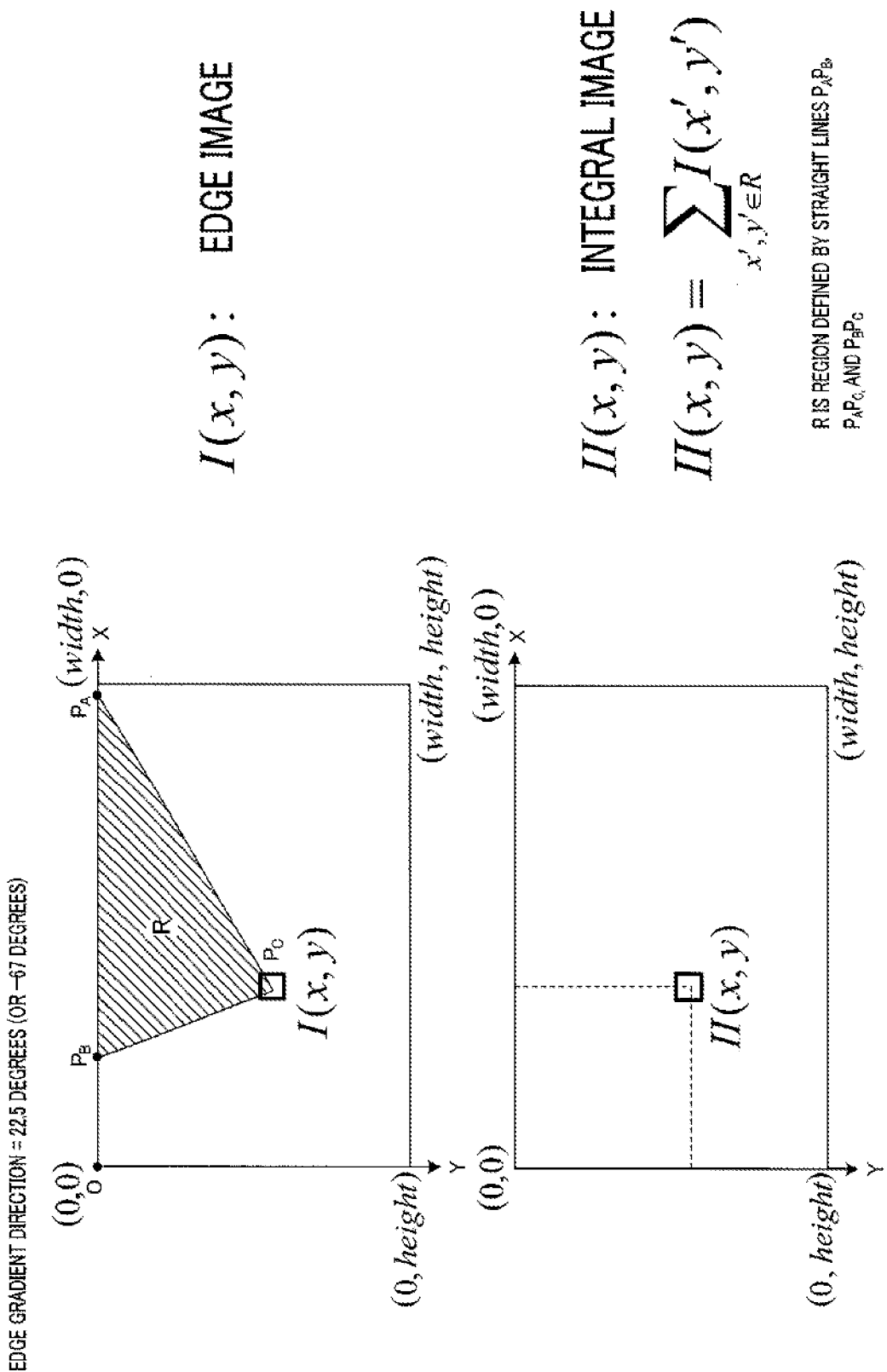
FIG. 35 is a diagram for explaining a method for creating an integral image for an edge image in a gradient direction according to Embodiment 4.

In the case where the direction of the edge gradient is 22.5 degrees, region R with target position $P_C$ in FIG. 35 corresponds to the overlap among the negative region for straight line $P_A P_C$, the negative region for straight line $P_B P_C$, and the image area. $P_A$ is the intersection of a straight line with the slope of ½ passing through $P_C$ and a side of the image area. $P_H$ is the intersection of a straight line with the slope of −2 passing through $P_C$ and a side of the image area.

At a direction of the edge gradient of −67 degrees, region R corresponds to the overlap among the negative region for straight line $P_AP_C$, the negative region for straight line $P_BP_C$, and the image area with $P_A$ at the same position as $P_B$ given by 22.5 degrees and with $P_H$ at the same position as $P_A$ given by 22.5 degrees.

Figure 36:
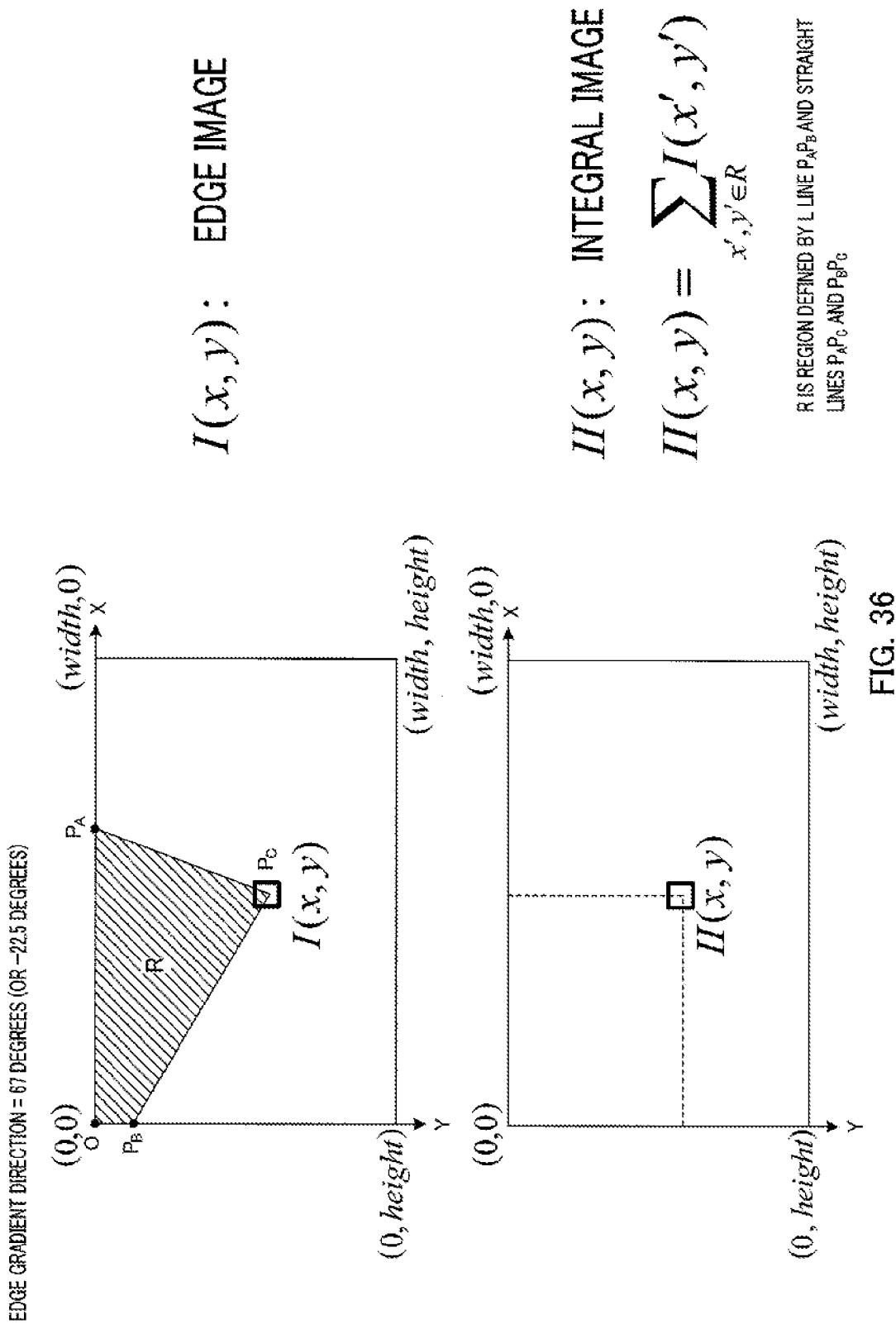
FIG. 36 is a diagram for explaining a method for creating an integral image for an edge image in a gradient direction according to Embodiment 4.

At a direction of the edge gradient of 67 degrees, region R with target position $P_C$ in FIG. 36 corresponds to the overlap among the negative region for straight line $P_AP_C$, the negative region for straight line $P_BP_C$, and the image area. $P_A$ is the intersection of a straight line with the slope of 2 passing through $P_C$ and a side of the image area. $P_B$ is the intersection of a straight line with the slope of $-\frac{1}{2}$ passing through $P_C$ and a side of the image area. At a direction of the edge gradient of $-22.5$ degrees, region R corresponds to the overlap among the negative region for straight line $P_AP_C$, the negative region for straight line $P_BP_C$, and the image area with $P_A$ at the same position as $P_B$ given by 67 degrees and with $P_B$ at the same position as $P_A$ given by 67 degrees.

With this calculation, part extracting section 620 creates integral images for edge images reflecting different gradient directions.

In S604, part extracting section 620 detects the parallel lines resembling the shape of a part of the target person using the rectangular filters generated in S601 and the integral images for different directions of the edge gradient created in S603, and determines, as the parallelism, the product of the cumulative pixel value of the edge pixels in the rectangular filters, to create a likelihood map for each part. A method will be described with reference to FIGS. 37 to 42 for detecting the parallel lines for each part using the rectangular filter and the integral images for different directions of the edge gradient, and for calculating the likelihood map.

Figure 37:
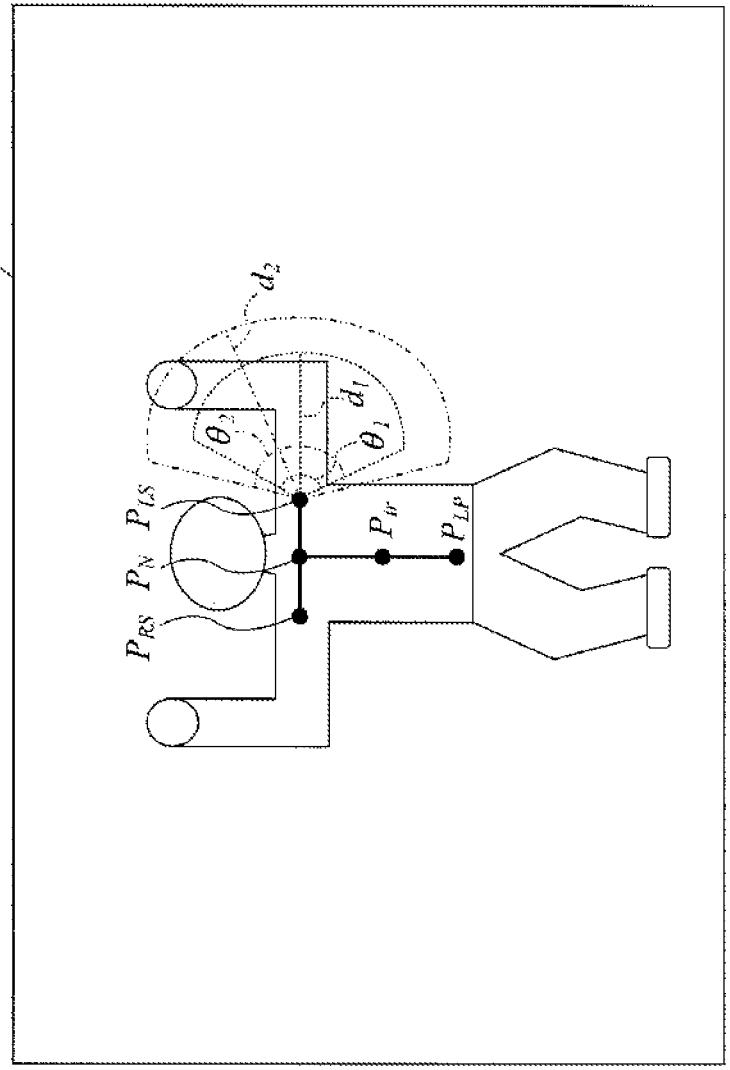
FIG. 37 is a diagram for explaining a method for establishing the initial position and search range according to Embodiment 4.

With reference to FIG. 37, a method will now be described for establishing the initial position and the search range in image area 374 including the upper arms, forearms, body, upper legs, and lower legs to be detected by part extracting section 620, based on the basic skeleton information determined by basic skeleton estimating section 230. Part extracting section 620 determines the initial positions for the upper arms and forearms to be right-shoulder joint position $P_{RS}$ and left-shoulder joint position $P_{LS}$ contained in the basic skeleton information, and the initial position for the body to be between-right and left-shoulder joints midpoint $P_N$. Part extracting section 620 determines the initial positions for upper legs and lower legs to be a position obtained by adding the double of the difference between the initial position for the body and the center of gravity of the body region to the initial position of the body.

Part extracting section 620 may establish the initial positions to those other than the above positions, e.g., the initial positions for the upper arms to (x±V/2, y−H/2), the initial position of the body to (x, y−H/2), and the initial positions for the upper legs and lower legs to (x±V/2, y+H/2), based on the center of gravity of the body region (x,y) and scale (V,H) contained in the basic skeleton information. Part extracting section 620 determines the initial positions for detection of the parts to be starting points, and fan-shaped regions representing the movable ranges of the parts to be search ranges.

Specifically, part extracting section 620 establishes, for example, the search range for the left-upper arm to a fan-shaped region with angle $\theta_1$ and radius $d_1$, the search range for the left-forearm to a fan-shaped region with angle $\theta_2$ and radius $d_2$. Part extracting section 620 can determine radius $d_1$ and radius $d_2$ by multiplying the ratio of the length of each part to the shoulder width predetermined using a public database on human body dimension by the shoulder width acquired by basic skeleton estimating section 230. Since a forearm has a larger movable range than an upper arm and a lower leg has a larger movable range than an upper leg, part extracting section 620 sets angle $\theta_1$ smaller than angle $\theta_2$.

In a similar manner, part extracting section 620 establishes the search range for the upper legs and lower legs, and the search range for the body by a method similar to that for the upper legs and upper arms. Such a process enables part extracting section 620 to establish the initial position and search range for detection of the parts.

Figure 38:
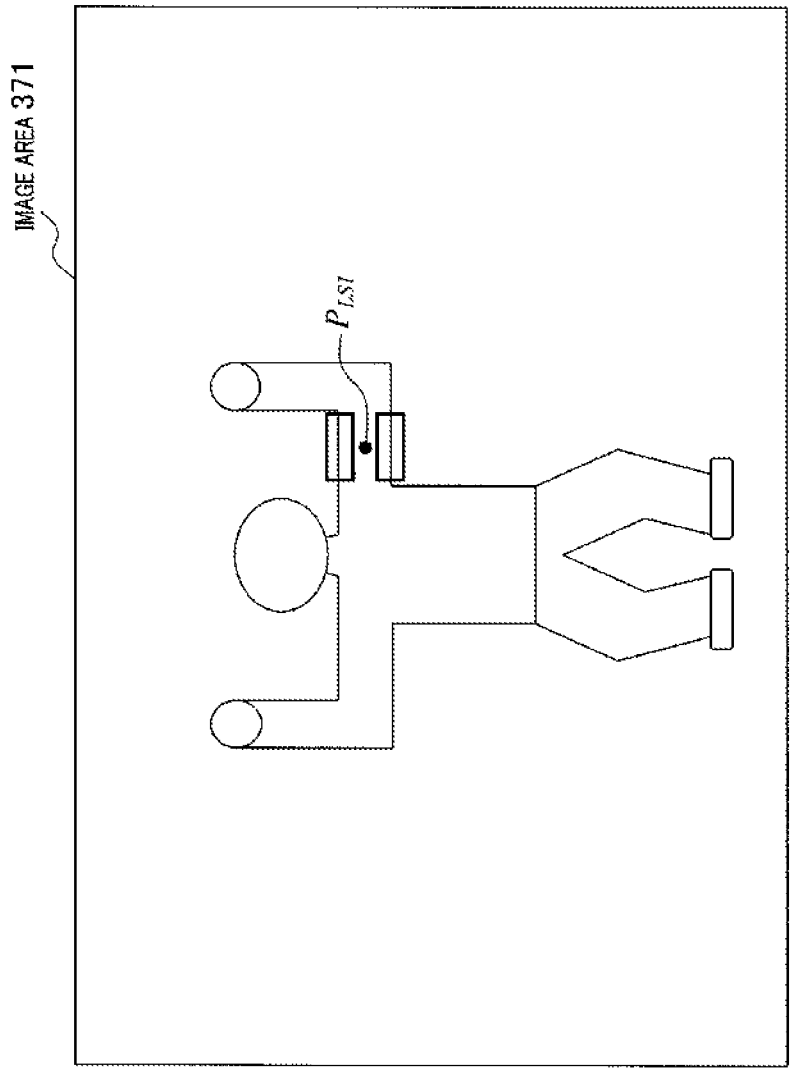
FIG. 38 is a diagram for explaining a process for parallel line detection and likelihood map calculation according to Embodiment 4.
Figure 39:
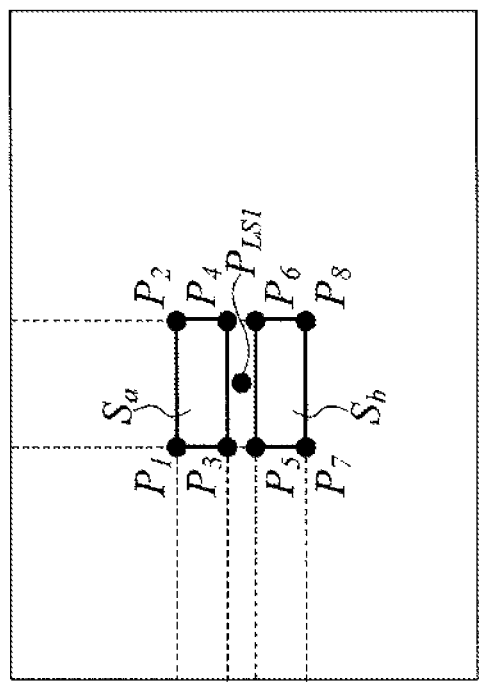
FIG. 39 is a diagram for explaining a process for parallel line detection and likelihood map calculation according to Embodiment 4.

With reference to FIGS. 38 and 39, a process will now be described for detecting the parallel lines using the rectangular filters and the integral images for different directions of the edge gradient, and for calculating the likelihood maps, within the search range established by this method. FIG. 38 illustrates application of rectangular filter with a direction of the edge gradient of 90 degrees to point $P_{LS1}$ present in the search range for the left-upper arm. Part extracting section 620 calculates cumulative pixel values $S_a$ and $S_b$ of the edge pixels in the rectangular filter by Equations 9-1 and 9-2, and the product of these pixel values $L(P_{LS1})$ (hereinafter referred to as likelihood) by Equation 10 to detect parallel lines.

[9]

$$S_a = II(P_4) - II(P_2) - II(P_3) + II(P_1) \quad \text{(Equation 9-1)}$$

$$S_b = II(P_8) - II(P_6) - II(P_7) + II(P_5) \quad \text{(Equation 9-2)}$$

[10]

$$L(P_{LS1}) = S_a \times S_b \quad \text{(Equation 10)}$$

Equations 9-1 and 9-2 express the cumulative values of the edge pixels in the rectangular filter, the values being determined using the integral images reflecting different gradient directions. Equations 9-1 and 9-2 give large values if the part includes edges with the same gradient direction as the rectangular filter as illustrated in FIG. 38, that is, if the rectangular filter is parallel to the straight lines for the part. Equations 9-1 and 9-2 express the product of the cumulative values of the edge pixels in the rectangular filter. Equations 9-1 and 9-2 give large values if the parallel lines for a part with a center of $P_{LS1}$ overlap the rectangular filter.

Figure 40:
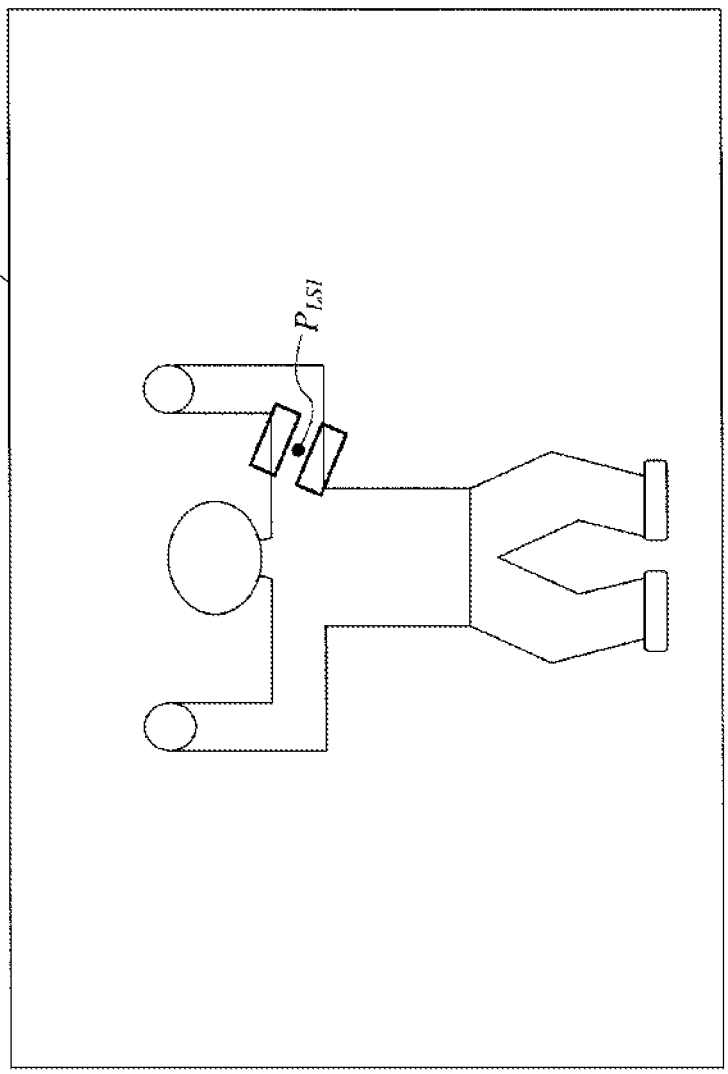
FIG. 40 is a diagram for explaining a process for parallel line detection and likelihood map calculation according to Embodiment 4.
Figure 41:
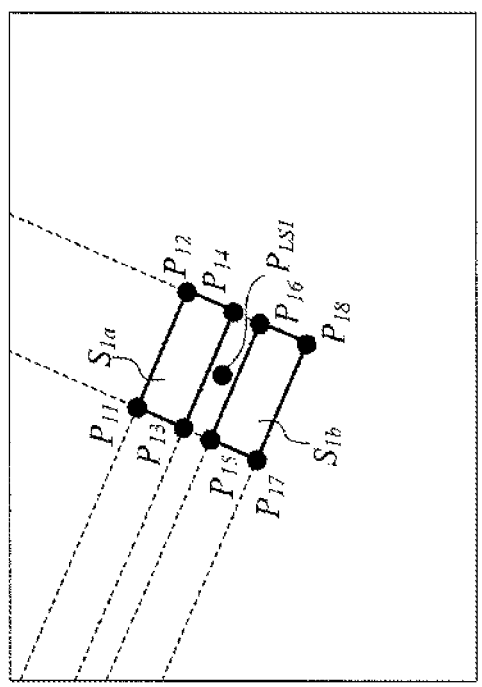
FIG. 41 is a diagram for explaining a process for parallel line detection and likelihood map calculation according to Embodiment 4.

The following description shows the case of a rectangular filter with a direction of the edge gradient of 67 degrees applied to point $P_{LS1}$ present in the search range for the left-upper arm, with reference to FIGS. 40 and 41. In this case, part extracting section 620 calculates cumulative pixel values $S_{1a}$ and $S_{1b}$ of the edge pixels in the rectangular filter according to Equations 11-1 and 11-2, and likelihood $L(P_{LS1})$ according to Equation 12 to detect parallel lines.

[11]

$$S_{1a} = II(P_{14}) - II(P_{12}) - II(P_{13}) + II(P_{11}) \quad \text{(Equation 11-1)}$$

$$S_{1b} = II(P_{18}) - II(P_{16}) - II(P_{17}) + II(P_{15}) \quad \text{(Equation 11-2)}$$

[12]

$$L(P_{LS1}) = S_{1a} \times S_{1b} \quad \text{(Equation 12)}$$

FIG. 40 does not show any edges with the same gradient direction as the rectangular filter, so that the equation expressing a cumulative value determined using the integral image and equation expressing a likelihood gives a cumulative value and a likelihood for the rectangular filter of 0.

Part extracting section 620 repeatedly calculates the cumulative value and the likelihood using a rectangular filter with any direction of the edge gradient other than 90 degrees and 67 degrees to point $P_{LS1}$ present in the search range for the left-upper arm to complete the process for detecting parallel lines and calculating the likelihood for $P_{LS1}$.

Figure 42:
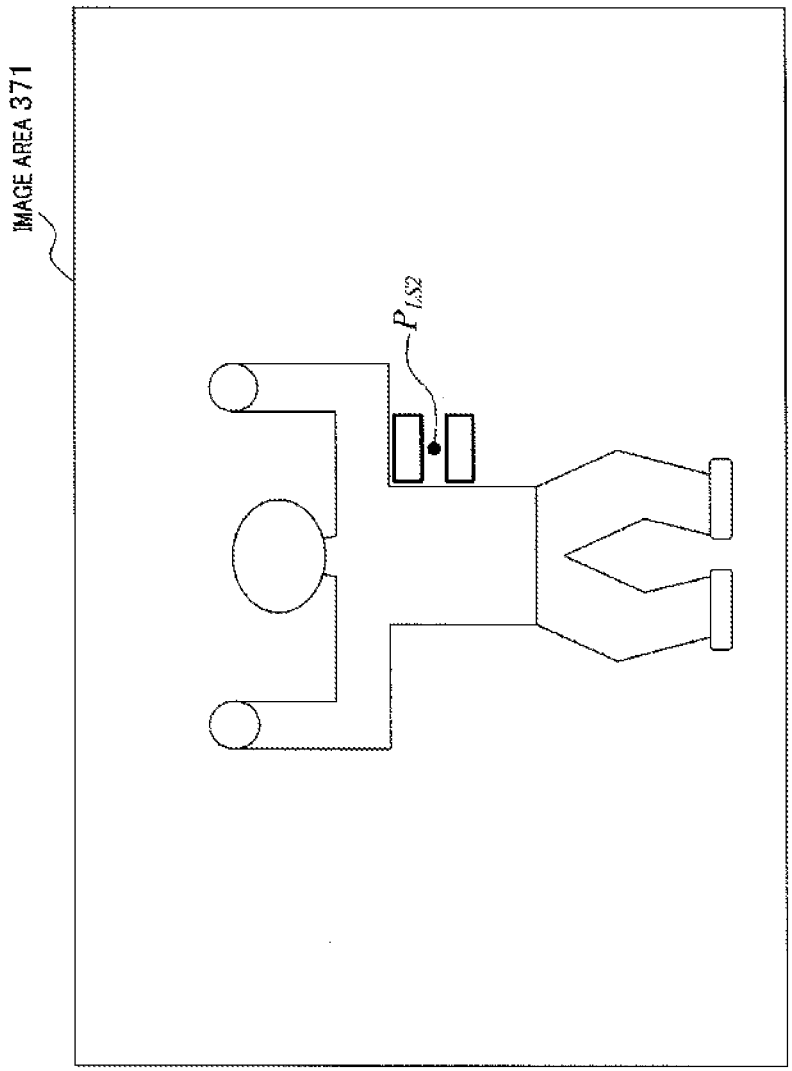
FIG. 42 is a diagram for explaining a process for parallel line detection and likelihood map calculation according to Embodiment 4.

With reference to FIG. 42, a process will now be described which applies a rectangular filter having a direction of the edge gradient of 90 degrees to point $P_{LS2}$ present in the search range for the left-upper arm. This case does not involve any edges with the same gradient direction as the rectangular filter, so that the calculated likelihood is 0 according to Equations 9-1, 9-2, and 10.

As described above, the likelihood is high if a part of the target person present in the search range includes edges with the same gradient direction as the rectangular filter, and low if the part does not include any edge with the same gradient direction as the rectangular filter. This allows the part to be distinguished from the other elements, ensuring the detection of the part of the target person.

Part extracting section 620 applies this process to all the parts in addition to the left-upper arm, so that each pixel has a value determined by Equation 10 or 12, thereby creating likelihood maps reflecting different gradient directions for each part. For the calculation of likelihoods for the forearms and lower legs using rectangular filters, the likelihoods may be multiplied by a weight increasing in proportion to the distance from the initial position in the search range.

In S605, part extracting section 620 creates a consolidated likelihood map consisting of the likelihood maps reflecting different gradient directions assigned to individual parts. Part extracting section 620 first compares the likelihoods of the pixels for each of the eight likelihood maps reflecting different gradient directions assigned to each part, and applies the highest likelihoods to a new likelihood map as representative values. Thus, part extracting section 620 creates a representative likelihood map for each part, the map combining the likelihood maps reflecting different gradient directions.

Part extracting section 620 then compares the likelihoods of the pixels for each of the representative likelihood maps for the respective parts, and applies the highest likelihoods to the new likelihood map as representative values. Thus, part extracting section 620 creates one consolidated likelihood map consisting of the representative likelihood maps for the respective parts to output to similar skeleton model selecting section 312.

Through this process, part extracting section 620 creates the likelihood map indicating the probability of the presence of the parts, and outputs the created likelihood map to similar skeleton model selecting section 312.

After part extracting section 620 completes the part extraction, similar skeleton model storing section 311 and similar skeleton model selecting section 312 evaluate the similar skeleton, model and estimate the pose, in steps S401 to S406.

As described above, part extracting section 620 detects edges of an input image to create integral images reflecting different gradient directions of the edge. Part extracting section 620 uses a rectangular filter and an integral image, which are used to detect predetermined parallel straight lines, to determine cumulative values and the product of the two cumulative values of the edge pixels in the rectangular filter, thereby creating a likelihood map. Thus, part extracting section 620 achieves stable and fast detection of parallel lines even resembling a part of a human body with edges barely detectable compared to those of an artificial object, and thus creates a likelihood map. This reduces errors in pose estimation due to an incorrect likelihood map.

Examples of pose estimation using profile maps will now be described in the following Embodiments 5 to 7 of the present invention.

Embodiment 5

Embodiment 5 of the present invention shows estimation of a joint position with profile maps in the pose estimating apparatus according to Embodiment 1 when connected parts have parallel lines that preclude the calculation of the positions of the parts.

Figure 43:
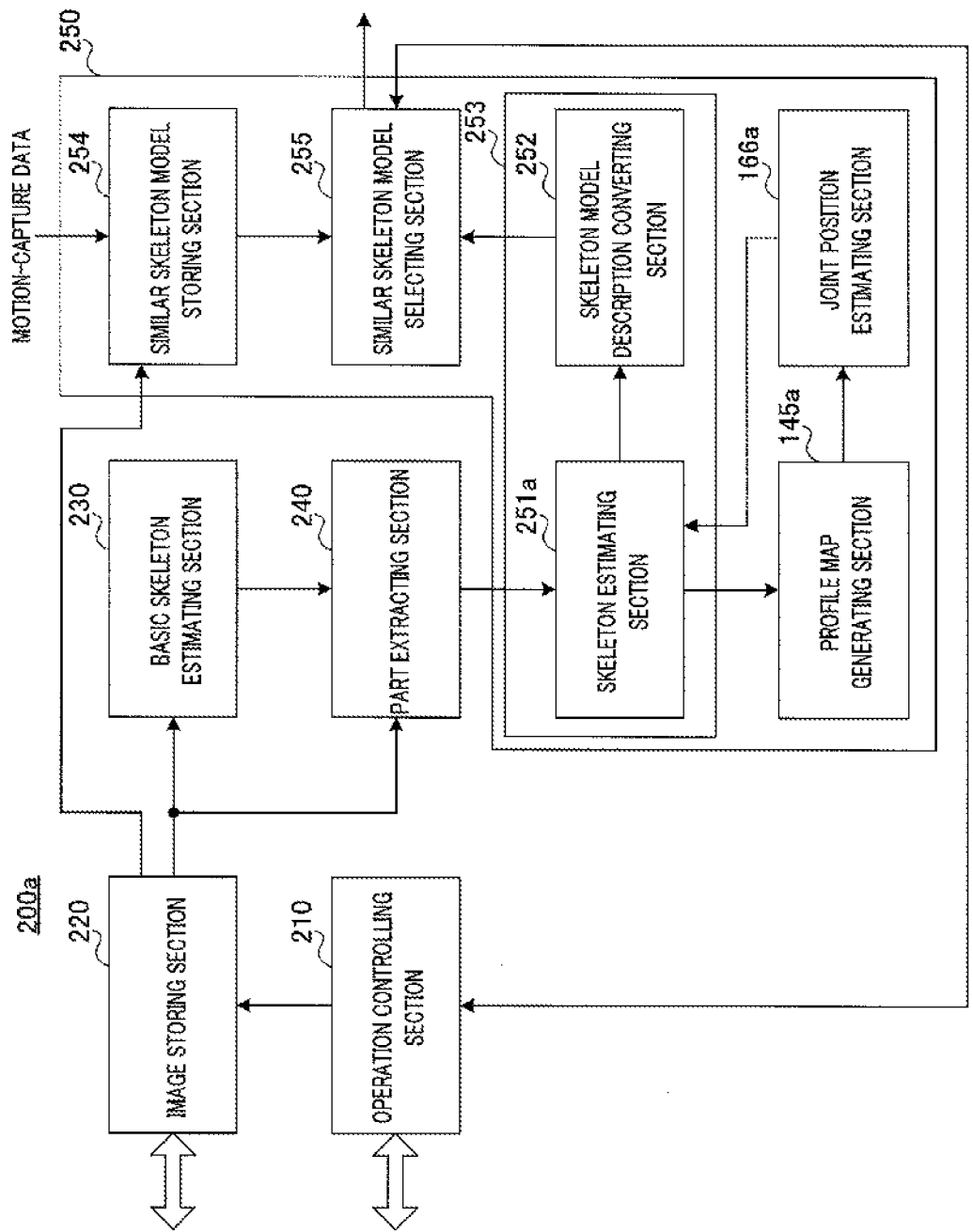
FIG. 43 is a block diagram of main components of a pose estimating apparatus according to Embodiment 5.

FIG. 43 is a block diagram of main components of a pose estimating apparatus according to this embodiment. Pose estimating apparatus 200a in FIG. 43 is applied to pose estimating apparatus 200 according to Embodiment 1 in FIG. 5. The components common to pose estimating apparatus 200a according to this embodiment in FIG. 43 and the pose estimating apparatus in FIG. 5 are denoted by the same reference numerals without duplicated description.

Pose estimating apparatus 200a in FIG. 43 includes skeleton estimating section 251a in skeleton model evaluating section 250 in place of skeleton estimating section 251, and additionally includes profile map generating section 145a and joint position estimating section 166a.

Skeleton estimating section 251a outputs part region information, part straight line information, image data, and identification in on an estimation target joint position to profile map generating section 145a. The estimation target joint position refers, for example, to the joint, position of a part at a position unsuccessfully estimated. Receiving an estimated joint position from joint position estimating section 166a described later, skeleton estimating section 251a employs the estimated joint position as a result of estimation of the joint position.

Profile map generating section 145a generates a profile map for each part. Specifically, profile map generating section 145a receives the estimated likelihood maps, the part straight line information, image data, and the identification information on the estimation target joint position from skeleton estimating section 251a. Profile map generating section 145a then generates profile maps based on the received information, and outputs the generated profile maps, the part straight line information, and the identification information on the estimation target joint position to joint position estimating section 166a. A method for generating the profile maps will be described in detail later.

Joint position estimating section 166a estimates the joint position from the profile maps. Specifically, joint position estimating section 166a determines the estimation target joint position from the profile maps and the part straight line information, and outputs the determined joint position (i.e., estimated joint position) and an identifier for the joint to skeleton estimating section 251a. A method for estimating the joint position will be described in detail later.

The profile maps will now be described.

A profile map represents a surface profile, i.e., surface convexity and concavity, of the subject visible in an image. Profile map generating section 145a estimates the direction of the surface of the part from brightness information on the part in the image. Joint position estimating section 166a estimates one region having a uniform surface according to the profile map to be the region of one part, and thus estimates the joint position. The brightness refers, for example, to the level of luminance. The brightness information indicates luminance or the level of luminance.

FIG. 44 illustrates the relationship between the pose of the person and the brightnesses of the parts.

Figure 44A:
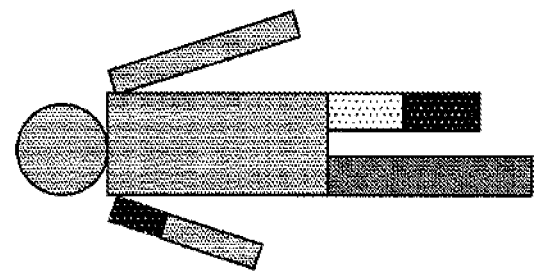
FIG. 44 is a diagram for explaining the relationship between a human pose and the brightness of each part according to Embodiment 5.
Figure 44B:
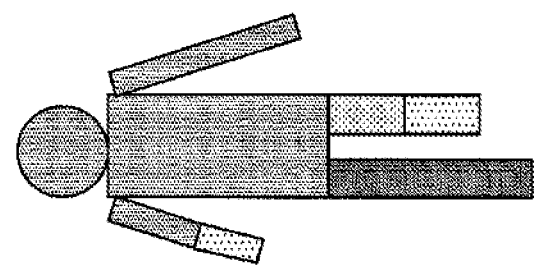
Figure 44C:

A first pose in FIG. 44A and a second pose in FIG. 44B, which are different poses, have the same silhouette when viewed from the front as shown in FIG. 44C. In this case, it is impossible to correctly estimate whether the pose of the target person corresponds to the first pose or the second pose, only from region information on the edge in the front image.

The silhouette in FIG. 44C, for example, shows that the right arm is shorter than the left arm, indicating that the right elbow may be bent. There are however various ways of bending a part within physical limitations. There are also various angles for the whole right arm as shown in FIGS. 44A and 44B.

The silhouette in FIG. 44C, for example, shows that the left leg is shorter than the left leg, indicating that the left knee may be bent. But in fact, as shown in FIGS. 44A and 44B, the left knee can be either bent or straight.

Estimation of the positions of the borders between the upper arm and the forearm and between the above-the-knee part and the below-the-knee part (i.e., joints) allows for estimation of the pose of the target person from among the variations. In the case, however, of a pose with arms or legs looking like straight lines as shown in FIG. 44C, the positions of the borders are not readily estimated just with only the region information on the edge, regardless of use of the physical limitations.

To solve the problem of such a pose with joint positions that cannot be determined only from the region information, pose estimating apparatus 200a estimates the part region from the brightness information in addition to the region information.

Figure 44D:
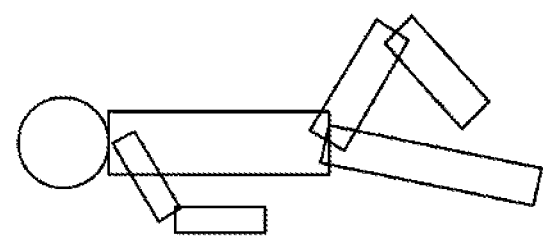
Figure 44E:
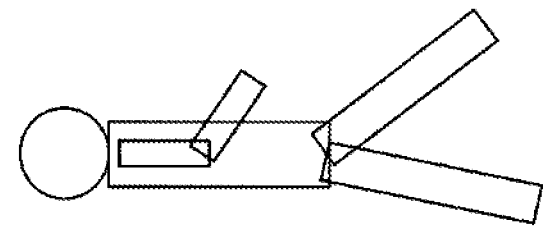

FIG. 44D shows the brightnesses, represented by different shades, of the parts in the first pose viewed from the front illuminated with natural light as a light source from above. FIG. 44E shows the brightness, represented by different shades, of the parts in the second pose viewed from the front illuminated with natural light as a light source from above. In the drawings, a darker shade indicates lower brightness (darker). The brightness is classified into five levels of, in order of ascending brightness, 2, −1, 0, 1, 2. The level 0 indicates, for example, the brightness of a surface perpendicular to the ground.

A region in the image having a surface facing more upward is at a higher brightness level, while a region in the image having a surface facing more downward is at a lower brightness level.

For example, as shown in FIGS. 44D and 44E, for both of the first and second poses, the regions of the head, body, and left arm are at the level 0, and the region of the right leg is at the level −1 indicating a somewhat dark condition.

For the first pose, the right-upper arm is stretched downward and the right forearm is stretched forward: hence, as shown in FIG. 44D, the region of the right-upper arm is at the level 0, and the region of the right forearm is at the level 2. In contrast, for the second pose, the right-upper arm is pulled backward and the right forearm is downward; hence, as shown in FIG. 44E, the region of the right-upper arm is at the level −2, and the region of the right forearm is at the level 2.

For the first pose, the whole left leg is stretched forward; hence, as shown in FIG. 44D, the above-the-left-knee region and the below-the-left-knee region are at the level 1. In contrast, for the second pose, the left thigh is pulled up and the left knee is pulled backward; hence, as shown in FIG. 44E, the region of the left thigh is at the level 2, and the region of the left knee is at the level −2.

As described above, each part can be regarded as a surface with uniform brightness. It is therefore possible to estimate the direction of the surface of a part from the brightness information on the part in the image, and estimate the position at which the direction of the surface of the part changes to be the joint positions. In particular, the use of the brightness information even enables the joint positions to be estimated for the parts having the same angle based on the region information (a plurality of parts with a silhouette in a straight line shape or a plurality of parts with parallel straight lines).

The operation of pose estimating apparatus 200a with such a configuration is now described with reference to the process flow in FIG. 45. The steps common to FIG. 45 and FIG. 17 according to Embodiment 1 are denoted by the same reference numerals without duplicated description.

In S104, skeleton estimating section 251a estimates the skeleton of the target person based on the part region information. Then, the process goes to S1750a.

In S1750, skeleton estimating section 251a determines the presence of a part with uncalculated joints. If skeleton estimating section 251a finds no part with uncalculated joints, the process goes to S105. If any joint with uncalculated joints is found, the process goes to S1755a.

In S1755a, profile map generating section 145a generates profile maps according to the regions of the parts estimated in S103 and the image data acquired in S101.

A method will now be described in detail for generating profile map.

Figure 45:
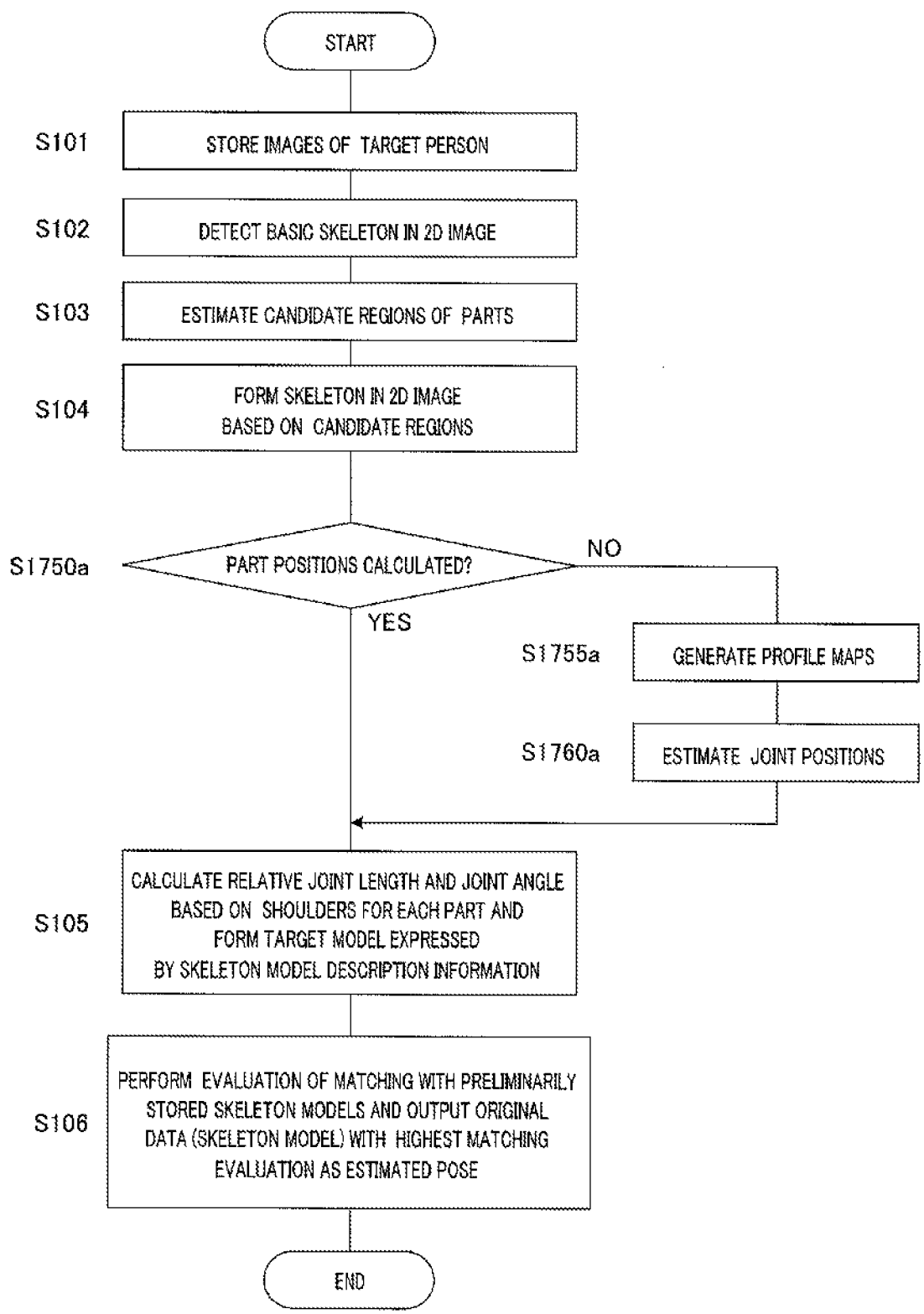
FIG. 45 is an example process flow for an estimation processing apparatus according to Embodiment 5.
Figure 46:
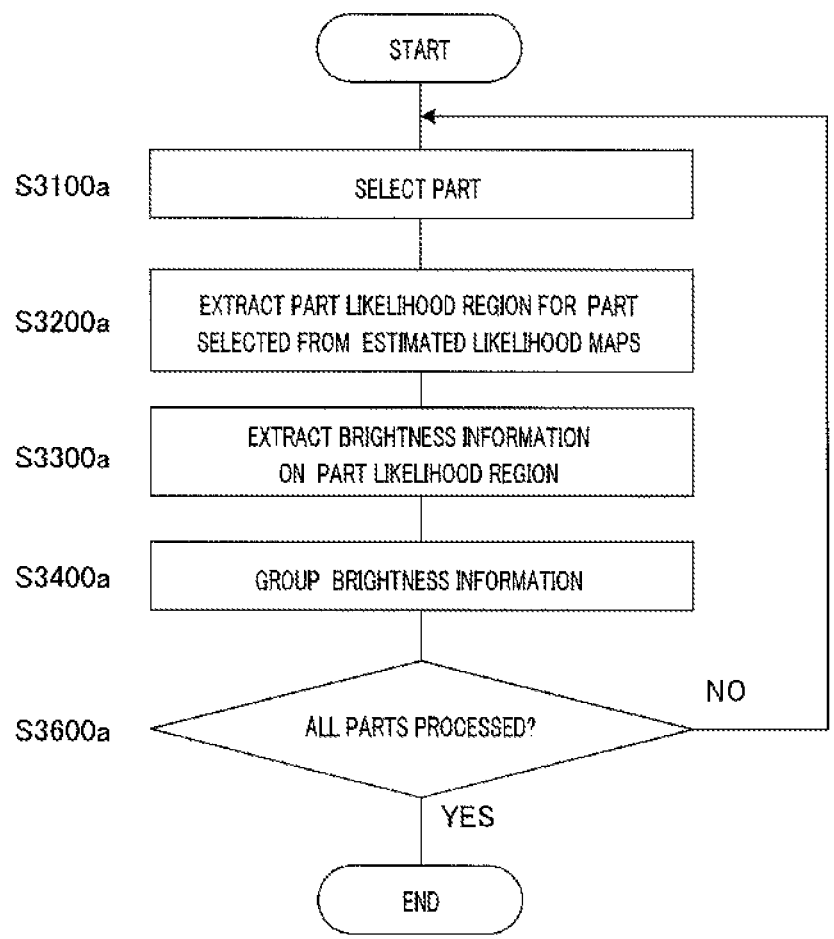
FIG. 46 is an example process flow of generation of a profile map according to Embodiment 5.

FIG. 46 is a process flow of generation of a profile map. The process for generating the profile map is carried out in S1755a shown in FIG. 45.

Information on the profile map for each pixel has a data structure of profile vector $O_{ij}=[p1, p2, \ldots, pk, \ldots, pn]$, where pk is the likelihood for part k and n is the number of parts. Likelihood pk is binary information shifting, between 0 indicating "not part k" and 1 indicating "can be part k."

In S3100a, profile map generating section 145a selects one part as a target for the process. In this embodiment, the estimation target joint position is the right elbow. In this case, profile map generating section 145a determines the right arm as a target for the process for generating the profile map, and selects the right forearm which is farthest from the basic part.

In S3200a, profile map generating section 145a acquires the region of the part selected in S3100a (hereinafter referred to as part likelihood region), based on the estimated likelihood map generated in S1200. In this embodiment, the pixels indicating likelihoods for the right forearm in the estimated likelihood map, the likelihoods exceeding a predetermined threshold are extracted and collectively determined as a part likelihood region for the right forearm.

In S3300a, profile map generating section 145a extracts brightness information on the part likelihood region extracted in S3200a from the image data acquired in S1100. Brightness information can be extracted by converting the image into a grayscale (black and white gradation) image based on, for example, luminances (the brightnesses of the pixels) extracted from RGB values of the pixels constituting the image data.

In S3400a, profile map generating section 145a groups the brightness information on the part likelihood region acquired in S3300a according to the threshold of brightness. Profile map generating section 145a may use either a predetermined fixed threshold of brightness or dynamically set threshold of brightness. Here, the case that the threshold is dynamically set will be described.

Figure 47:
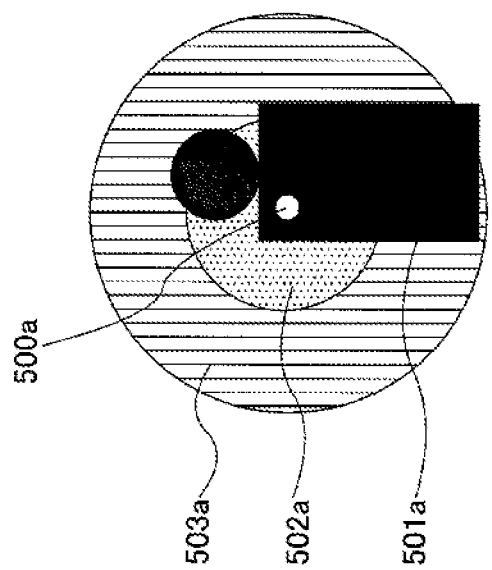
FIG. 47 is a diagram for explaining a method of area categorization according to Embodiment 5.

FIG. 47 is a diagram for explaining a method of area categorization using the physical limitations for the right forearm. Suppose for simplicity that the body has only the right arm.

In S1200, a head and shoulder region and body region 501a connected to the head and shoulder region are estimated, based on estimated right-shoulder position 500a. In region 502a, the right-upper arm and the right forearm can be present. In region 503a, only the right forearm can be present.

Regions 502a and 503a can be calculated from the part region and the part region information shown in FIG. 9.

Profile map generating section 145a extracts the luminances (brightness information) of the pixels in region 503a where only the right forearm can be present, the region being in the part likelihood region of the right forearm.

Profile map generating section 145a then removes the n smallest values and the n largest values from data on the extracted luminances, where n is a % of the number of target pixels m. Profile map generating section 145a determines the minimum and maximum values of the data from which these 2n values are subtracted (the number of pieces of data is m−2n) as the thresholds of the brightness information on the right forearm (the upper and lower limits of the range of luminance regarded as the right forearm). Here, a is a predetermined value.

Profile map generating section 145a sets a value indicating "possible right forearm" (e.g., 1) as a profile vector indicating the right forearm, among profile vectors Oij of pixels in the part likelihood region of the right forearm having a value between the thresholds (i.e., within the range of luminance regarded as the right forearm).

As described above, profile map generating section 145a sets the thresholds of luminance using the brightness information on the part likelihood region where only the right forearm can be present due to physical limitations. Thus, profile map generating section 145a can determine the pixels having the brightness information on the right forearm, without the influence of the other parts.

Profile map generating section 145a then extracts the luminances (brightness information) of the pixels in region 502a where only the right-upper arm and the right forearm can be present, the region being in the part likelihood region of the right forearm.

Profile map generating section 145a then removes the values between the thresholds of the brightness information on the right forearm determined in the previous step, from data on the extracted luminances. Profile map generating section 145a removes the q smallest values and the q largest values from data on the extracted luminances, where q is h % of the number of the remaining pieces of data on the luminances p. Profile map generating section 145a determines the minimum and maximum values of the data from which these 2q values are removed (the number of pieces of data is p−2q) as the thresholds of the brightness information on the right-upper arm (the upper and lower limits of the range of luminance regarded as the right forearm). Here, b is a predetermined value.

Profile map generating section 145a sets a value indicating "possible right-upper arm." (e.g., 1) as a profile vector indicating the right-upper arm, among profile vectors Oij of pixels in the part likelihood region of the right forearm having a value between the thresholds (i.e., within the range of luminance regarded as the right-upper arm).

As described above, profile map generating section 145a sets the thresholds by removing the data in the range of luminance regarded as the right forearm from the brightness information on the part likelihood region where only the right-upper arm and the right forearm can be present due to physical limitations. Thus, profile map generating section 145a can determine the pixels having the brightness information on the right-upper arm, without the influence of the other parts but with accuracy.

As described above, profile map generating section 145a sets the thresholds of the brightness information on a part using the brightness information on a region where only that part exists (the parts are assigned with thresholds in order of descending distance from the basic part), and groups the brightness information on the part to estimate the region.

It is possible that region 503a where only the right forearm can be present does not include the part likelihood region of the right forearm. In this case, profile map generating section 145a may extract, for example, the luminance information on the pixels in region 502a where only the right-upper arm and the right forearm can be present, the region being in the part likelihood region of the right forearm and right-upper arm, to categorize the luminance information into two groups of the right forearm and the right-upper arm. Profile map generating section 145a then sets the thresholds using, for example, Otsu binarization. Thus, profile map generating section 145a can set the thresholds of the brightness information on the right-upper arm and the right forearm even if region 503a where only the right forearm can be present does not include the part likelihood region of the right forearm.

In some cases, after the brightness information on the right forearm is set based on region 503a where only the right forearm can be present, the right-upper arm, which is expressed by pixels with exactly the same brightness information as those expressing the right forearm, cannot be assigned with different thresholds from those for the right forearm, even based on region 502a where only the right-upper arm and the right forearm can exist. In this case, profile map generating section 145a may set, to brightness information on the right-upper arm, the same brightness information as those for the right forearm. Thus, profile map generating section 145a can set the brightness information on the right-upper arm even if the right-upper arm and the right forearm have surfaces facing a similar direction (stretch out straight).

In S3500a in FIG. 46, profile map generating section 145a determines whether all the target parts for the process for generating the profile map have undergone the process. When also generating a profile map for the left arm, for example, profile map generating section 145a returns to S3100a to carry out the process for the left arm as for the right arm.

These are all the details of the method for generating the profile map.

Profile map generating section 145a outputs the generated profile maps, the part straight line information, and the identification information on the estimation target joint position to joint position estimating section 166a.

In S1760a in FIG. 45, joint position estimating section 166a estimates the joint positions.

Specifically, joint position estimating section 166a follows a straight line for, for example, a part consisting of the right-upper arm and the right forearm from the starting point to the ending point to sequentially read the values according to the profile maps at the pixel positions on the axis of the part. Joint position estimating section 166a then extracts the pixel position at which the value according to the profile map varies, as a joint position. If more than one corresponding pixels are extracted, joint position estimating section 166a may output a point at the middle of them as a joint position.

Joint position estimating section 166a outputs the determined joint position (i.e., estimated joint position) and an identifier for the joint to skeleton estimating section 251a. Skeleton estimating section 251a acquires the position of the part unsuccessfully estimated, from the estimated joint position.

With this process, when a part has straight lines of the same angle, pose estimating apparatus 200a can estimate the joint position using profile maps.

As described above, pose estimating apparatus 200a according to this embodiment generates profile maps, and estimates the position of each part based on the profile maps.

The apparatus can therefore estimate the pose of connected parts with parallel straight lines at the same angle.

Embodiment 6

Embodiment 6 of the present invention involves determination of the skeleton model using profile maps in case of failure of discrimination between poses with a 2D skeleton model in the pose estimating apparatus according to Embodiment 2.

As described with reference to FIG. 44 according to Embodiment 5, different poses in 3D skeleton models can look like the same poses in 2D skeleton models.

Figure 48:
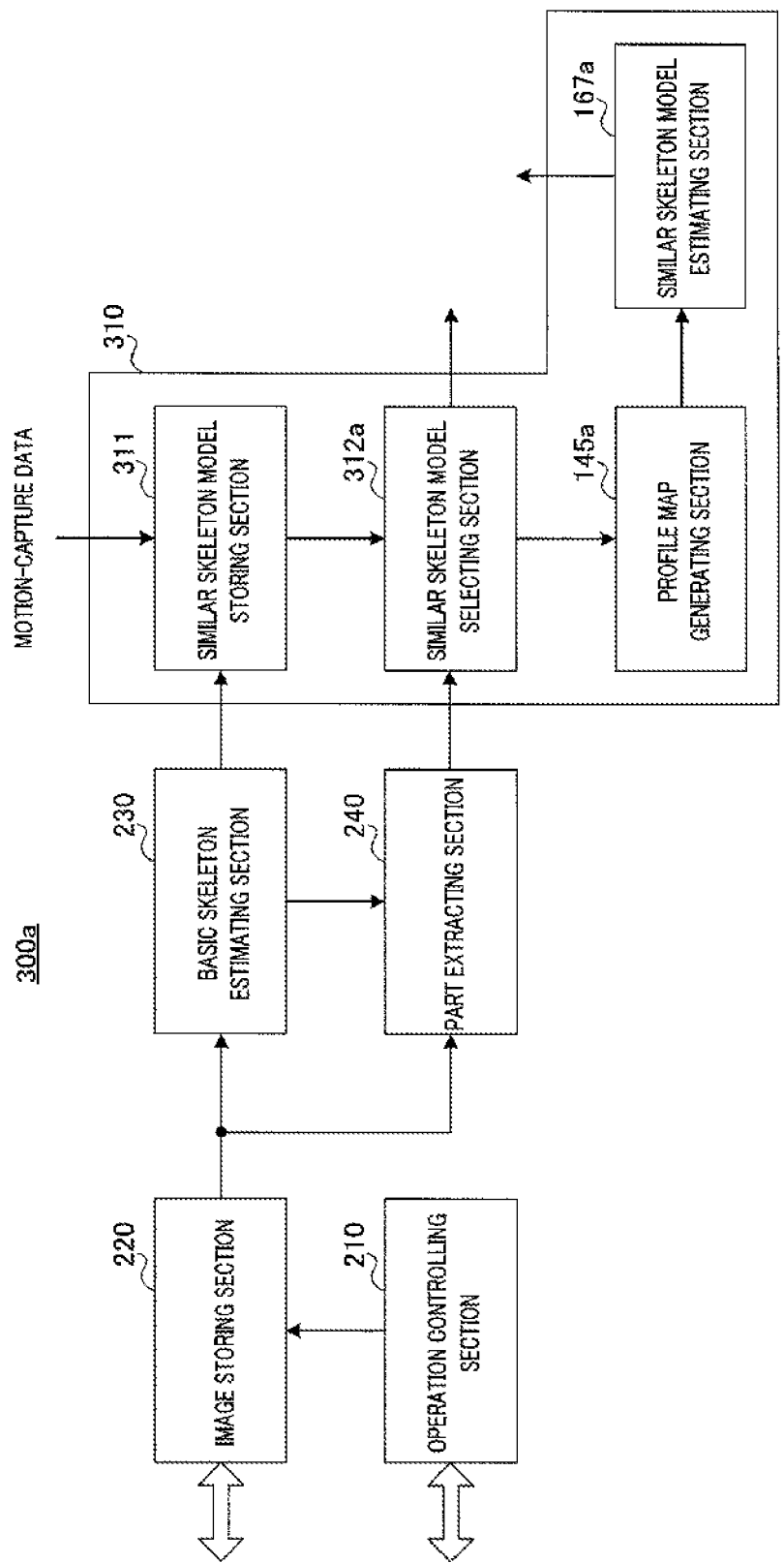
FIG. 48 is a block diagram of main components of a pose estimating apparatus according to Embodiment 6.

FIG. 48 is a block diagram of main components of a pose estimating apparatus according to this embodiment. Pose estimating apparatus 300a in FIG. 48 is applied to pose estimating apparatus 300 in FIG. 23 according to Embodiment 2. The components common to pose estimating apparatus 300a according to this embodiment in FIG. 48 and the pose estimating apparatus in FIG. 23 are denoted by the same reference numerals without duplicated description.

Pose estimating apparatus 300a in FIG. 48 includes similar skeleton model selecting section 312a in skeleton model evaluating section 310 in place of similar skeleton model selecting section 312, and additionally includes profile map generating section 145a and similar skeleton model estimating section 167a.

Similar skeleton model selecting section 312a outputs image data, the likelihood maps extracted by part extracting section 240, particular skeleton model description information in the skeleton model description information stored in similar skeleton model storing section 311 to profile map generating section 145a.

Profile map generating section 145a performs the same process as profile map generating section 145a according to Embodiment 5, and outputs the generated profile maps, the part straight line information, and the identification information on the estimation target joint position to similar skeleton model estimating section 167a.

Similar skeleton model estimating section 167a superimposes the skeleton model on the profile maps, and calculates, for each skeleton model, the level of match between the position of each part in the corresponding profile map and that in the skeleton model as a score. Similar skeleton model estimating section 167a then selects the skeleton model with the highest score as a 2D skeleton model corresponding to the pose of the target person.

Figure 49:
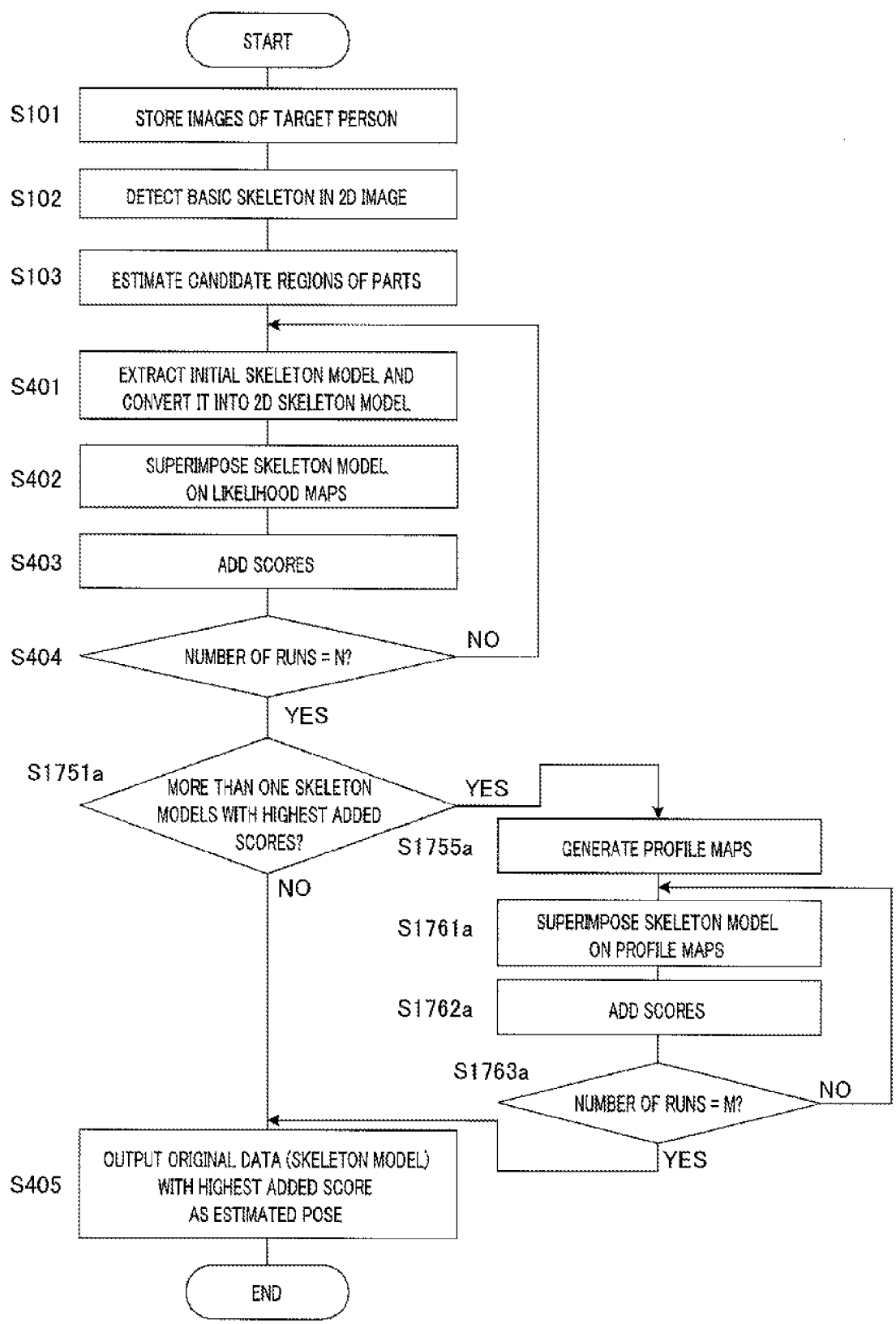
FIG. 49 is an example process flow for an estimation processing apparatus according to Embodiment 6.

FIG. 49 shows a process flow for pose estimating apparatus 300a. The steps common to FIG. 49 and FIG. 24 according to Embodiment 2 are denoted by the same reference numerals without duplicated description.

In S1751a after S404, similar skeleton model selecting section 312a determines whether there are more than one skeleton models with added scores higher than or equal to a predetermined threshold. If similar skeleton model selecting section 312a determines that there are not more than one skeleton models with high added scores, the process goes to S405. If there are more than one skeleton models with high added scores, the process goes to S1755a.

In S1755a, profile map generating section 145a receives image data, the likelihood maps, and the selected skeleton model description information from similar skeleton model selecting section 312a. Here, the inputs in Embodiment 4, i.e., the part region information, the part straight line information, the image data, and the identification information on the estimation target joint position are acquired from the skeleton model description information. Profile map generating section 145a then generates profile maps from the input information, and outputs the generated profile maps and the skeleton model description information to similar skeleton model estimating section 167a. The process for generating these profile maps is similar to that described in Embodiment 4.

In S1761a, similar skeleton model estimating section 167a superimposes one skeleton model on the profile maps. The method for the superimposition is similar to the method for superimposing a skeleton model on a likelihood map.

In S1762a, similar skeleton model estimating section 167a calculates the score of the match between the superimposed skeleton model and profile maps. The method for the matching is similar to the method for matching a skeleton model with a likelihood map.

In S1763a, similar skeleton model estimating section 167a determines whether the processes for the specified (selected) skeleton models are completed. If any unprocessed skeleton model is present, the process returns to S1761a and repeats for the unprocessed skeleton model. If the scores of all the specified skeleton models are calculated, the process goes to S405. Similar skeleton model estimating section 167a selects the skeleton model with the highest score as a 2D skeleton model corresponding to the pose of the target person, and outputs the results of the selection.

Thus, pose estimating apparatus 300a according to this embodiment uses profile maps to distinguish between different poses regarded as similar ones in a 2D likelihood map with an edge, resulting in accurate pose estimation.

Embodiment 7

Embodiment 7 shows determination of the skeleton model using profile maps in case of failure of discrimination between poses with a 2D skeleton model in the pose estimating apparatus according to Embodiment 4.

Figure 50:
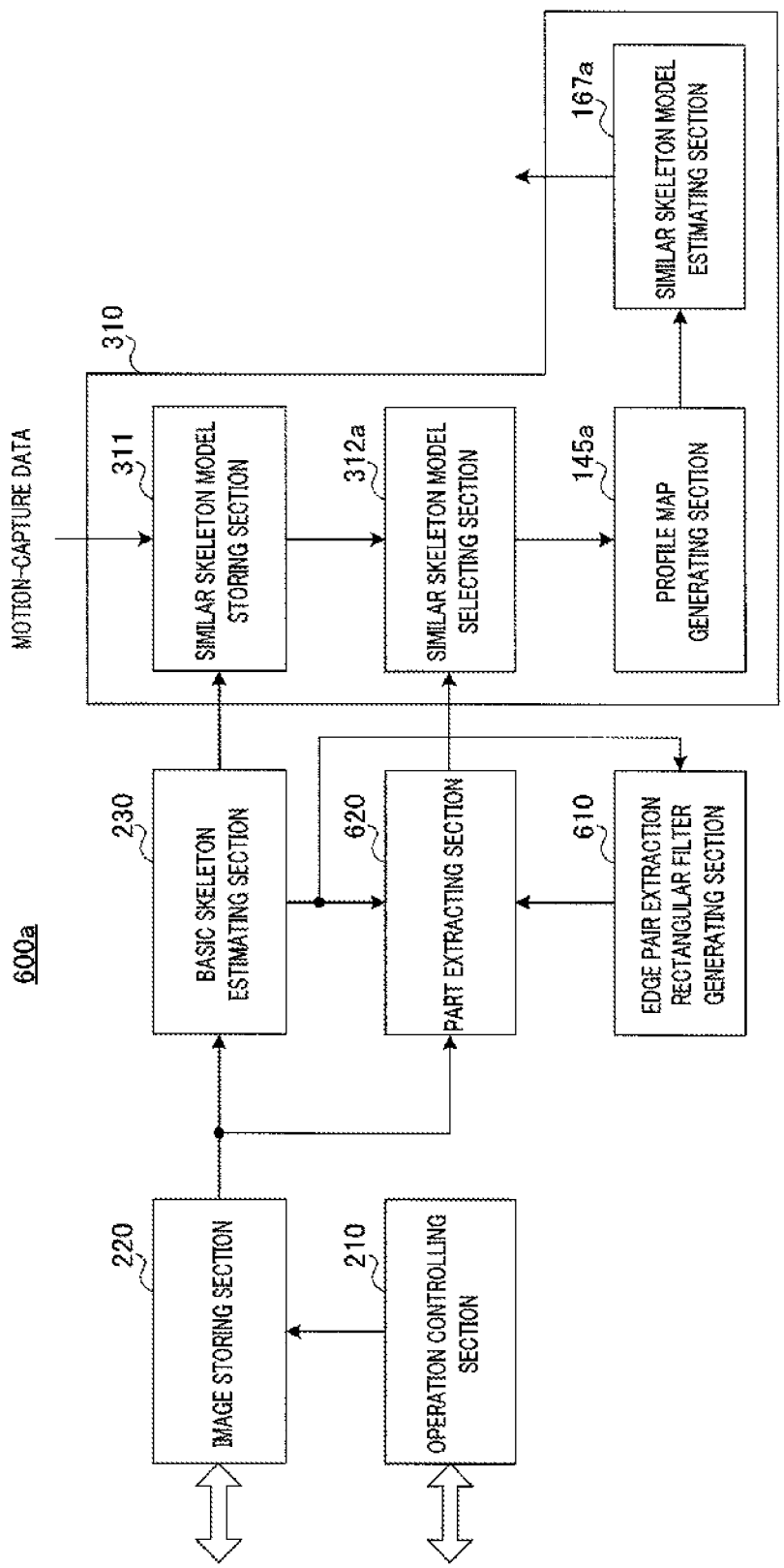
FIG. 50 is a block diagram of main components of a pose estimating apparatus according to Embodiment 7.

FIG. 50 is a block diagram of main components of a pose estimating apparatus according to this embodiment. Pose estimating apparatus 600a in FIG. 50 is applied to pose estimating apparatus 600 in FIG. 29 according to Embodiment 4. The components common to pose estimating apparatus 600a according to this embodiment in FIG. 50 and the pose estimating apparatus in FIG. 29 are denoted by the same reference numerals without duplicated description.

Pose estimating apparatus 600a in FIG. 50 includes similar skeleton model selecting section 312a in skeleton model evaluating section 310 in place of similar skeleton model selecting section 312, and further includes profile map generating section 145a and similar skeleton model estimating section 167a.

Similar skeleton model selecting section 312a, profile map generating section 145a, and similar skeleton model estimating section 167a perform the respective processes described in Embodiment 6.

Figure 51:
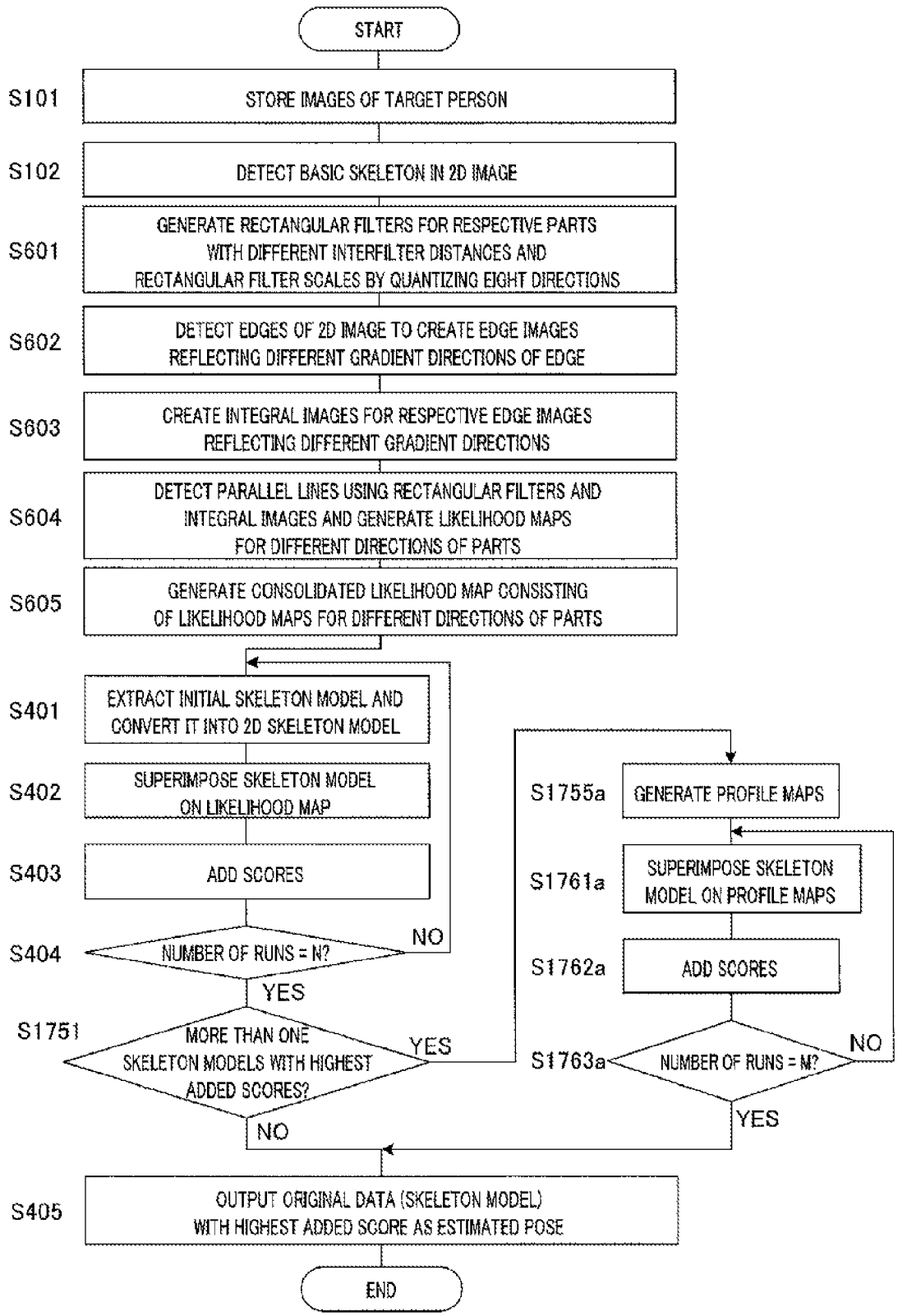
FIG. 51 is an example process flow for an estimation processing apparatus according to Embodiment 7.

FIG. 51 shows a process flow for pose estimating apparatus 600a. The steps common to FIG. 51 and FIG. 30 according to Embodiment 4 are denoted by the same reference numerals as FIG. 24 without duplicated description.

As shown in FIG. 51, after S404, pose estimating apparatus 600a performs the steps S1751a to S1763a described in Embodiment 6 with reference to FIG. 49; then, the process goes to S405. In particular, pose estimating apparatus 600a selects one of the skeleton models with high scores which has the highest: score of match with the profile maps, as a 2D skeleton model corresponding to the pose of the target person.

Thus, pose estimating apparatus 600a according to this embodiment uses rectangular filters in combination with profile maps to distinguish between different poses regarded as similar ones in a 2D likelihood map with an edge, and thus estimates the pose.

The entire disclosure of the specifications, drawings and abstracts in Japanese Patent Application No 2010-228730 filed on Oct. 8, 2010 and in Japanese Patent Application No 2011-45492 filed on Mar. 2, 2011 is incorporated herein by reference.

INDUSTRIAL APPLICABILITY

The pose estimating apparatus and pose estimating method according to the present invention use a skeleton model that can express the overlap between parts to estimate various 3D poses, and thus are useful for, for example, motion analysis using images.

REFERENCE SIGNS LIST 110, 200, 200a, 300, 300a, 400, 500, 600, 600a Pose estimating apparatus
120 Camera
145a profile map generating section
166a Joint position estimating section
167a Similar skeleton model estimating section
210 Operation controlling section
220 Image storing section
230 Basic skeleton estimating section
240, 420, 620 Part extracting section
250, 310, 510 Skeleton model evaluating section
251, 251a Skeleton estimating section
252 Skeleton model description converting section
253 Target skeleton model forming section
254, 311, 511 Similar skeleton model storing section
255, 312 Similar skeleton model selecting section
312a Similar skeleton model selecting section
410 Relative joint length calculating section
610 Edge Pair extraction rectangular filter generating section

The invention claimed is:

1. A pose estimating apparatus comprising:
a basic skeleton estimating section that estimates a position of a distinctive part of a person in an acquired image;
a likelihood map generating section that generates a likelihood map indicating the probability of presence of another part of the person, the probability being based on the position of the distinctive part of the person; and
an evaluating section that evaluates, a candidate group of a plurality of 2D skeleton models, the plurality of 2D skeleton models each corresponding to a pose of the person based on the likelihood map, and comprising a group of lines representing the parts and a group of dots representing connections between the parts,
wherein the likelihood map generating section limits a search range to be input to classifying sections, based on statistical data on positions of the distinctive part of the person, a front direction of the person, and human body dimension, and generates the likelihood map in the limited search range.

2. The pose estimating apparatus according to claim 1, the evaluating section comprising:
a storage section that stores the candidates in the candidate group, the candidates each being associated with a 3D skeleton model and generated by projective conversion of the 3D skeleton model into a 2D skeleton model, the conversion being carried out by each candidate;
a formation section that forms a target skeleton model from the likelihood map, the target skeleton model being expressed by a same method as a method for expressing the 2D skeleton model; and
a selection section that selects one of the candidates in the candidate group as a 2D skeleton model corresponding to the pose of the person in the acquired image, based on the similarity between each of the candidates in the candidate group and the target skeleton model.

3. The pose estimating apparatus according to claim 2, further comprising:
a calculating section that calculates, for each acquired image, relative joint lengths each indicating a ratio of a length between each pair of parts to a length of the distinctive part, based on the 3D skeleton model associated with the candidate in the candidate group selected by the evaluating section as the 2D skeleton model corresponding to the pose of the person, and that calculates representative relative joint lengths by smoothing the relative joint length for each pair of parts in a plurality of acquired images,
wherein the search range is further based on relative joint length.

4. The pose estimating apparatus according to claim 2, wherein the basic skeleton estimating section further extracts front direction of the person, and
the selection section selects the 2D skeleton model corresponding to the pose of the person in the acquired image, from the candidates in the candidate group each corresponding to a 3D skeleton model with directions of the distinctive part and a front direction matching with those of the person.

5. The pose estimating apparatus according to claim 4, further comprising:
a calculating section that calculates, for each acquired image, relative joint lengths each indicating a ratio of a length of each pair of parts to a length of the distinctive part, based on the 3D skeleton model associated with the candidate in the candidate group selected by the evaluating section as the 2D skeleton model corresponding to the pose of the person, and for calculating representative relative joint lengths by smoothing the relative joint length for each pair of parts in a plurality of acquired images,
wherein the storage section determines a 2D skeleton model as each candidate in the candidate group, the 2D skeleton model corresponding to one of the 3D skeleton models that has relative joint lengths matching with the representative relative joint lengths.

6. The pose estimating apparatus according to claim 1, the evaluating section being a section that stores the candidates in the candidate group, the candidates each being associated with a 3D skeleton model, the evaluating section comprising:
a storage section generated by projective conversion of the 3D skeleton model into a 2D skeleton model, the conversion being carried out by each candidate so as to match directions and lengths of the distinctive parts of the person in the acquired image with those of sub-parts in each candidate in the candidate group, the sub-parts being in the acquired image and corresponding to the distinctive parts of the person; and
a selection section that selects one of the candidates in the candidate group as a 2D skeleton model corresponding to the pose of the person in the acquired image, based on the candidates in the candidate group resulting from the projective conversion and the likelihood map resulting from the projective conversion.

7. The pose estimating apparatus according to claim 6, further comprising:

a calculating section that calculates, for each acquired image, relative joint lengths each indicating a ratio of a length between each pair of parts to a length of the distinctive part, based on the 3D skeleton model associated with the candidate in the candidate group selected by the evaluating section as the 2D skeleton model corresponding to the pose of the person, and for calculating representative relative joint lengths by smoothing the relative joint length for each pair of parts in a plurality of acquired images, wherein the search range is further based on the relative joint length.

8. The pose estimating apparatus according to claim 6, wherein the basic skeleton estimating section further extracts a front direction of the person, and the selection section selects the 2D skeleton model corresponding to the pose of the person in the acquired image, from the candidates in the candidate group each corresponding to a 3D skeleton model with directions of the distinctive part and the front direction matching with those of the person.

9. The pose estimating apparatus according to claim 8, further comprising:

a calculating section that calculates, for each acquired image, relative joint lengths each indicating a ratio of a length between each pair of parts to the length of the distinctive part, based on the 3D skeleton model associated with the candidate in the candidate group selected by the evaluating section as the 2D skeleton model corresponding to the pose of the person, and for calculating representative relative joint lengths by smoothing the relative joint length for each pair of parts in a plurality of acquired images, wherein the storage section determines a 2D skeleton model as each candidate in the candidate group, the 2D skeleton model corresponding to one of the 3D skeleton models that has relative joint lengths matching with the representative relative joint lengths.

10. The pose estimating apparatus according to claim 1, wherein the basic skeleton estimating section estimates a position of shoulders of the person as positions of the distinctive part of the person.

11. A pose estimating method comprising the steps of:

estimating a position of a distinctive part of a person in an acquired image;

generating a likelihood map indicating the probability of presence of another part of the person, the probability being based on the position of the distinctive part of the person; and evaluating a candidate group of a plurality of 2D skeleton models, the plurality of 2D skeleton models each corresponding to a pose of the person based on the likelihood map, and comprising a group of lines representing the parts and a group of dots representing connections between the parts, wherein the step of generating the likelihood map is limited to a search range to be input based on statistical data on positions of the distinctive part of the person, a front direction of the person, and human body dimension.

* * * * *